US008890060B2

(12) United States Patent
Ding et al.

(10) Patent No.: US 8,890,060 B2
(45) Date of Patent: Nov. 18, 2014

(54) METHOD OF PROCESSING IMAGE CHARGE/CURRENT SIGNALS

(71) Applicant: Shimadzu Corporation, Kyoto (JP)

(72) Inventors: Li Ding, Manchester (GB); Ranjan Badheka, Manchester (GB)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 14/201,187

(22) Filed: Mar. 7, 2014

(65) Prior Publication Data

US 2014/0263992 A1 Sep. 18, 2014

(30) Foreign Application Priority Data

Mar. 13, 2013 (GB) .................................. 1304491.2

(51) Int. Cl.

| | |
|---|---|
| ***H01J 49/04*** | (2006.01) |
| ***H01J 49/40*** | (2006.01) |
| ***G06K 9/00*** | (2006.01) |
| ***H01J 49/00*** | (2006.01) |
| ***G06T 5/00*** | (2006.01) |
| ***H01J 49/10*** | (2006.01) |

(52) U.S. Cl.

CPC ............... *H01J 49/0004* (2013.01); *G06T 5/00* (2013.01); *H01J 49/10* (2013.01)

USPC ........... 250/282; 250/281; 250/288; 250/290; 250/294; 702/23; 702/28; 702/32; 702/193; 702/77

(58) Field of Classification Search

CPC ..... H01J 49/0036; H01J 49/027; H01J 49/38; H01J 49/0004; H01J 49/4245; H01J 49/282; H01J 49/40; G06K 9/00523

USPC ......... 250/281, 282, 287, 288, 290, 292, 294, 250/389; 702/23, 28, 32, 193, 67, 76, 77

See application file for complete search history.

(56) References Cited

U.S. PATENT DOCUMENTS 7,987,060 B2 * 7/2011 Lange et al. .................... 702/77
8,274,043 B2 * 9/2012 Grothe, Jr. .................... 250/282

(Continued)

FOREIGN PATENT DOCUMENTS

EP 2 642 508 A2 9/2013
GB 2 446 929 A 8/2008

(Continued)

OTHER PUBLICATIONS

Qi Sun, et al., "Multi-ion quantitative mass spectrometry by orthogonal projection method with periodic signal of electrostatic ion beam trap", Journal of Mass Spectrometry, Mar. 1, 2011, pp. 417-424, vol. 46.

(Continued)

*Primary Examiner* — David A Vanore
(74) *Attorney, Agent, or Firm* — Sughrue Mion, PLLC

(57) ABSTRACT

A method of processing an image charge/current signal representative of trapped ions undergoing oscillatory motion. The method includes applying a validity test to each of a plurality of peaks in the image charge/current signal in the frequency domain, wherein applying the validity test to a peak in the image charge/current signal in the frequency domain includes determining whether a phase angle associated with the peak meets a predetermined condition. The method also includes forming a new image charge/current signal that: includes data representative of one or more peaks that have passed the validity test; and excludes data representative of one or more peaks that have failed the validity test. The method may be performed by a mass spectrometry apparatus.

24 Claims, 52 Drawing Sheets

(56) References Cited

U.S. PATENT DOCUMENTS

| | | | | |
|---|---|---|---|---|
| 8,431,886 | B2 * | 4/2013 | Grothe, Jr. | 250/282 |
| 8,644,617 | B2 * | 2/2014 | Golan et al. | 382/199 |
| 8,664,590 | B2 * | 3/2014 | Ding et al. | 250/282 |
| 2002/0024009 | A1 | 2/2002 | Baranov | |
| 2008/0203293 | A1 | 8/2008 | Makarov | |
| 2008/0270083 | A1 * | 10/2008 | Lange et al. | 702/193 |
| 2011/0240845 | A1 * | 10/2011 | Ding | 250/282 |
| 2011/0251801 | A1 * | 10/2011 | Misharin et al. | 702/32 |
| 2012/0095711 | A1 * | 4/2012 | Foster et al. | 702/67 |
| 2013/0068942 | A1 * | 3/2013 | Verenchikov | 250/282 |
| 2013/0270433 | A1 | 10/2013 | Ding et al. | |

FOREIGN PATENT DOCUMENTS

| | | | |
|---|---|---|---|
| GB | 2472951 | A | 2/2011 |
| GB | 2496515 | A | 5/2013 |
| WO | 02/103747 | A1 | 12/2002 |
| WO | 2011/086430 | A1 | 7/2011 |
| WO | 2012/116765 | A1 | 9/2012 |

OTHER PUBLICATIONS

J. B. Greenwood, et al., “A comb-sampling method for enhanced mass analysis in linear electrostatic ion traps”, Review of Scientific Instruments, Mar. 9, 2011, pp. 043103-1-043103-12, vol. 82.

* cited by examiner

Elimination of peaks except 2nd harmonic
using L matric

Elimination of peaks except 2nd harmonic
using L matric

METHOD OF PROCESSING IMAGE CHARGE/CURRENT SIGNALS

This invention relates to methods of processing a plurality of image charge/current signals representative of trapped ions undergoing oscillatory motion, e.g. image charge/current signals obtained using an image charge/current detector in an ion trap mass spectrometry apparatus (i.e. an "ion trap mass spectrometer"). The invention also relates to associated methods and apparatuses.

Particle analysers, especially charged particle analysers, may be configured to measure a frequency spectrum for oscillatory particle motion. One type of such particle analyser is an ion trap, which may be included in an ion trap mass spectrometer.

In general, an ion trap is a mass analyser that works by trapping ions such that the trapped ions undergo oscillatory motion, e.g. backwards and forwards along a linear path or in looped orbits.

An ion trap mass analyser may produce a magnetic field, an electrodynamic field and/or an electrostatic field, or combination of such fields to trap ions. If ions are trapped using an electrostatic field, the ion trap is commonly referred to as an "electrostatic" ion trap. Other types of ion trap include a "radio frequency quadrupole" trap and an ion cyclotron resonance ("ICR") device.

For the avoidance of any doubt, in this disclosure, the terms "mass" and "mass to charge ratio" (which may be written as "mass/charge ratio") may be used interchangeably. The term "ion" may be used to refer to an ion or any other charged particle.

In general, the frequency of oscillation of trapped ions in an ion trap is dependent on mass/charge ratio of the ions, since ions with large mass/charge ratios generally take longer to perform an oscillation compared with ions with small mass/charge ratios. Using an image charge/current detector, it is possible to obtain, non-destructively, an image charge/current signal representative of trapped ions undergoing oscillatory motion in the time domain. This image charge/current signal is usually converted to the frequency domain e.g. using a Fourier transform ("FT"), preferably a fast Fourier transform ("FFT"). An image charge/current signal in the frequency domain may sometimes be referred to as a "frequency spectrum". Since the frequency of oscillation of trapped ions is dependent on mass/charge ratio, an image charge/current signal in the frequency domain can be viewed as mass spectrum data or a "mass spectrum" that provides information regarding the mass/charge ratio distribution of the ions that have been trapped.

Fourier transform ion cyclotron resonance ("FTICR") is a known mass spectrometry technique which employs a superconductor magnetic field for ion trapping and implements these principles.

A known example of an electrostatic ion trap is the "Orbitrap", developed by Alexander Makarov. In an Orbitrap, ions trapped by an electrostatic field cycle around a central electrode in spiral trajectories.

Another known example of an ion trap is the electrostatic ion beam trap ("EIBT") disclosed in WO02/103747 (A1), by Zajfman et al. In an EIBT, ions generally oscillate backwards and forwards along a linear path, so such an ion trap is also referred to as a "Linear Electrostatic Ion Trap".

US2011/0240845 (also see CN101752179), by Li Ding (one of the present inventors), discloses a mass spectrometric analyser and an analysis method based on the detection of ion image current.

WO2011/086430, by Verenchikov, discloses an apparatus and operation method for an electrostatic trap which involves measuring the frequency of multiple isochronous ionic oscillations.

WO2012/116765 describes an electrostatic ion trap for mass analysis that includes a first array of electrodes and a second array of electrodes, spaced from the first array of electrodes.

The present inventors have observed that an image charge/current signal obtained using an ion trap mass spectrometer is often not perfectly harmonic. For example, an image charge/current signal obtained using an ion trap may have a waveform of a sinusoidal wave or of a sharp pulsed wave in the time domain, which can result in the image charge/current signal having a plurality of harmonic components in the frequency domain.

When an image charge/current signal representative of trapped ions having different mass/charge ratios undergoing oscillatory motion is converted to the frequency domain, e.g. using a Fourier transform, the present inventors have observed that, if a plurality of harmonic components are present, each harmonic component is usually expressed as a set of peaks, with each peak in the set being caused by trapped ions having a different mass/charge ratio (i.e. a different ion species). If the trapped ions have a narrow range of mass/charge ratios, then each harmonic component will be expressed as a set of closely spaced peaks which can easily be identified. However, if the trapped ions have a wide range of mass/charge ratios, then each harmonic component will be expressed as a set of widely spaced peaks which may overlap with peaks belonging to other harmonic components. Overlapping harmonic peaks can make it difficult to obtain useful information regarding the mass/charge ratio distribution of trapped ions without limiting the range of mass/charge ratios of ions used to obtain the image charge/current signal. These difficulties are described in more detail below, with reference to FIG. 1*a-c*.

Attempts have previously been made to address the difficulties that can be caused by a plurality of harmonic components being contained in an image charge/current signal obtained using an ion trap mass spectrometer.

For example, "Multi-ion quantitative mass spectrometry by orthogonal projection method with periodic signal of electrostatic ion beam trap", Qi Sun, Changxin Gu and Li Ding (one of the present inventors), J. Mass. Spectrum. 2011, 46, 417-424, discloses analysing image charge/current signals using an "orthogonal projection method" to provide a more readable spectrum. However, the method proposed by this paper is computationally intensive.

As another example, "A comb-sampling method for enhanced mass analysis in linear electrostatic ion traps", J. B. Greenwood et al, Review of Scientific Instruments, 82, 043103 (2011) discloses a "comb-sampling" algorithm for extracting spectral information from signal acquired by pickup-electrodes from the image-charge of ion bunches oscillating in a linear electrostatic trap. Again, the method proposed by this paper is computationally intensive.

As another example, GB1204817.9, currently unpublished, by Li Ding and R. Badheka (two of the present inventors), describes a method of processing a plurality of image charge/current signals representative of trapped ions undergoing oscillatory motion, e.g. for use in an ion trap mass spectrometer. The method includes producing a linear combination of the plurality of image charge/current signals using a plurality of predetermined coefficients, the predetermined coefficients having been selected so as to supress at least one harmonic component of the image charge/current signals within the linear combination of the plurality of image charge/current signals. A description of this "linear combination" method, based on excerpts from GB1204817.9, is set out below in an Annex to this document.

The present inventors have observed that several of the methods described above need large computing resource compared with FFT. Further, the "linear combination" method described in GB1204817.9 (see the Annex to this document) involves the use of multiple image charge pick-up electrodes, adding to the complication of instrumentation used.

In GB 2446929, Franzen describes a method for identifying a false peak in a Fourier spectrum by investigating the frequency of a peak and establishing whether it is the exactly the integer fraction or multiple frequency of another peak. This method may be valid if only the fundamental frequency component is to be retained. In case where a higher order harmonic component is to be retained with other harmonic components around it being eliminated, the integer fraction relation or integer multiple relation method taught by this document is not applicable.

The present invention has been devised in view of these considerations. The present invention may seek to provide an algorithm based on a fast computing technique such as FFT and using only one pick-up electrode or, if combined with the methods described in the Annex to this document, using fewer pick-up electrodes than would otherwise be needed.

The present invention may seek to provide higher mass resolution compared with previous data processing methods.

The present invention relates to a finding by the present inventors that by applying a validity test to a peak in an image charge/current signal in the frequency domain, wherein the validity test includes determining whether a phase angle associated with the peak meets a predetermined condition, it is possible to determine whether or not that peak belongs to a selected harmonic component of the image charge/current signal and to form a new image charge/current signal in the frequency domain (e.g. in the form of a new frequency spectrum) that includes data representative of one or more peaks that have passed the validity test whilst excluding data representative of one or more peaks that have failed the validity test.

In a first aspect, the invention may provide:

A method of processing an image charge/current signal representative of trapped ions undergoing oscillatory motion, the method including:

applying a validity test to each of a plurality of peaks in the image charge/current signal in the frequency domain, wherein applying the validity test to a peak in the image charge/current signal in the frequency domain includes determining whether a phase angle associated with the peak meets a predetermined condition; and forming a new image charge/current signal that excludes data representative of one or more peaks that have failed the validity test.

As far as is known to the present inventors, such a method has not previously been proposed.

Preferably, the validity test is configured to determine whether a peak in the image charge/current signal in the frequency domain belongs to one or more selected harmonic components (of the image charge/current signal). More preferably, the validity test is configured to determine whether a peak in the image charge/current signal in the frequency domain belongs to a (i.e. a single) selected harmonic component (of the image charge/current signal).

Preferably, the method includes forming a new image charge/current signal that:

includes data representative of one or more peaks that have passed the validity test; and excludes data representative of one or more peaks that have failed the validity test.

In this way, a new image charge/current signal can be formed that includes data representative of peaks that belong to the one or more selected harmonic components, whilst excluding data representative of peaks that do not belong to the one or more selected harmonic components.

However, the method need not always include forming a new image charge/current signal that includes data representative of one or more peaks that have passed the validity test, since it may be the case that all the peaks fails the validity test. Failure of all peaks to pass the validity test may still provide useful information about the plurality of peaks, e.g. it may be inferred that none of the plurality of peaks belongs to a selected harmonic component.

It will be apparent to a skilled person from the discussion herein that there are a variety of ways in which the validity test can be configured to determine whether a peak in the image charge/current signal in the frequency domain belongs to one or more selected harmonic components. Two specific examples of a validity test configured to achieve this result are described below as "validity test A" and "validity test B". Other validity tests may also be devised using the same or similar principles.

Preferably, applying the validity test to a peak in the image charge/current signal in the frequency domain includes determining whether a phase angle associated with the peak falls within a predetermined range, e.g. by determining whether a phase angle associated with the peak is equal to a predetermined value within a predetermined tolerance. In this case, the predetermined condition may be viewed as having been met if the peak falls within the predetermined range.

In general, a peak in an image charge/current signal in the frequency domain is not infinitely narrow, but is instead has a profile which is spread over a number of frequency values (which are typically discrete frequency values). Nonetheless, herein, reference may be made to "the frequency" at which a peak occurs. This frequency would normally be taken as the frequency value at which the peak is highest, which may be referred to herein as the frequency at the "peak point" or the "peak point frequency". The phase angle associated with a peak would normally be taken as the phase angle as calculated at the frequency at which the peak occurs, preferably the phase angle as calculated at the peak point.

The frequency at which a peak occurs is representative of the mass/charge ratio of the ions responsible for that peak, so the frequency at which a peak occurs may sometimes be referred to as the mass/charge ratio of the peak.

The present inventors have found that the phase angle associated with a peak in an image charge/current signal in the frequency domain varies not only with the harmonic component to which a peak belongs, but also varies with the frequency at which the peak occurs (which is in turn related to the mass to charge ratio of the ion causing that peak). The present inventors have found that this variation of phase angle with frequency happens in a predictable way for each harmonic component, and is therefore preferably taken into account in applying a validity test to the plurality of peaks.

Thus, preferably, the validity test is dependent on a predetermined relationship between phase angle and frequency that corresponds to a selected harmonic component of an image charge/current signal. The predetermined relationship may be linear, or curved, for example.

Examples of validity tests that are dependent on a predetermined relationship between phase angle and frequency that corresponds to a selected harmonic component of an image charge/current signal are discussed below as “validity test A” and “validity test B”.

The predetermined relationship between phase angle and frequency that corresponds to a selected harmonic component of an image charge/current signal may be determined by a calibration method (e.g. as discussed below with reference to the fourth aspect of the invention), and is preferably determined under conditions which are substantially the same as or similar to the conditions under which the image charge/current signal being processed is produced.

Applying the validity test to a peak may, in some embodiments (which are referred to herein as using “validity test A”), include determining whether a phase angle associated with the peak falls within a predetermined range, wherein the predetermined range is dependent on a predetermined relationship between phase angle and frequency that corresponds to a selected harmonic component of an image charge/current signal. For example, the predetermined range for a given peak may be a range of phase angles defined by a predetermined tolerance at either side of a phase angle value provided by the predetermined relationship at the frequency at which the peak occurs. In this case, the predetermined condition may be viewed as having been met if the peak falls within the predetermined range.

Applying the validity test to a peak may, in some embodiments (which are referred to herein as using “validity test B”), include determining whether a phase angle associated with the peak, as rotated by a predetermined relationship between phase angle and frequency that corresponds to a selected harmonic component of an image charge/current signal, meets a predetermined condition.

Preferably, the rotation of a phase angle associated with a peak by the predetermined relationship includes rotation of the phase angle by an amount determined by the predetermined relationship at the frequency at which the peak occurs. More preferably, the rotation of a phase angle associated with a peak by the predetermined relationship includes rotation of the phase angle by the negative value of an amount provided by the predetermined relationship at the frequency at which the peak occurs. If the image charge/current signal in the frequency domain is in a complex format, this rotation may be achieved by multiplying the image charge/current signal in the frequency domain by the imaginary exponent of the negative value provided by the predetermined relationship at the frequency at which the peak occurs (e.g. multiplication by $e^{-i\Phi_n(f)}$, see the specific description below for further details).

Theoretically, rotation of the phase angle associated with a peak belonging to the selected harmonic component by an amount which corresponds to the negative of a value provided by the predetermined relationship at the frequency at which the peak occurs will result in the phase angle, as rotated by the predetermined relationship, being zero (although in reality the rotated phase angle is unlikely to be exactly zero). Accordingly, if the modification of a phase angle associated with a peak by the predetermined relationship includes rotation of the phase angle by an amount which corresponds to the negative of a value provided by the predetermined relationship at the frequency at which the peak occurs, then the predetermined condition may include determining whether the phase angle, as rotated by the predetermined relationship, is equal to zero within a predetermined tolerance.

If the image charge/current signal in the frequency domain is in a complex format, determining whether the phase angle, as rotated by the predetermined relationship, is equal to zero within a predetermined tolerance, may include determining if an imaginary component of the image charge/current signal in the frequency domain, whose phase angle has been rotated by the predetermined relationship (e.g. through multiplication by $e^{-i\Phi_n(f)}$), is zero at or within a predetermined distance of the frequency at which the peak occurs. From a computational perspective, this is a particularly efficient way of implementing the validity test.

Here, for completeness, it is to be noted that not all peaks belonging to the selected harmonic component may be rotated by the predetermined relationship to have a phase angle of zero within the predetermined tolerance, e.g. since the phase angle of some peaks belonging to the selected harmonic component may be influenced by peaks belong to other harmonic components. Such errors could, however, be found and corrected e.g. using an “error checking” method as described below.

The data representative of one or more peaks that have passed the validity test may include portions of the (original) image charge/current signal which correspond to the one or more peaks that have passed the validity test. For example, data representative of one or more peaks that have passed the validity test may include data representative of the frequency profile(s) of the one or more peaks that have passed the validity test. However, the data representative of one or more peaks that have passed the validity test could instead simply include data representative of the height(s) of the one or more peaks that have passed the validity test, i.e. with the data not necessarily containing any information relating to the frequency profile of the peaks (as is the case in an example described in the “Additional Technical Detail section, below).

For the avoidance of any doubt, the new image charge/current signal may be formed by modifying the (original) image charge/current signal, e.g. so that the modified (original) image charge signal is the new image charge signal. For example, forming a new image charge/current signal that excludes data representative of one or more peaks that have failed the validity test may be achieved simply by adding zero values in place of the one or more peaks that have failed the validity test in the (original) image charge/current signal.

Alternatively, the new image charge/current signal may be a newly created image charge/current signal which is separate from the (original) image charge/current signal. The newly created image charge/current signal may equally be formed to exclude data representative of one or more peaks that have failed the validity test, simply by adding zero values in place of the one or more peaks that have failed the validity test in the newly created image charge/current signal.

If the image charge/current signal in the frequency domain is in a complex format, and if the new image charge/current signal includes data representative of one or more peaks that have passed the validity test, the data representative of the one or more peaks that have passed the validity test is preferably obtained from a real component of the (original) image charge/current signal in the frequency domain. This helps to give better peak shape and resolution, as explained in more detail below.

Preferably, the phase angle (respectively) associated with each peak is determined using a frequency value at which the peak is highest. More preferably, the phase angle associated with each peak is determined by polynomial fitting and/or interpolation using a plurality of frequency values at which the peak occurs, more preferably using a plurality of frequency values (e.g. n frequency values, where n is a predetermined integer) including a frequency value at which the peak is highest. More preferably, the plurality of frequency values include a frequency value at which the peak is highest and at least one frequency value on each side of the frequency value at which the peak is highest. This may help the phase angles to be determined more accurately, which can be important since phase angle can change rapidly with respect to frequency, see e.g. FIG. 11.

The method may include pre-processing the image charge/current signal prior to applying the validity test to the image charge/current signal.

Pre-processing the image charge/current signal may include converting the image charge/current signal from the time domain into the frequency domain.

Preferably, converting the image charge/current signal from the time domain to the frequency domain is performed using a Fourier transform ("FT"), preferably a discrete Fourier transform such as a "fast Fourier transform" ("FFT"). These techniques are well known. Normally, using an FFT to convert the image charge/current signal into the frequency domain will result in the image charge/current signal being in a complex format, i.e. having a "real" component and an "imaginary" component.

For the avoidance of any doubt, the image charge/current signal processed according to a method as set out in this first aspect of the invention may be a linear combination of a plurality of image charge/current signals, e.g. as produced by the "linear combination" method set out in the Annex to this document. Please refer to the discussion of the second aspect of the invention for a discussion of how this might be achieved.

Preferably, the plurality of peaks (to which the validity test is applied) includes all peaks within a frequency range of interest, more preferably with all other peaks being excluded from the plurality of peaks (to which the validity test is applied).

Preferably, the method includes repeating the steps of applying a validity test to each of a plurality of peaks and forming a new image charge/current signal, wherein a different validity test is used (i.e. applied to each of the plurality of peaks) and a different new image charge/current signal is formed on each repetition, so as to form a plurality of new image charge/current signals.

Preferably, the validity test used on each repetition is configured to determine whether a peak in the image charge/current signal in the frequency domain belongs to a different selected harmonic component (see comments above for how this might be done). In this way, the new image charge/current signal produced on each repetition may correspond to a different selected harmonic component.

Preferably, the method further includes comparing the plurality of new image charge/current signals to determine if any errors are contained within one or more of the plurality of new image charge/current signals. This is a useful way of checking for errors, even if only one new image charge/current signal is actually wanted, and can therefore be viewed as an "error checking" method.

A method according to the first aspect of the invention may be performed by a computer.

In a second aspect, the invention may provide a method which combines a method according to the first aspect of the invention with a method as described in the Annex to this document, but without necessarily requiring that the predetermined coefficients have been selected so as to supress at least one harmonic component of the image charge/current signals within the linear combination of the plurality of image charge/current signals.

In this second aspect, the invention may provide:

A method of processing a plurality of image charge/current signals representative of trapped ions undergoing oscillatory motion, the method including:
- producing a linear combination of the plurality of image charge/current signals using a plurality of predetermined coefficients;
- processing an image charge/current signal according to a method as set out in the first aspect of the invention, wherein the linear combination of the plurality of image charge/current signals is used as the image charge/current signal processed according to the method as set out in the first aspect of the invention.

For the avoidance of any doubt, a linear combination of a plurality of image charge/current signals can be viewed as an image charge/current signal for the purposes of this disclosure.

As can be seen from the more detailed discussion below, the composite method according to this second aspect of the invention may result in a new image charge/current signal which includes fewer errors, e.g. by modifying a relationship between phase angle and frequency to allow harmonic components to be more easily identified (see e.g. FIG. 12, discussed below).

Preferably, the predetermined coefficients have been selected so as to supress at least one harmonic component of the image charge/current signals within the linear combination of the plurality of image charge/current signals. Suppressing at least one harmonic component may be useful in certain cases. However, selecting the predetermined coefficients so as to suppress at least one harmonic component is not required. This is because, for example, the predetermined could be selected so as to modify a relationship between phase angle and frequency in a manner that allows harmonic components to be more easily identified, without necessarily having the effect of suppressing a harmonic component.

Optionally, the terms "targeted" or "unwanted" may be used to identify the or each harmonic component that is to be suppressed in the linear combination. Also optionally, the terms "untargeted" or "wanted" may be used to identify a harmonic component that is not included in the at least one harmonic component to be suppressed (i.e. to identify a harmonic component that is not to be suppressed), e.g. to identify a harmonic component that has been selected for use in obtaining information regarding the mass/charge ratio distribution of trapped ions. However, these terms are optional and are intended to be used simply as labels. These terms should not be construed as requiring the method to include a cognitive decision to be made regarding, for example, whether or not a harmonic component is actually wanted/targeted by a human being.

Herein, producing a linear combination of the plurality of image charge/current signals using a plurality of coefficients preferably includes multiplying each of the plurality of image charge/current signals by a respective coefficient (which may be in a complex format). As explained in more detail below, the image charge/current signals could be in either the time domain or the frequency domain for this multiplication. Preferably, the image charge/current signals are in the time domain for this multiplication, as this generally requires fewer Fourier transforms (see below).

In general, image charge/current signals are initially obtained in the time domain, i.e. with the image charge/current signals being functions of time. It is possible to convert an image charge/current signal from the time domain into the frequency domain using e.g. a Fourier transform ("FT"), preferably a discrete Fourier transform such as a "fast Fourier transform" ("FFT") since the Fast Fourier transform is less computationally intensive so it is generally quicker.

An image charge/current signal in the frequency domain can be viewed as mass spectrum data providing information regarding the mass/charge ratio distribution of the ions that have been trapped. However, as noted above, if an image charge/current signal in the frequency domain has a plurality of harmonic components caused by trapped ions having a wide range of mass/charge ratios, then it can be difficult to obtain useful information regarding the mass/charge ratio distribution of the trapped ions from the image charge/current signal in the frequency domain, without limiting the range of mass/charge ratios used to obtain the image charge/current signal or using computationally intensive methods.

The method preferably includes providing the linear combination of the plurality of image charge/current signals in the frequency domain, preferably so as to provide information regarding the mass/charge ratio distribution of the trapped ions. Thus, the linear combination of the plurality of image charge/current signals in the frequency domain can be viewed as mass spectrum data providing information regarding the mass/charge ratio distribution of the ions that have been trapped. As noted above, advantageously, because at least one harmonic component of the image charge/current signals is suppressed (more preferably substantially eliminated, see below) within the linear combination of the plurality of image charge/current signals, the linear combination can be used to obtain useful information regarding the mass/charge distribution of trapped ions for a wide range of mass/charge ratios without necessarily suffering from the difficulties caused by overlapping harmonic components (having different orders) and in a manner that need not be computationally intensive.

Providing the linear combination of the plurality of image charge/current signals in the frequency domain may be achieved using a Fourier transform, preferably a discrete Fourier transform such as a "fast Fourier transform".

Here, it should be recognised that, assuming the plurality of image charge/current signals are initially obtained in the time domain (see above), then providing the linear combination of the plurality of image charge/current signals in the frequency domain may be achieved by either:

(a) producing the linear combination of the plurality of image charge/current signals in the time domain, then converting the linear combination of the plurality of image charge/current signals from the time domain into the frequency domain (e.g. using a Fourier transform, preferably a discrete Fourier transform such as a "fast Fourier transform"); or (b) converting each of the plurality of image charge/current signals from the time domain into the frequency domain (e.g. using a Fourier transform, preferably a discrete Fourier transform such as a "fast Fourier transform"), then producing the linear combination of the plurality of image charge/current signals in the frequency domain.

For the avoidance of any doubt, producing the linear combination of the plurality of image charge/current signals in the time domain may be performed in an analogue circuit, e.g. as described in more detail below.

Here, it should be appreciated that methods (a) and (b) are generally equivalent, since a Fourier transform of a linear combination of signals is generally equivalent to a linear combination of signals to which a Fourier transform has been individually applied, see e.g. Equation 2.3 below. However, method (a) is preferred, as this method generally requires fewer Fourier transforms compared with method (b).

Accordingly, assuming the plurality of image charge/current signals are initially obtained in the time domain (see above), then providing the linear combination of the plurality of image charge/current signals in the frequency domain preferably includes producing the linear combination of the plurality of image charge/current signals in the time domain, then converting the linear combination of the plurality of image charge/current signals from the time domain into the frequency domain (e.g. using a Fourier transform, preferably a discrete Fourier transform such as a "fast Fourier transform").

Herein, a (e.g. "targeted" or "unwanted") harmonic component of the image charge/current signals within the linear combination may be viewed as being supressed if, in the frequency domain, a ratio value calculated as the height of a peak belonging to the (e.g. "targeted" or "unwanted") harmonic component divided by the height of a corresponding peak belonging to another (e.g. "untargeted" or "wanted") harmonic component is smaller for the linear combination produced using the predetermined coefficients compared with the same ratio calculated for a simple sum up of each image charge/current signal. In this context, "corresponding" peaks means peaks caused by trapped ions having the same mass/charge ratio.

Thus, the suppression of the at least one harmonic component can be relative rather than absolute, e.g. with the predetermined coefficients being selected so as to suppress at least one (e.g. "targeted" or "unwanted") harmonic component of the image charge/current signals relative to another (e.g. "untargeted" or "wanted") harmonic component of the image charge/current signals. For the avoidance of any doubt, this could be achieved, for example, by amplifying the other ("untargeted" or "wanted") harmonic component, rather than by suppressing the at least one ("targeted" or "unwanted") harmonic component.

Accordingly, the predetermined coefficients may be selected to suppress (or substantially eliminate) at least one (e.g. "targeted" or "unwanted") harmonic component of the image charge/current signals relative to another (e.g. "untargeted" or "wanted") harmonic component which has been selected for use in obtaining information regarding the mass/charge ratio distribution of trapped ions. The at least one (e.g. "targeted" or "unwanted") harmonic component to be suppressed are preferably near to (more preferably next to) the (e.g. "untargeted" or "wanted") harmonic component selected for use in obtaining information regarding the mass/charge ratio distribution of trapped ions.

Preferably, the predetermined coefficients are selected so as to substantially eliminate at least one harmonic component of the plurality of image charge/current signals within the linear combination of the plurality of image charge/current signals.

Herein, a harmonic component may be viewed as being "substantially eliminated" if, in the frequency domain, a ratio value calculated as the height of a peak belonging to the (e.g. "targeted" or "unwanted") harmonic component divided by the height of a corresponding peak belonging to another (e.g. "untargeted" or "wanted") harmonic component is 5% or less, more preferably 0.5% or less, for the linear combination produced using the predetermined coefficients. In this context, "corresponding" peaks again means peaks caused by trapped ions having the same mass/charge ratio.

Preferably, the predetermined coefficients are selected so as to suppress (more preferably substantially eliminate) n−1 of the first n harmonic components, where n is two or more, more preferably three or more, more preferably four or more, more preferably five or more. For example, the predetermined coefficients may be selected so as to suppress (more preferably substantially eliminate, see above) four of the first five harmonic components, e.g. such that first, second, fourth and fifth (e.g. "targeted" or "unwanted") harmonic components are suppressed (more preferably substantially eliminated), e.g. so as to leave behind the third, sixth and higher order (e.g. “untargeted” or “wanted”) harmonic components.

More generally, the predetermined coefficients may be selected so as to suppress (more preferably substantially eliminate) m of the harmonic components having an order between n and n+m, where n is a positive integer and m is one or more, more preferably two or more, more preferably three or more, more preferably four or more, more preferably five or more. For example, the predetermined coefficients may be selected so as to suppress (more preferably substantially eliminate, see above) four of the fourth to eighth harmonic components, e.g. so as to leave behind the sixth harmonic component. As can be seen from the simulated examples discussed below, the predetermined coefficients will typically (but not necessarily) all be different from each other and/or may be in a complex format (containing real and imaginary components).

The method may include displaying the linear combination of the plurality of image charge/current signals, e.g. in the frequency domain, e.g. on a display such as a screen.

The second aspect of the invention may also provide a method of selecting predetermined coefficients, e.g. for use in a method of processing a plurality of image charge/current signals according to the second aspect of the invention, e.g. as described above.

The method of selecting predetermined coefficients may include:

- obtaining a plurality of image charge/current signals;
- setting up equations aimed at suppressing or eliminating at least one harmonic component of the image charge/current signals; and
- selecting the predetermined coefficients by solving the equations.

Obtaining a plurality of image charge/current signals may e.g. be as described above and may e.g. include:

- producing ions;
- trapping the ions such that the trapped ions undergo oscillatory motion; and
- obtaining a plurality of image charge/current signals representative of the trapped ions undergoing oscillatory motion.

Preferably, the method includes providing the plurality of image charge/current signals in the frequency domain before setting up the equations, i.e. such that the linear combination of the plurality of image charge/current signals is produced in the frequency domain. Providing the plurality of image charge/current signals in the frequency domain may be achieved by converting the plurality of image charge/current signals from the time domain to the frequency domain, e.g. using a Fourier transform, preferably a discrete Fourier transform such as a “fast Fourier transform”.

Preferably, the equations set up aimed at suppressing or eliminating at least one harmonic component of the image charge/current signals are aimed at suppressing or eliminating at least one harmonic component of the image charge/current signals within a linear combination of the plurality of image charge/current signals.

Preferably, setting up the equations includes producing a linear combination of the plurality of image charge/current signals using a plurality of undetermined coefficients.

Preferably, producing a linear combination of the plurality of image charge/current signals using a plurality of undetermined coefficients is achieved by producing a linear combination of the plurality of image charge/current signals as sampled at a plurality of frequencies using a plurality of undetermined coefficients, with each of the plurality of frequencies corresponding to a respective one of a plurality of harmonic components of the plurality of image charge/current signals. Preferably, each of the plurality of frequencies corresponds to a peak belonging to a respective one of a plurality of harmonic components of the plurality of image charge/current signals (and may therefore be referred to as a “harmonic frequency”). More preferably, each of the plurality of frequencies corresponds to a peak point (i.e. highest point) of a peak (e.g. in a plot of absolute intensity against frequency) belonging to a respective one of a plurality of harmonic components of the plurality of image charge/current signals (since a peak may cover a number of frequency points, see e.g. FIG. 10). In general, if one image charge/current signal is sampled at a particular frequency corresponding to a particular peak point, then it is highly preferable for all of the image charge/current signals to be sampled at this same frequency. The plurality of harmonic components (to which the plurality of frequencies correspond) preferably include the at least one harmonic component to be suppressed/eliminated, as well as at least one (e.g. “untargeted” or “wanted”) harmonic component that is not to be suppressed/eliminated (which may be a harmonic component selected for use in obtaining information regarding the mass/charge ratio distribution of trapped ions).

By way of example, producing a linear combination of n image charge/current signals using a plurality of undetermined coefficients (where n is an integer) may be achieved by producing a linear combination of n image charge/current signals sampled at n frequencies using n undetermined coefficients, with each of the n frequencies corresponding to (e.g. a peak point of a peak belonging to) a respective one of the first n harmonic components of the plurality of image charge/current signals, e.g. as described in the Annex below under the heading “Theory” (with n=5). By way of example, n may be two or more, more preferably three or more, more preferably four or more, more preferably five or more Preferably, the equations set up aimed at suppressing or eliminating at least one harmonic component of the image charge/current signals are linear equations. Such equations may be set up by equating the linear combination produced using the plurality of undetermined coefficients to a predetermined vector, e.g. a vector L as described below, for example.

Preferably, the equations are aimed at eliminating (rather than merely suppressing) at least one harmonic component. Of course, whilst the equations may mathematically be aimed at eliminating at least one harmonic component (in its entirety), performing a method of processing a plurality of image/charge signals using predetermined coefficients selected by solving such equations might not result in perfect elimination of the at least one harmonic component (e.g. due to factors such as data sampling/calculation error, noise etc).

Preferably, setting up equations aimed at suppressing or eliminating at least one harmonic component of the image charge/current signals includes setting up linear equations, wherein at least one linear combination of the plurality of image charge/current signals as sampled at (e.g. a respective) one of a plurality of harmonic frequencies (e.g. corresponding to a “targeted” or “unwanted” harmonic component) using a plurality of undetermined coefficients is set equal to zero (e.g. so as to aim at elimination of the “targeted” or “unwanted” harmonic component) or to a value that is smaller than (e.g. a value that has been set equal to) another linear combination of the plurality of image charge/current signals as sampled at another one of the plurality of harmonic frequencies (e.g. corresponding to an “untargeted” or “wanted” harmonic component) using said undetermined coefficients (e.g. so as to aim at suppression of the “targeted” or “unwanted” harmonic component).

Preferably, the produced ions include ions having a reference mass/charge ratio. More preferably, the produced ions include only (or substantially only) ions having a reference mass/charge ratio. Preferably the reference mass/charge ratio is selected to be in the middle of a mass range that is going to be used (e.g. in a subsequent experiment).

Preferably, the plurality of image charge/current signals include harmonic components caused by ions having the reference mass/charge ratio.

Preferably, producing a linear combination of the plurality of image charge/current signals using a plurality of undetermined coefficients is based on the harmonic components caused by ions having the reference mass/charge ratio. More preferably, producing a linear combination of the plurality of image charge/current signals using a plurality of undetermined coefficients is achieved by producing a linear combination of the plurality of image charge/current signals as sampled at a plurality of frequencies using a plurality of undetermined coefficients, with each of the plurality of frequencies corresponding to (e.g. a peak point of a peak belonging to) a respective one of a plurality of harmonic components caused by ions having the reference mass/charge ratio.

Accordingly, the method of selecting predetermined coefficients may include:

- producing ions, wherein the produced ions include ions having a reference mass/charge ratio;
- trapping the ions such that the trapped ions undergo oscillatory motion;
- obtaining a plurality of image charge/current signals representative of the trapped ions undergoing oscillatory motion, wherein the plurality of image charge/current signals include harmonic components caused by ions having the reference mass/charge ratio;
- providing the plurality of image charge/current signals in the frequency domain;
- setting up linear equations aimed at suppressing or eliminating at least one of the plurality of harmonic components of the image charge/current signals within a linear combination of the plurality of image charge/current signals, wherein setting up the linear equations includes producing a linear combination of the plurality of image charge/current signals as sampled at a plurality of frequencies using a plurality of undetermined coefficients, with each of the plurality of frequencies corresponding to (e.g. a peak point of a peak belonging to) a respective one of a plurality of harmonic components caused by ions having the reference mass/charge ratio; and
- selecting the predetermined coefficients by solving the linear equations.

The method of selecting predetermined coefficients may be combined with a method of processing a plurality of image/charge current signals as set out in this second aspect of the invention. Thus, the second aspect of the invention may provide a method including:

- a method of selecting predetermined coefficients as set out in this second aspect of the invention; and
- a method of processing a plurality of image charge/current signals representative of trapped ions undergoing oscillatory motion as set out in this second aspect of the invention.

Preferably, the method of selecting predetermined coefficients includes providing the plurality of image charge/current signals in the frequency domain using a first discrete Fourier transform; and the method of processing a plurality of image charge/current signals includes providing the linear combination in the frequency domain using a second discrete Fourier transform; wherein the first and second discrete Fourier transforms use the same frequency range and frequency step. It has been found by the present inventors that this leads to improved suppression/elimination of unwanted harmonic components.

In a third aspect, the invention may provide:

A method of mass analysis that includes:

- producing ions;
- trapping the ions such that the trapped ions undergo oscillatory motion;
- obtaining at least one image charge/current signal representative of the trapped ions undergoing oscillatory motion; and
- processing an obtained image charge/current signal according to a method as set out in the first aspect of the invention or processing one or more obtained image charge signals according to a method as set out in the second aspect of the invention.

The ions may be produced using an ion source, e.g. as discussed below in more detail in connection with the fifth aspect of the invention.

The ions may be trapped using a mass analyser, e.g. as discussed below in more detail in connection with the fifth aspect of the invention.

The at least one image charge/current signal may be obtained using at least one image charge/current detector, e.g. as discussed below in more detail in connection with the fifth aspect of the invention.

Herein, the term "image charge/current signal" is preferably interpreted to cover any order derivative or integral (e.g. a second order derivative) of an image charge/current signal, or a combination of the above (e.g. $C(t)+A*dC(t)/dt$ . . . , where $C(t)$ is charge as a function of time), produced by an image charge/current detector.

In a fourth aspect, the invention may provide:

- A calibration method of determining a relationship between phase angle and frequency that corresponds to a selected harmonic component of an image charge/current signal, the calibration method including:
- producing reference ions having a plurality of known mass/charge ratios;
- trapping the reference ions such that the trapped reference ions undergo oscillatory motion;
- obtaining one or more image charge/current signals representative of the trapped reference ions undergoing oscillatory motion;
- providing the one or more image charge/current signals in the frequency domain;
- identifying, in the one or more image charge/current signals in the frequency domain (which is/are preferably in a complex format), a plurality of peaks caused by the reference ions that belong to a selected harmonic component of the image charge/current signal;
- determining a phase angle for each of the identified peaks;
- determining a relationship between phase angle and frequency that corresponds to a selected harmonic component of an image charge/current signal based on the phase angles determined for the identified peaks.

A relationship between phase angle and frequency that corresponds to a selected harmonic component of an image charge/current signal determined in this way will generally be applicable to subsequent analyses, provided that the subsequent analyses are performed under conditions which are substantially the same as or similar to the conditions under which the calibration method is performed.

Thus, a relationship between phase angle and frequency that corresponds to a selected harmonic component of an image charge/current signal determined according to the fourth aspect of this invention may be used as a predetermined relationship between phase angle and frequency that corresponds to a selected harmonic component of an image charge/current signal in a method/apparatus according to any other aspect of this invention.

For the avoidance of any doubt, the or each image charge/current signal representative of the trapped reference ions undergoing oscillatory motion referred to in the calibration method described above may, in some embodiments, be a linear combination of image charge/current signals representative of the trapped reference ions undergoing oscillatory motion, e.g. where the or each linear combination is obtained by:

- producing a linear combination of a plurality of image charge/current signals representative of the trapped reference ions undergoing oscillatory motion using a plurality of predetermined coefficients, e.g. in a manner described in connection with the second aspect of the invention or in the Annex to this document. In this way, the calibration method may be used to determine a relationship between phase angle and frequency that corresponds to a selected harmonic component of a linear combination of image charge/current signals produced using a plurality of predetermined coefficients (see e.g. FIG. 12 discussed below). Such a relationship could be used as a predetermined relationship between phase angle and frequency in a method according to the second aspect of the invention, for example.

However, equally, the or each image charge/current signal representative of the trapped reference ions undergoing oscillatory motion referred to in the calibration method described above may simply be an image charge/current signal obtained using an image charge/current detector.

For the avoidance of any doubt, it is noted that there are at least two different methodologies for performing the steps of "producing", "trapping" and "obtaining" in this calibration method.

According to a first methodology, the calibration method may include:

- producing reference ions having a plurality of known mass/charge ratios at the same time;
- trapping the reference ions such that the trapped reference ions undergo oscillatory motion at the same time;
- obtaining an image charge/current signal representative of the trapped reference ions (note that this image charge/current signal may be a linear combination of image charge/current signals representative of the trapped reference ions, see above).

According to a second methodology, the calibration may instead include:

- producing reference ions having a plurality of known mass/charge ratios, wherein the reference ions are produced in a plurality of sets, wherein each set of reference ions is produced at a different time and has ions having a different known mass/charge ratio;
- trapping the reference ions such that the trapped reference ions undergo oscillatory motion, wherein each set of reference ions is trapped at a different time;
- obtaining a plurality of image charge/current signals representative of the trapped reference ions undergoing oscillatory motion (note that each of these plurality of image charge/current signals may be a linear combination of image charge/current signals representative of the trapped reference ions, see above), wherein each image charge/current signal is obtained from a different trapped set of reference ions.

Of these two methodologies, the second methodology is preferred, as it avoids the potential for confusion between peaks caused by reference ions having different mass/charge ratios.

Preferably, providing the one or more image charge/current signals in the frequency domain includes converting the one or more image charge signals from the time domain into the frequency domain. But note that in the case that the or each image charge signals is a linear combination of image charge signals (see above), the or each linear combination may have been converted to the frequency domain before the one or more linear combinations are produced, e.g. in a manner discussed in relation to the second aspect of the invention.

In the fourth aspect, the invention may additionally provide a method including:

- a calibration method as set out in this fourth aspect of the invention; and
- a method of mass analysis as set out in the third aspect of the invention, wherein the relationship between phase angle and frequency that corresponds to a selected harmonic component of an image charge/current signal determined in the calibration method is used as a predetermined relationship between phase angle and frequency that corresponds to a selected harmonic component of an image charge/current signal in the method of mass analysis.

Preferably, the plurality of known mass/charge ratios of the reference ions used in the calibration method lie within a frequency range of interest, this frequency range of interest being the same as or similar to a frequency range of interest within which the plurality of peaks (to which the validity test is applied in the third aspect of the invention) are included. This helps to ensure the applicability of the relationship between phase angle and frequency that corresponds to a selected harmonic component of an image charge/current signal determined in the method as set out in the fourth aspect in the method as set out in the third aspect of the invention.

In a fifth aspect, the invention may provide an apparatus suitable for performing a method according to any preceding aspect of the invention.

For example, the invention may provide a computer configured (e.g. programmed) to perform a method according to the first and/or second aspect of the invention.

For example, the invention may provide a mass spectrometry apparatus configured to perform a method according to the third and/or fourth aspect of the invention.

In the fifth aspect, the invention may provide:

A mass spectrometry apparatus including:

- an ion source configured to produce ions;
- a mass analyser configured to trap the ions such that the trapped ions undergo oscillatory motion in the mass analyser;
- at least one image charge/current detector for use in obtaining at least one image charge/current signals representative of trapped ions undergoing oscillatory motion in the mass analyser; and
- a computer configured to perform a method as set out in the first and/or second aspect of the invention, and/or configured to control the mass spectrum apparatus to perform a method as set out in the third and/or fourth aspect of the invention.

The apparatus may be configured to implement, or have means for implementing, any method step described above.

Preferably, the ion source is configured to produce ions, e.g. from a sample material, e.g. as described below in more detail. For example, the ion source may be configured to produce ions in a continuous or pulsed fashion, e.g. in short bunches of 1 μs or less.

The mass spectrometry apparatus may include an ion transmission or ion guide system for transferring ions from the ion source to the mass analyser, e.g. as described below in more detail.

Preferably, the mass analyser is configured to produce (e.g. using electrodes in the mass analyser) an electric and/or a magnetic field to trap ions produced by the ion source such that the trapped ions undergo oscillatory motion in the mass analyser. Preferably, the mass analyser is configured to produce a substantially static electric field (which may be referred to as an "electrostatic" field) and/or a substantially static magnetic field, e.g. a combination of substantially static electric and magnetic fields (which may be referred to as an "electromagnetostatic" field). Additionally or alternatively, the mass analyser may be configured to produce a dynamic electric field (which may be referred to as an "electrodynamic" field) and/or a dynamic magnetic field, e.g. a combination of dynamic electric and magnetic fields (which may be referred to as an "electromagnetic" field).

If the mass analyser is configured to produce an electrostatic field, the mass analyser may be viewed as an electrostatic ion trap. The electrostatic ion trap may be a linear or planar electrostatic ion trap, for example. The electrostatic ion trap (or a mass analyser of any other type) may have a plurality of image charge/current detectors. The electrostatic ion trap (or a mass analyser of any other type) may have multiple field forming electrodes at least some of which are also used as image charge/current detectors.

The electrostatic ion trap may have the form of an Orbitrap configured to use a hyper-logarithmic electric field for ion trapping, for example. A conventional Obitrap is configured to use two halves of "outer" electrodes as image charge "pick-up" electrodes, and to pick up the image charge differentially to produce only one image charge signal. However, it is possible to split the outer electrode into more sections, with each generating a respective one of a plurality of image charge/current signals, and/or for part of an inner electrode to be electrically separated and to be properly coupled to allow it to pick-up image charge signals.

If the electrostatic ion trap has the form of an Orbitrap, it preferably includes one or more pick-up electrodes that have a ring (e.g. cylindrical) shape.

The electrostatic ion trap may be a magnetic ion cyclotron resonance ion trap.

The or each image charge/current detector is preferably configured to produce an image charge/current signal representative of trapped ions undergoing oscillatory motion in the mass analyser. Image charge/current detectors are very well known in the art and typically include at least one "pick-up" electrode, and preferably also include at least one "pick-up" electrode and an amplifier (e.g. a "first stage" charge sensitive amplifier). The inclusion of an amplifier in an image charge/current detector is preferred because the amount of image charge induced by the trapped ion is normally less than the charge of the ions, varying between $10^{-19}$ to $10^{-14}$ Coulomb. Low noise charge amplifiers are commonly used to amplify the signal. Because they feature a capacitive impedance at the input, such amplifiers will generally output a signal in waveform of image charge rather than image current. The transmission parameter of this first stage amplifier and following stage amplifier may, however varies from case to case, the obtained signal waveform may vary from image charge type to image current type or any type from their derivatives.

The mass spectrometry apparatus may have a plurality of image charge/current detectors, with each image charge/current detector being configured to be used to obtain a respective image charge/current signal, e.g. as discussed below in connection with FIG. 2-FIG. 4. The plurality of image charge/current detectors may have different locations, sizes and/or shapes.

However, it is also possible for an image charge/current detector to be configured to be used to produce two or more of the plurality of image charge/current signals.

For example, an image charge/current detector could be configured to be used to obtain two or more of the plurality of image charge/current signals, with at least one of the two or more image charge/current signals being obtained by applying at least one processing algorithm to an image charge/current signal produced by the image charge/current detector. More than one of the two or more image charge/current signals could thus be obtained by applying more than one processing algorithm to an image charge/current signal produced by the image charge/current detector. Optionally, one of the two or more image charge/current signals may simply be the image charge/current signal produced by the image charge/current detector (i.e. without a processing algorithm being applied thereto).

The or each processing algorithm may be configured to modify (e.g. an absolute value of) an image charge/current signal (e.g. in the frequency domain) with phase information (e.g. a phase angle) obtained from (e.g. a ratio of an imaginary component and a real component of) the image charge/current signal. The phase information may be obtained using a Fourier transform, for example. The or each processing algorithm may be configured to modify an image charge/current signal by multiplying the absolute value of the image charge/current signal with a function of phase angle variation of the image charge/current signal, e.g. as discussed below with reference to FIG. 26. Accordingly, in some embodiments, the mass spectrometry apparatus may have only one image charge/current detector, even if a plurality of image charge/current signals are to be processed (e.g. according to a method as set out in the second aspect of this invention).

In a sixth aspect, the invention may provide:

A computer-readable medium (e.g. provided in the form of logic) having computer-executable instructions configured to cause a computer to perform a method as set out in the first and/or second aspect of the invention.

The sixth aspect of the invention may also provide:

A computer-readable medium (e.g. provided in the form of logic) having computer-executable instructions configured to control a mass spectrometry apparatus to perform a method as set out in any aspect of the invention.

The invention also includes any combination of the aspects and preferred features described above, except where such a combination is clearly impermissible or expressly avoided.

Examples of our proposals are discussed below, with reference to the accompanying drawings in which:

FIG. 1*a-c* are hypothetical plots for illustrating difficulties that can arise due to multiple harmonic components being contained in image charge/current signals.

Figure 4:
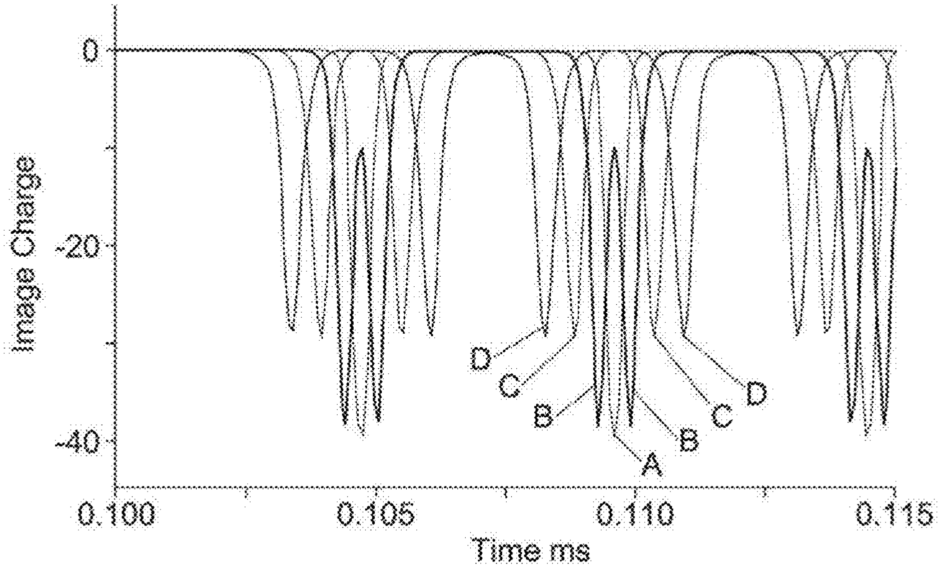
FIG. 4 shows image charge signals acquired by the four electrodes shown in the mass analyser of FIG. 3.
Figure 5A:
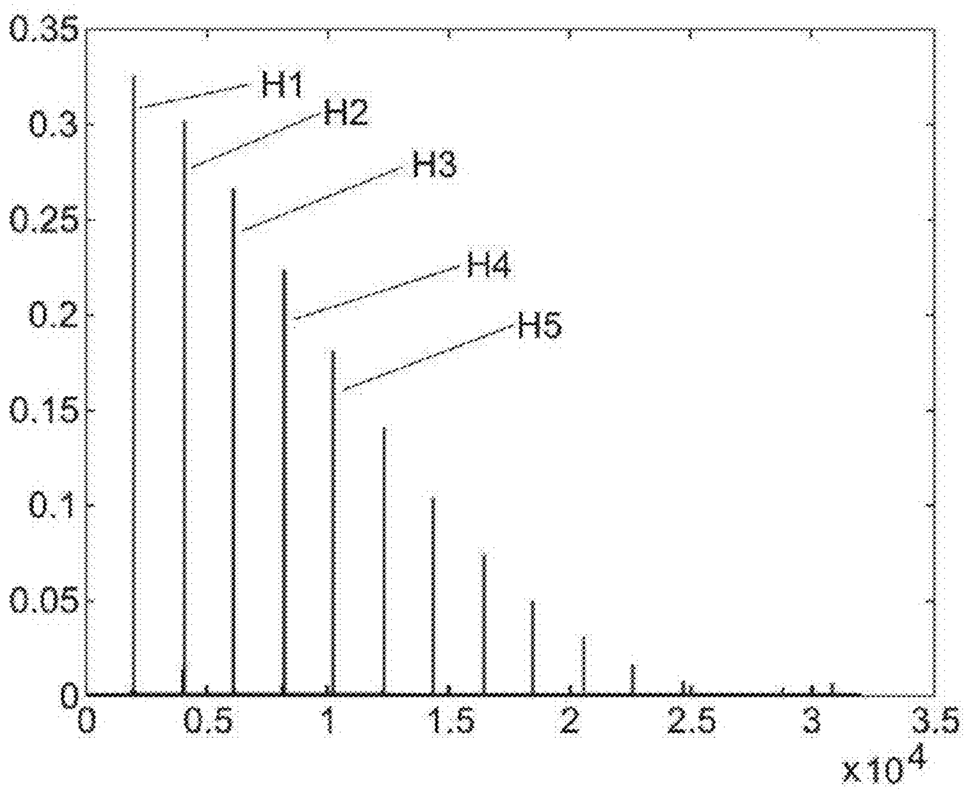
Figure 5B:
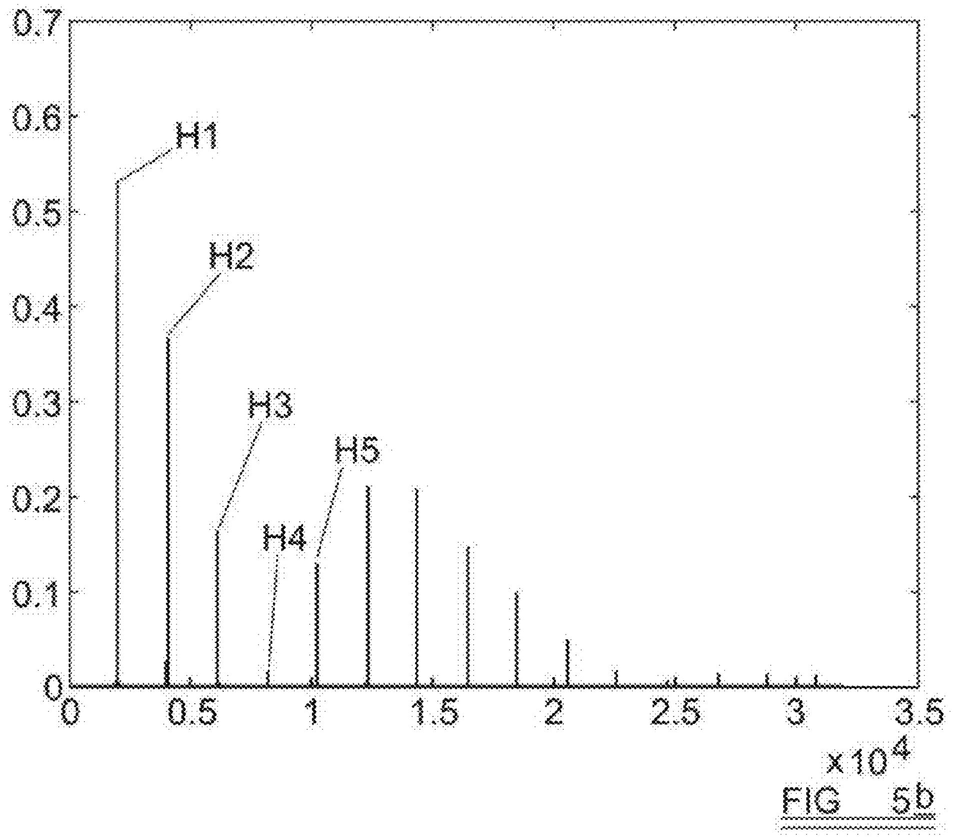

FIG. 5*a* and FIG. 5*b* shows FFTs of two of the image charge signals shown in FIG. 4.

Figure 6:
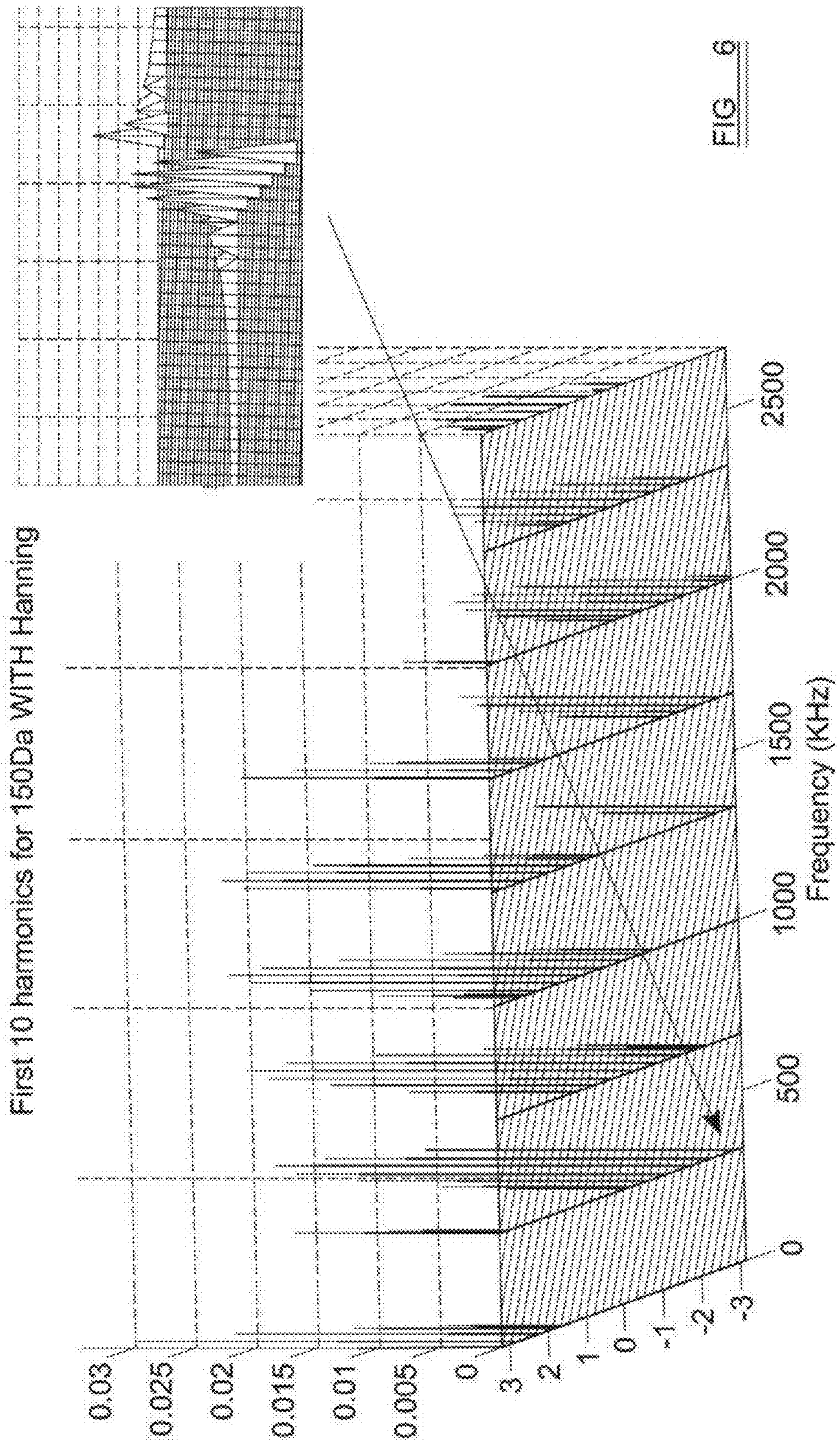

FIG. 6 is a 3D FFT plot of an image charge/current signal.

Figure 7:
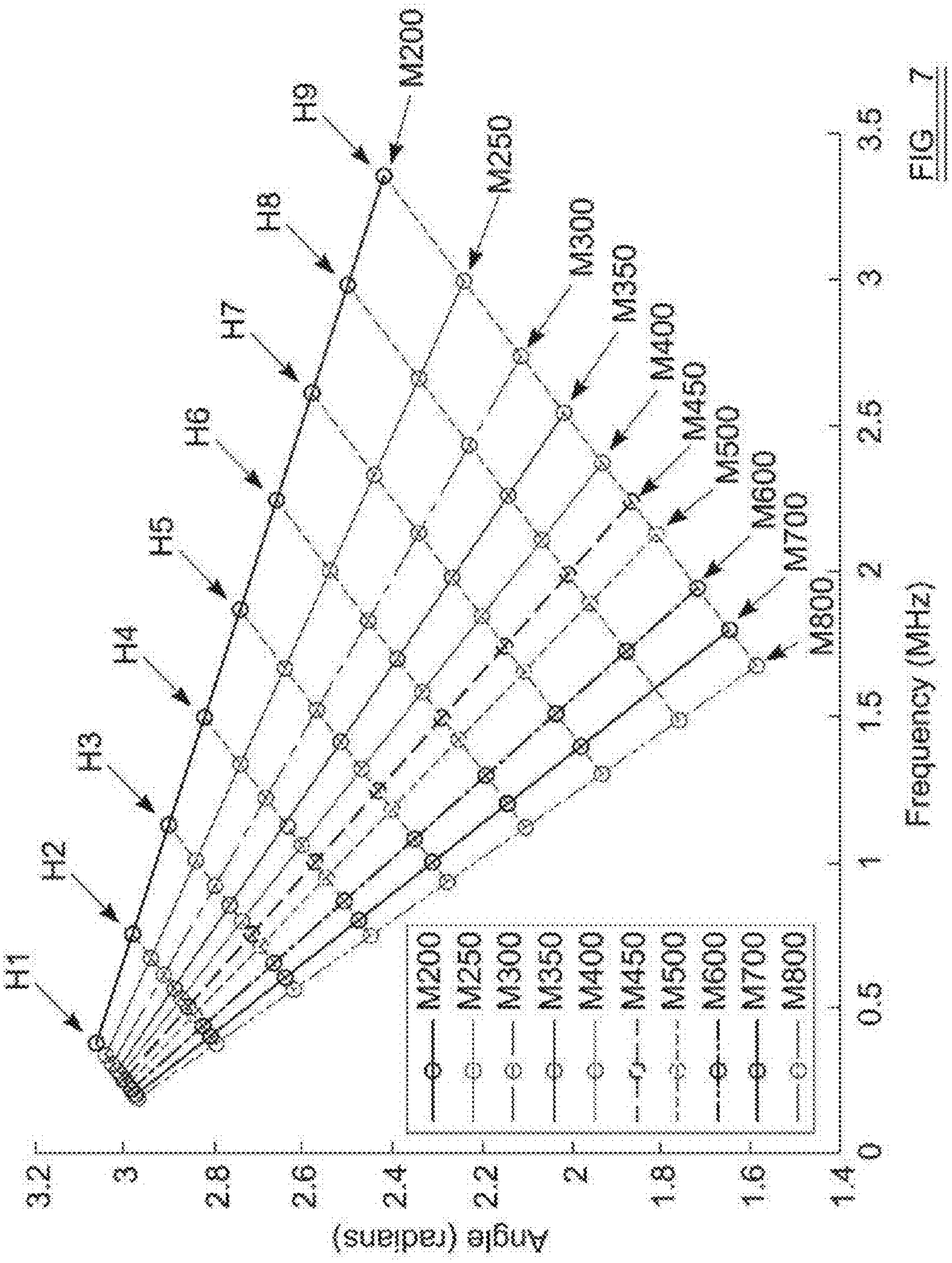

FIG. 7 is a phase net plot.

Figure 8:
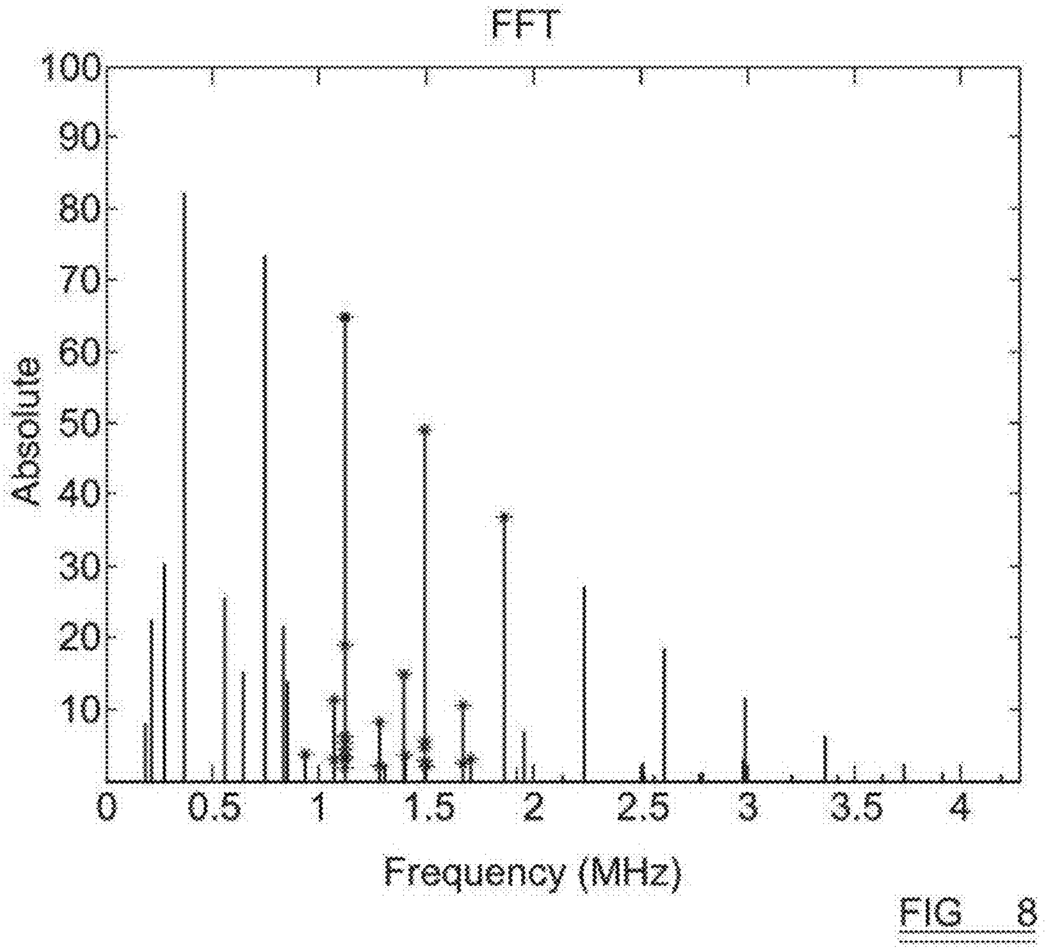

FIG. 8 is an FFT spectrum for a mixture of 7 ions.

Figure 9:
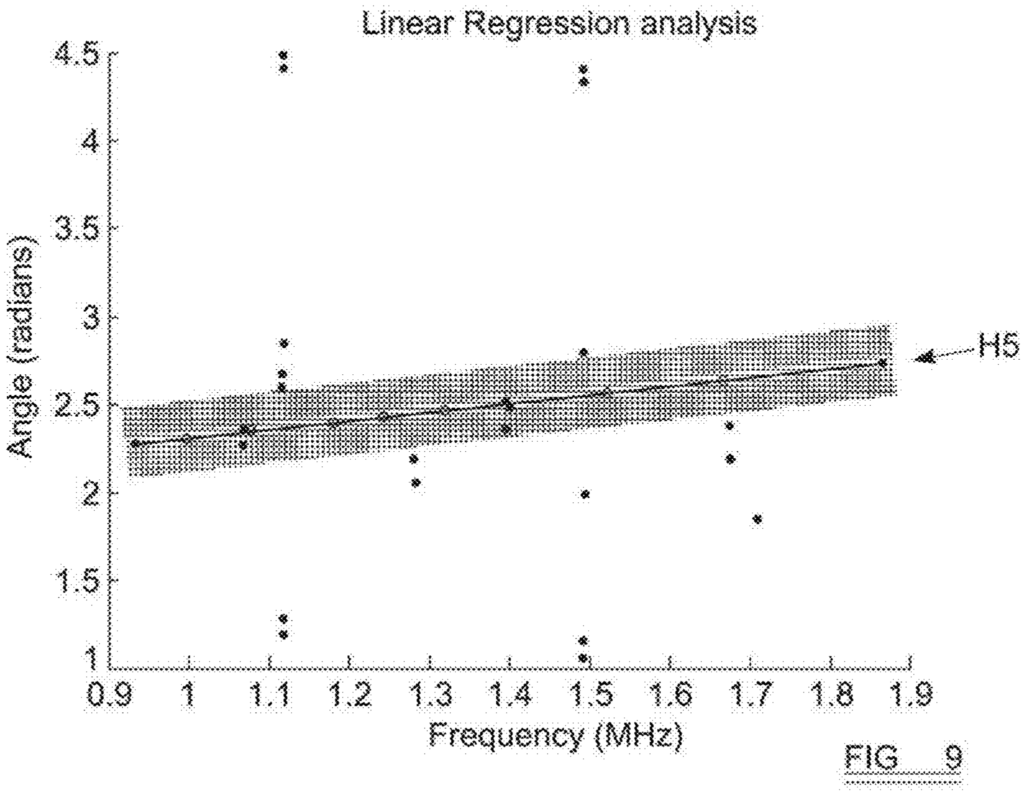

FIG. 9 is a plot of phase angle against frequency for the FFT spectrum shown in FIG. 8.

Figure 10:
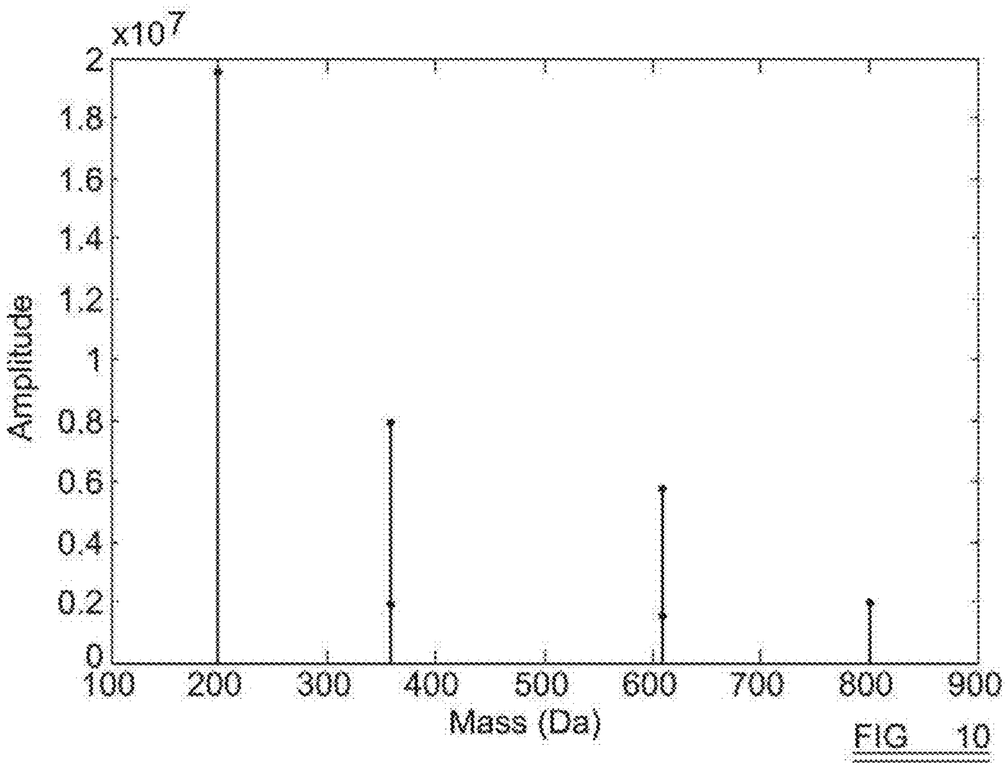

FIG. 10 is a mass spectrum formed from peaks passing a validity test.

Figure 11A:
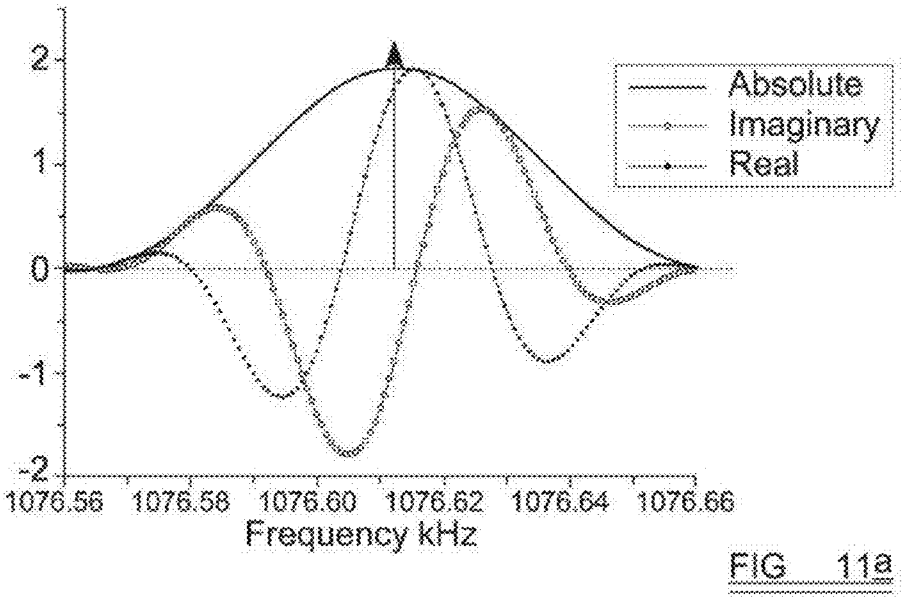
Figure 11B:
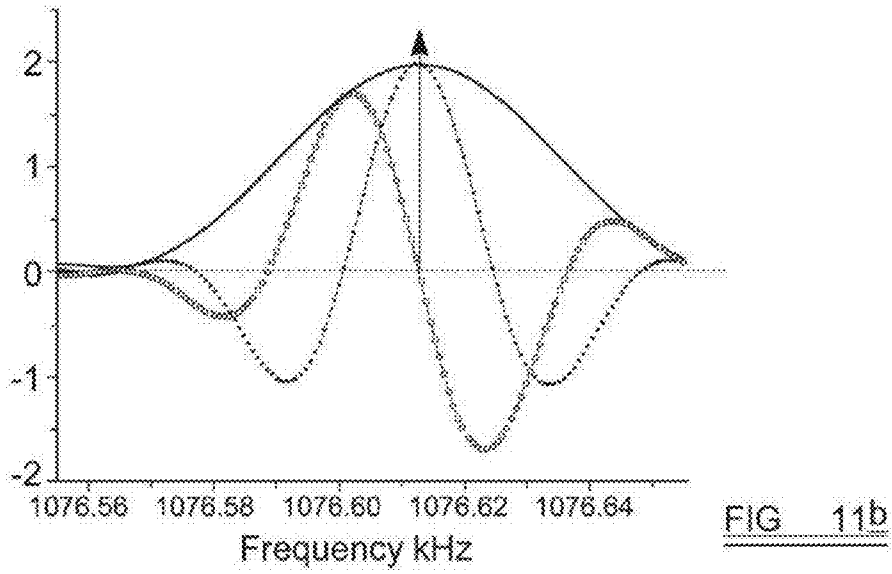
Figure 11C:
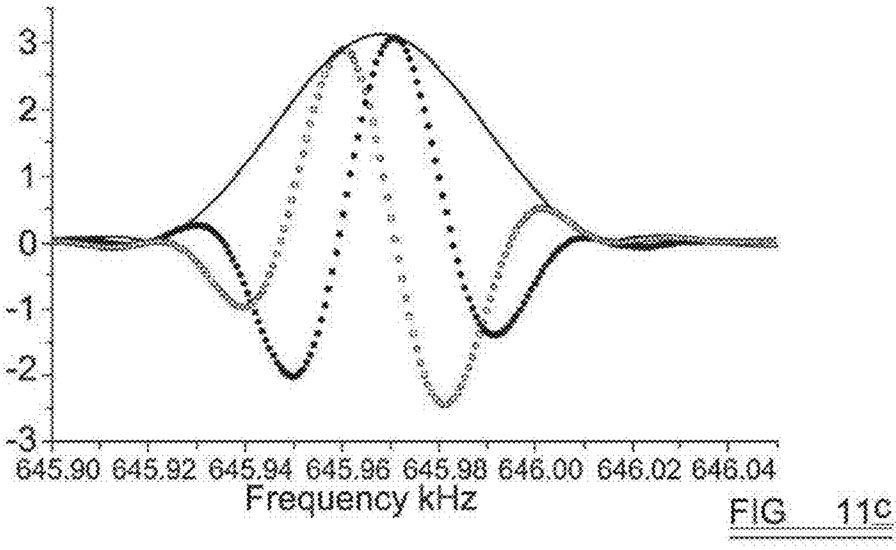

FIG. 11*a-c* show peak profiles with absolute real and imaginary values before and after a phase angle rotation.

Figure 12:
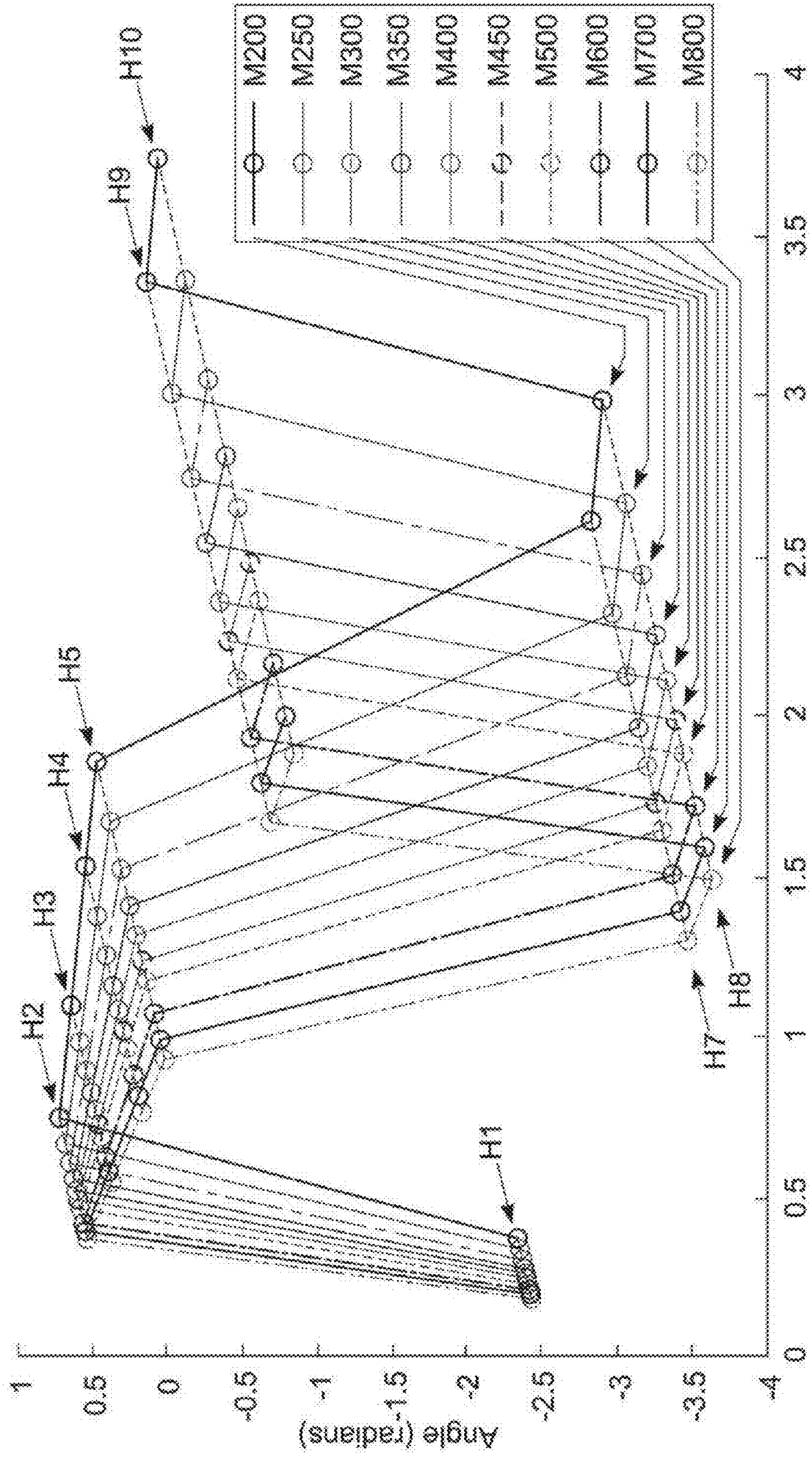

FIG. 12 shows a re-arranged phase net that has been created by eliminating the sixth harmonic using a "linear combination" method as described in the Annex to this document.

FIG. 13 to FIG. 23 relate to technical background, discussed below.

FIG. 24 to FIG. 30 relate to a linear combination method described in the Annex to this document.

In general, the following discussion describes examples of our proposals that relate to a finding by the present inventors that, when the initial motion state of charged particles can be determined, the phase angle at the peak point of one harmonic order at the frequency spectrum is related to the frequency, with this relationship being different for different harmonic orders. The present inventors realised that if such a relationship for a certain harmonic order can be found, then this information can be used to identify the peaks of this harmonic order from among the peaks of all other harmonic orders.

In some embodiments, there may be described a method for, acquiring a frequency spectrum of particle motion, the method comprising:

- acquiring a signal induced by a periodical motion of measured particles with a controllable condition at an initial timing;
- applying a Fourier transform to the signal with a fixed starting time reference to the initial timing and obtaining a frequency spectrum (preferably in a complex format) including peaks at the multiple harmonic frequencies of the particle motion;
- applying a validity test to the phase at each peak of a range of peaks in the frequency spectrum;
- recording a signal for the peaks that pass the test and discarding the signal of the peaks that fail the test.

In some embodiments, the validity test for the phase may include:

- finding all peaks within a frequency range of interest and calculating the phase at the peak point;
- one by one checking if the phase angle of the peak falls into the predetermined relation associated with a certain harmonic order with a set tolerance In other embodiments, the method may include rotating the phase of said frequency spectrum (preferably in a complex format) by an angle according to a predetermined phase-frequency relation and the validity test for the phase may include finding all peaks within a frequency range of interest, and one by one checking if the phase angle reaches zero with a set tolerance.

The above checking if the phase angle reaches zero may be done by checking if the imaginary part of complex number of the frequency spectrum reaches zero near the peak point.

In some embodiments, the recording signal of the peaks that validate the test only applies to recording the real part of the spectrum signal.

In some embodiments, the phase-frequency relation for each harmonic order is obtained by using a group of known ions with their masses across the mass range of the mass analyser in pre-run steps.

In some embodiments, polynomial fitting or interpolation may be used for accurately determine the phase angle value at the peak point.

In some embodiments, multiple predetermined phase-frequency relations are used for the validity test, each resulting in recording one frequency spectrum associated with one harmonic number. The resulting multiple frequency spectrum may be compared to determine the errors occurred in individual spectra.

In some embodiments, the periodic motion of ion was sustained in the field of an ion trap mass analyser In some embodiments, the ion trap is an electrostatic ion trap In some embodiments, the ion trap is a planar electrostatic ion trap with multiple pick-up electrodes.

In some embodiments, the ion trap is a modified orbital electrostatic ion trap with cylindrical ring type pick-up electrodes.

In some embodiments, the ion trap is a magnetic ion cyclotron resonant ion trap.

Herein, mass/charge ratios are normally expressed in units of Thompson (Th), where 1 Th=1 u/e, where u represents the unified atomic mass unit ($1.661\times10^{-27}$ kg to four significant figures) and e represents the elementary charge (the charge of a proton, $1.602\times10^{-19}$ coulombs to four significant figures).

Figure 1A:
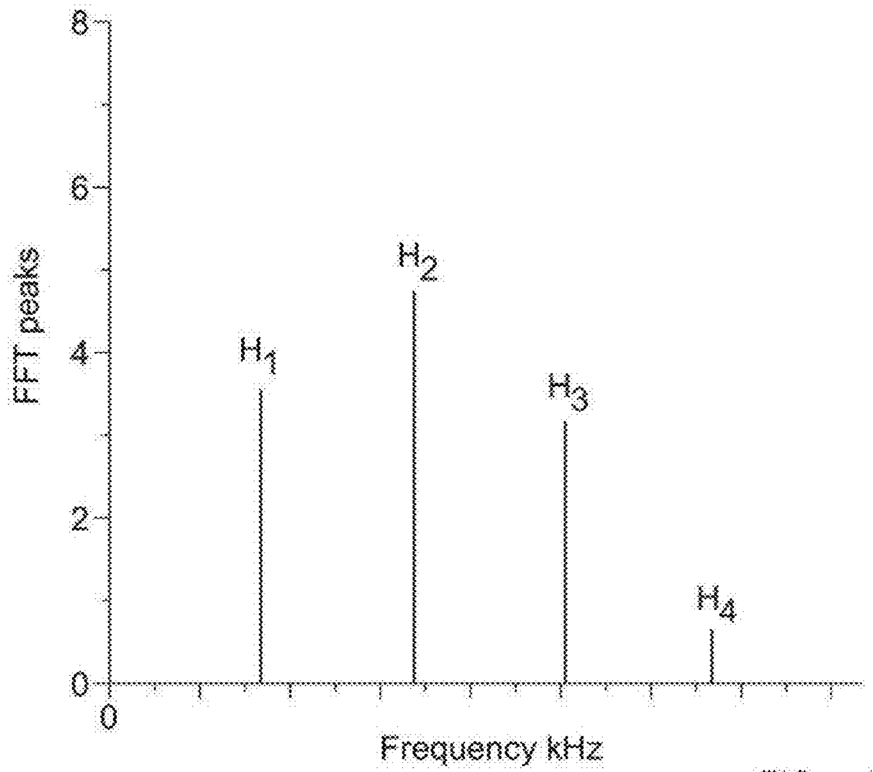

FIG. 1*a* shows an FFT of an image charge/current signal representative of trapped ions undergoing oscillatory motion, where the trapped ions have only one mass/charge ratio. The FFT has converted the image charge/current signal from the time domain to the frequency domain, such that FFT plot can be viewed as mass spectrum data providing information regarding the mass/charge ratio distribution of the ions having only one mass/charge ratio.

Figure 1B:
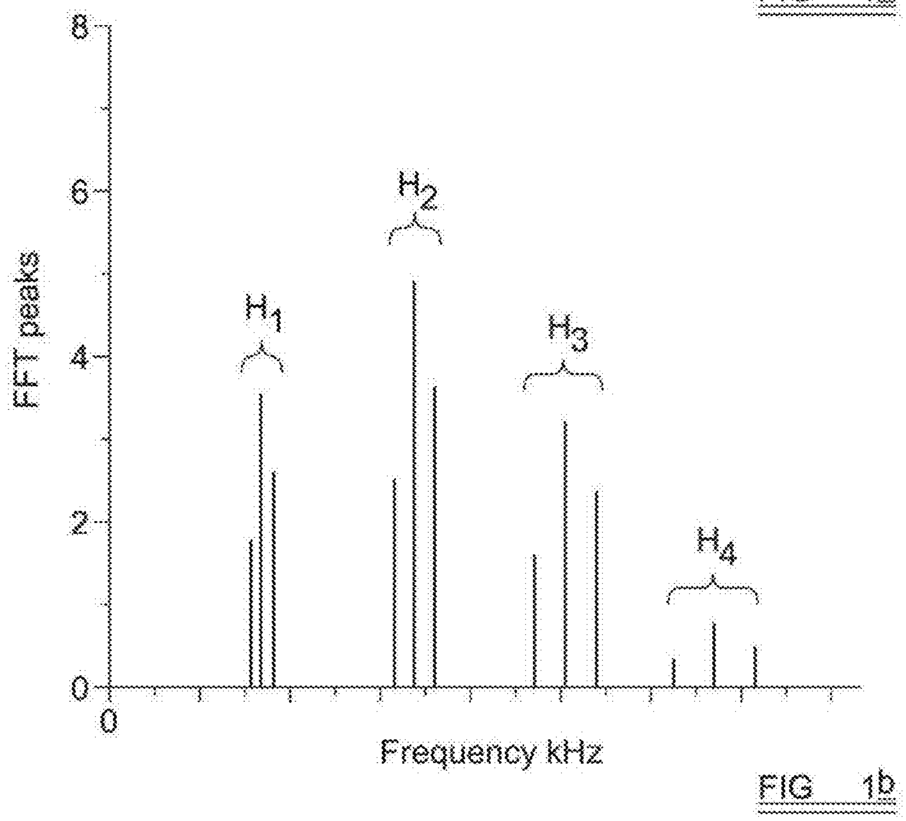
Figure 1C:
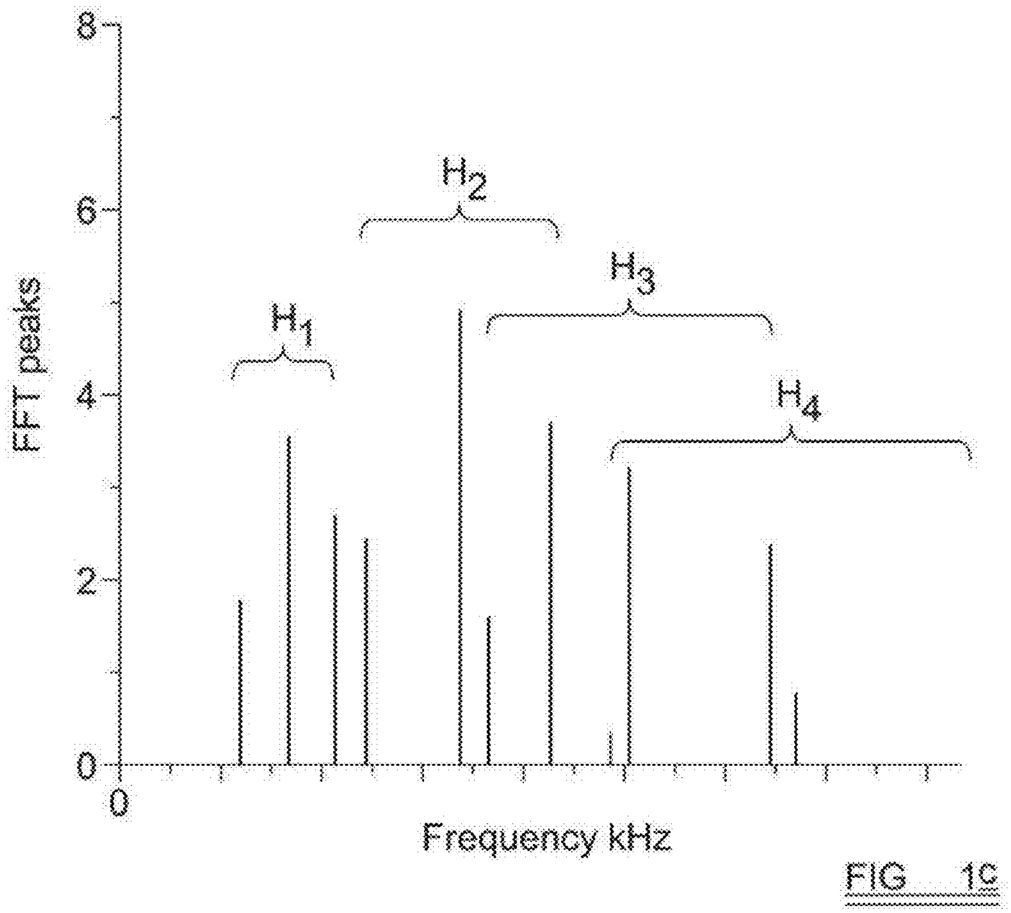

For the avoidance of any doubt, it should be appreciated that FIG. 1*a-c* are hypothetical plots that have not been drawn to scale, and are provided for illustrative purposes.

A number of harmonic components of the image charge/current signal can easily be identified in FIG. 1*a*, because the ions have only one mass/charge ratio, meaning that each harmonic component is expressed as a single harmonic peak. The first (or "primary") harmonic component caused by the ions is expressed as a first harmonic peak $H_1$ occurring at a frequency of $f_0$=335 Hz. The second harmonic component caused by the ions is expressed as a second harmonic peak $H_2$ occurring at a frequency of $2f_0$=770 Hz. The third harmonic component caused by the ions is expressed as a third harmonic peak $H_3$ occurring at a frequency of $3f_0$=1105 Hz. The fourth harmonic component caused by the ions is expressed as a fourth harmonic peak $H_4$ occurring at a frequency of $4f_0$=1440 Hz. Fifth and higher order harmonic components caused by the ions would be expressed as fifth and higher order harmonic peaks at higher multiples of the fundamental frequency $f_0$ (the frequency at which the first harmonic peak occurs).

FIG. 1*b* shows an FFT of an image charge/current signal representative of trapped ions undergoing oscillatory motion, where the trapped ions have three closely spaced mass/charge ratios (approximately ±7% relative to a central mass/charge ratio). Again, the FFT has converted the image charge/current signal from the time domain to the frequency domain, such that FFT plot can be viewed as mass spectrum data providing information regarding the mass/charge ratio distribution of the ions having three closely spaced mass/charge ratios.

A number of harmonic components of the image charge/current signal can easily be identified in FIG. 1*b*, because the ions have a narrow range of mass/charge ratios, meaning that each harmonic component is expressed as a set of three closely spaced harmonic peaks.

Because different harmonic components can easily be identified in FIG. 1*a* and FIG. 1*b*, it is easy to obtain information regarding the mass/charge ratio distribution of the ions using FIG. 1*a* and FIG. 1*b*.

FIG. 1*c* shows an FFT of a hypothetical image charge/current signal representative of trapped ions undergoing oscillatory motion, where the trapped ions have three widely spaced mass/charge ratios (approximately ±30% relative to a central mass/charge ratio). Again, the FFT has converted the image charge/current signal from the time domain to the frequency domain, such that FFT plot can be viewed as mass spectrum data providing information regarding the mass/charge ratio distribution of the ions having three widely spaced mass/charge ratios.

Different harmonic components of the image charge/current signal are difficult to identify in FIG. 1*c*, compared with FIG. 1*a* and FIG. 1*b*, because the ions have a wide range of mass/charge ratios, meaning that each harmonic component is expressed as three widely spaced harmonic peaks, some of which overlap with other harmonic peaks.

Because of the overlapping harmonic peaks in FIG. 1*c*, it is difficult to obtain information regarding the mass/charge ratio distribution of the ions using FIG. 1*c*.

Of course, FIG. 1*c* is only a hypothetical plot. In reality, it is normal for an image charge/current signal to be representative of trapped ions undergoing oscillatory motion, where the trapped ions have many more than three mass/charge ratios that are spread over a wider range of mass/charge ratios. In these conditions, it becomes very difficult to obtain useful information regarding the mass/charge ratio distribution of the ions.

One way to address these difficulties is to limit the range of mass/charge ratios of the ions used to obtain the image charge/current signals, e.g. such that the mass/charge ratios of the ions used to obtain the image charge/current signals do not vary by more than 10%. This can help to avoid overlap between the peaks belonging to each harmonic component in the frequency domain (compare FIG. 1*b* with FIG. 1*c*) but is burdensome, as it severely limits the range of mass/charge ratios that can be studied per image charge/current signal obtained.

Another way to address these difficulties, without having to limit the range of mass/charge ratios of the ions, is to use computational methods to acquire useful information regarding the mass/charge ratio of the ions from the image charge/current signals. Computational methods have been developed which are able to utilise the information provided by each harmonic component in an image charge/current signal, see e.g. the "orthogonal projection" method referred to above. However, existing computational methods tend to be computationally intensive, such that they are not necessarily practical for all (e.g. online) applications.

Figure 2:
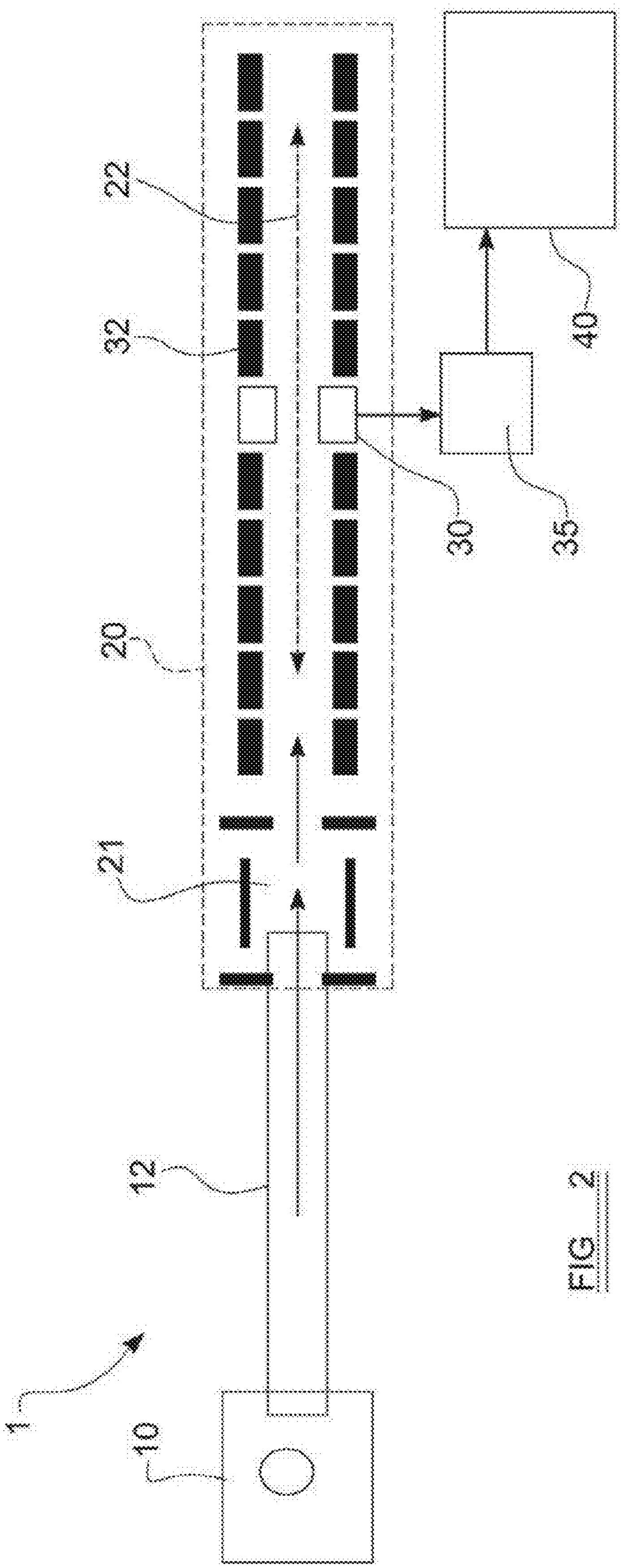
FIG. 2 is a schematic diagram of an ion trap mass spectrometer.

FIG. 2 is a schematic diagram of an ion trap mass spectrometer 1.

The ion trap mass spectrometer 1 preferably has an ion source 10, an ion transmission or ion guide system 12, a mass analyser 20 and a processing apparatus 40. The mass analyser may include or be attached to an ion injector 21 and at least one image charge/current detector 30.

Preferably, the ion source 10 is configured to produce ions, e.g. from a sample material. Preferably, the ions can be produced by the ion source in a continuous or pulsed fashion, e.g. in short bunches of 1 μs or less. For example, the ion source 10 may be a continuous electrospray ion source or a pulsed MALDI ion source. Ions produced in the ion source are preferably transferred from the ion source 10 to the mass analyser 20 through the ion transmission or ion guide system 12 which may e.g. contain an RF focusing lens, collisional cooling and/or an orifice to bridge different degrees of vacuums. Ions may be temporarily stored in or made to travel along the ion injector 21 which is preferably configured to pulse the ions into a mass analysis region of the mass analyser 20. In some embodiments, the ion source 10 may be located inside the mass analyser 20.

The mass analyser 20 is preferably configured to trap ions produced by the ion source 10 such that the trapped ions undergo oscillatory motion in the mass analyser 20, e.g. backwards and forwards along a linear path 22 or in looped orbits. Preferably, the mass analyser 20 is configured to produce (e.g. using electrodes 32 arranged in one or more electrode arrays in the mass analyser 20) an electromagnetostatic field, preferably an electrostatic field, to trap ions produced by the ion source 10, preferably after they have been injected by the ion injector 21, preferably such that the trapped ions undergo oscillatory motion in the mass analyser 20. Preferably, the electrostatic field is configured to allow ions to achieve isochronous oscillation, e.g. such that ions of a given mass to charge ratio oscillate with a constant frequency even if there is a spread in their kinetic energies. It is also preferable to configure the electrostatic field to confine the ion path to a centre axis or a centre plane of the analysis region, so that ion can fly a long period of time without spreading out or getting lost. Such techniques are known in the art.

The or each image charge/current detector 30 is preferably configured to (e.g. by being connected to a "first stage" charge sensitive amplifier 35) produce an image charge/current signal representative of trapped ions undergoing oscillatory motion in the mass analyser 20.

Image charge/current detectors are very well known in the art and typically include at least one "pick-up" electrode, which may have the shape of a cylinder or ring and an amplifier (such as the "first stage" charge sensitive amplifier 35).

Preferably, at least one analogue to digital converter (not shown) is used to convert the at least one analogue image charge/current signal (produced by the at least one image charge/current detector as amplified by its charge sensitive amplifier) into at least one digital image charge/current signal. This is advantageous e.g. if the processing apparatus 40 is configured to handle digital signals, e.g. as would usually be the case if the processing apparatus 40 included a computer.

The processing apparatus 40, which may include or be a computer, is preferably configured to perform a method as set out in the first and/or second aspect of the invention (described above), and/or configured to control the mass spectrometer 1 to perform a method as set out in the third and/or fourth aspect of the invention (described above). Specific examples implementing such methods are described in detail below.

Figure 3:
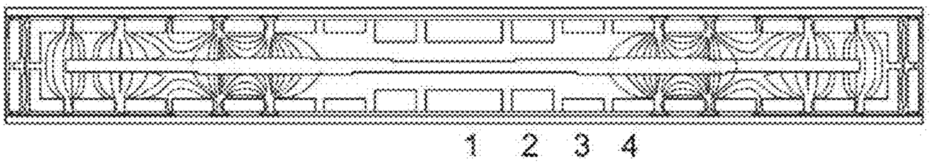
FIG. 3 shows an example of electrostatic ion trap mass analyser, e.g. for use in the ion trap mass spectrometer of FIG. 2.

FIG. 3 shows an example of electrostatic ion trap mass analyser, e.g. for use in the ion trap mass spectrometer 1 of FIG. 2.

In the mass analyser of FIG. 3, ions to be analysed preferably fly about a central plane in a repetitive way for thousands of cycles. Ions with different mass oscillate at different frequency. When they pass through the electrodes 1, 2, 3, 4, which are used as pick-up electrodes, they generate an image charge in these electrodes and they can be detected in form of image charge/current signals.

Some electrodes may, in use, have a high voltage applied thereto, and therefore might not be suitable for use as a pick up electrode. From a technical perspective, it is preferred to use fewer pick-up electrodes, since each pick-up electrode usually needs a set of low noise amplifiers to amplify the signal picked up.

The image charge or image current signals picked up by the pick-up electrodes, although being periodic according to the oscillation frequency of the ion, are in general not sinusoidal. Depend on the size and location of the pick-up electrodes, they form certain distinct waveform patterns, as shown in FIG. 4, in which:

the signal picked up by electrode 1 of the mass analyser shown in FIG. 3 is labelled A;

the signal picked up by electrode 2 of the mass analyser shown in FIG. 3 is labelled B;

the signal picked up by electrode 3 of the mass analyser shown in FIG. 3 is labelled C;

the signal picked up by electrode 4 of the mass analyser shown in FIG. 3 is labelled D.

The waveforms shown in FIG. 4 were produced by simulation, with reference ions oscillating in the mass analyser of FIG. 3 all having the same mass/charge ratio.

As can be seen from FIG. 4, the waveforms from different pick-up electrodes, and their derivatives, have the same repetition frequency but different shapes.

When a Fourier Transform is applied to these signals, even if the reference ions have the same mass/charge ratio (as depicted in FIG. 4), all frequency domain signals generally have same fundamental frequency component and same gaps between every higher order harmonic peaks. This is demonstrated by FIG. 5*a* and FIG. 5*b*, in which:

FIG. 5*a* shows an FFT of the image charge signal picked up by electrode 1 of FIG. 4 (the signal labelled A in FIG. 4);

FIG. 5*b* shows an FFT of the image charge signal picked up by electrode 2 of FIG. 4 (the signal labelled B in FIG. 4).

As can be seen from FIG. 5*a* and FIG. 5*b*, the ratio between different harmonic peaks is dependent on the electrode size, shape and location, as well as their order of derivation. For example, the ratio of peak height as calculated between FIG. 5*a* and FIG. 5*b* is different for each of the first harmonic (H1), second harmonic (H2), third harmonic (H3), fourth harmonic (H4) and fifth harmonic (H5) peaks labelled in the plots of FIG. 5*a* and FIG. 5*b*.

A known example of an electrostatic ion trap mass spectrometer is the "Orbitrap", developed by Alexander Makarov. In an Orbitrap, ions trapped by an electrostatic field cycle around a central electrode in spiral trajectories. An example of a modified Orbitrap structure, where multiple cylindrical rings are used for outer electrodes, is shown in FIG. 9 of US patent application 2008/203293.

There have been proposals to further modify the modified Orbitrap structure shown in FIG. 9 of US patent application 2008/203293, by applying adjustable voltages on the split outer electrode array so as to optimise the field in the trapping space between the inner electrode and outer electrode array. This further modified structure is thought by the present inventors to have an additional advantage, in that image charge/current signals could be picked up using selected outer ring electrode(s) as pick-up electrode(s). It is known that current Orbitraps designs can give a wrong isotope ratio when the number of ions flying inside increases to certain level. It is thought that the cause of this issue is space-charge interaction between closed masses, which tends to push the lighter ions to higher energy oscillation orbit and heavier ions to lower oscillation orbit. When using the hollow spindle shaped outer electrodes for image charge/current pick-up, the lighter ions will give higher signal than the heavier ions. Such an effect of uneven response could be reduced if pick-up electrodes having a cylindrical (or "ring") shape were used, such that the change in amplitude of oscillatory motion of ions would have limited influence in amplitude of the image charge signal. Ideally, the amplitude of the image charge signal would be independent of the amplitude of oscillatory motion of ions, but such independence might not be achievable event with the further modified Orbitrap structure described above. However, any dependence between the amplitude of the image charge signal on the amplitude of oscillatory motion for the further modified Orbitrap structure should be limited, and it is thought that such limited dependence could be further compensated by using multiple pick-up electrodes with different axial positions to obtain multiple image charge signals, and intelligently combining those multiple image charge current signals. Notwithstanding the above, the use of outer ring electrode(s) as pick-up electrode(s) will cause the image charge signal being non-harmonic, which means that for single ion oscillation frequency, multiple harmonic peaks would exist in a frequency spectrum obtained with Fourier transform. However, the methods taught herein are able to address problems caused by the existence of multiple harmonic peaks, thereby making such an arrangement feasible.

Example Methods

The present inventors have devised methods of acquiring a frequency spectrum that precludes unwanted harmonic peaks based on the identification of phase angle in the complex FFT signals. The following description sets out examples of these methods.

FIG. 6 shows a 3D FFT plot of an image charge signal produced by a 150 Th mass, as picked up by electrode 1 in the mass analyser of FIG. 3. Instead of normal 2D display of magnitude with frequency, this plot shows the magnitude (as height of each bar) change with frequency as well as phase angle in 3D. The present inventors have found that peaks belonging to each harmonic component have a particular range of phase angles, as well as having different frequencies. The present inventors do not wish to be bound by theory, but believe that dependence of phase angle on the harmonic order is determined by the manner of ion injection to the mass analyser, which in this case is a planar electrostatic ion trap ("PEIT").

Calibration Method

In order to obtain a phase angle distribution for peaks belonging to different harmonic components, reference ions with a group of 10 different (known) mass/charge ratios were used. Before calibration, instrument parameters such as the voltages applied to the trap, the injection gating voltages and their timing were fixed. With conditions fixed, the reference ions of 10 different mass/charge ratios were injected and their image charge signals measured one by one. To each signal transient (i.e. to each image charge signal in the time domain), a process of Fourier transform was applied to provide an image charge signal in the frequency domain. This conversion process included multiplying with window function (apodization), with zero-filling being kept the same for every conversion process. The conversion processes resulted in 10 complex frequency spectra (each of these spectra can be viewed as an image charge signal in the frequency domain), one for each mass in the group. The phase angle $\theta$ for the first nine harmonic peaks in the ten spectra were calculated using formula $\theta=\arctan(Im/Re)$ (Im=imaginary component, Re=real component), with the sign of Re being taken into account in order to allow the range of phase angle $\theta$ to be from 0 to $2\pi$.

The inventors have found that the peak position (frequency at which each peak occurs, which corresponds to mass/charge ratio) has some influence on the calculated phase angles. The frequency spectrum is formed by discrete data, so the peak is not always hitting on the frequency step values, in which case the peak may lay between two data points. Also the data may contain some noise so the phase angle of the peak top may be affected if only the data at the peak top point is used. In order to precisely determine the phase angle at the peak top, for each peak, polynomial interpolation or fitting can be used to determine the phase value of the peak point. For example we identified the highest 3 points, each point containing the phase angle and amplitude information. Then, a quadratic equation can be used to fit the intensity-angle relation according to the equation:

$$I=a\alpha^2+b\alpha+c \qquad [1.0]$$

where $\alpha$ represents the phase angle as variable, and I is the intensity. The coefficients a, b, and c can be obtained by solving a group of 3 linear equations. Then, the optimal modified angle for the peak can be calculated as $\hat{\alpha}=-b/2a$.

Next, the values of phase angle ($\theta$) and frequency at the peak point were plotted for the ten masses and first nine harmonics, to produce the plot shown in FIG. 7, which may be referred to as a "phase net" herein. In the phase net, solid connecting lines have been used for each of the ten masses and dotted connecting lines have been used for each of the nine harmonic orders.

The phase net is able to give the phase angle of peaks for a selected harmonic order as a function of frequency. As such, each dotted line in the phase net can be viewed as showing a relationship between phase angle and frequency that corresponds to a selected harmonic component of the image charge/current signal.

It is noted that a phase net may vary its shape if a different pick-up electrode is used, but for a given pick-up electrode and a given set of injection (and/or excitation) conditions, it will generally stay the same (i.e. not change). This property means that once a relationship between phase angle and frequency that corresponds to a selected harmonic component has been determined from an image charge/current signal produced using ions of known mass, that relationship can then be used to identify peaks corresponding to the selected harmonic component, e.g. using a validity test as set out below.

In the phase net shown in FIG. 7, the phase angle varies with mass according to a linear trend for each harmonic component, with different harmonics follows different linear trends, as shown by the dashed lines. These lines, which are not always necessarily linear, can be fitted to functions (e.g. polynomial functions) for later use, e.g. in the validity tests described below. In some case these functions are approximately linear and by careful selection of signal starting point in reference to the ion initial timing, these lines may even be parallel to the frequency axis. In such cases, the phase at the peak could be a constant for each harmonic order and this constant could be obtained using a suitable calibration process.

Signal Acquisition

Now after obtaining the phase-frequency relation for each harmonic order, the "real" acquisition of image charge/current signals, i.e. obtaining image charge/current signals using ions whose mass/charge ratio(s) are not known, can begin.

In "real" acquisition, the ion trap conditions are preferably kept the same (or as close as possible) to the conditions during the calibration procedure described above. Also, when signal of image charge of the ions of unknown mass/charge ratio(s) was acquired, the same FFT is preferably applied. This preferably includes the same apodization and zero-filling. After the FFT data has been obtained in a complex format, all the peaks within a frequency range are preferably identified and their phase angles calculated, e.g. in the manner described previously.

For the purposes of this example, the fifth harmonic was selected as the harmonic of interest, for the purposes of forming a new image charge/current signal in the frequency domain (i.e. for forming a new frequency spectrum). So we will firstly determine the frequency range associated with the fifth harmonic frequency to be used as the frequency range of interest (which can equally be referred to as the "mass range" of interest). We then use the phase-frequency relationship determined for the fifth harmonic and set a tolerance band (e.g. $\pm\theta_1$) around the phase angles provided by the phase-frequency relationship.

Two validity tests were used to form the new image charge/current signal: "validity test A" and "validity test B".

Validity Test A

For each peak point in the frequency range of interest, the phase angle value was calculated. The calculation included the polynomial interpolation mentioned above for precise determination of phase angle value at the peak. If the calculated phase fell into the tolerance band either side of a phase angle value provided by the phase-frequency relationship determined for the fifth harmonic, the peak was judged to pass the validity test. The peak profile (a portion of the image charge signal corresponding to the peak, which is preferably not just the peak value) was copied to a new data set to form a new ("modified") image charge signal. If the validity test was failed, a peak is judged not to belong to the fifth harmonic, so the whole peak profile for this peak was discarded. In this example, the zero values were filled into the new image charge signal for peaks failing the validity test. Such process was continued until the validity test was applied to all of the peaks in the frequency range of interest.

FIG. 8 is the FFT spectrum (image charge/current signal in the frequency domain) for a mixture of 7 ions. The dots located at the top of certain peaks highlight the peaks in a selected frequency range of interest which should be occupied by the peaks caused by the 7 masses belonging to the fifth harmonic.

In FIG. 9, the highlighted peaks from FIG. 8 are displayed in a frequency-phase 2D plane. Also shown on FIG. 9 is the phase-frequency relationship for the fifth harmonic (the line labelled H5, which corresponds to the dotted line labelled H5 in FIG. 7) and the tolerance band$\pm\theta_1$ (the dotted area around the line labelled H5). Only peaks whose phase angle falls inside the tolerance band were judged to pass the validity test.

Next, the portions of the image charge/current signal ("peak profiles") corresponding to the peaks passing the validity test were copied and used to form a new mass spectrum, as shown in FIG. 10.

Validity Test B

This test is based on an observation by the present inventors that the Fourier transform of the image charge current signal F(f) is a function of frequency and can be represented in phasor notation as:

$$F(f)=A(f)\times e^{i\phi(f)}.$$

As has already been shown under the heading "Calibration" above, it is possible to determine phase angle as a function of frequency for a selected nth harmonic component, i.e. as $\phi_n$(f)).

By modifying the Fourier transform of the image charge current signal F(f) by the negative imaginary exponent of this function, $e{-i\phi^{n(f)}}$, one obtains:

$$F(f)e{=-i\phi^{n(f)}}=A(f)e^{i(\phi(f)-\phi_n(f))}$$

It follows that for peaks corresponding to the selected nth harmonic:

$$\phi(f)-\phi_n(f)=0$$

So the effect of multiplying the image charge/current signal by $e-i\phi^{n(f)}$ is to rotate the phase angle of all peaks corresponding to the nth harmonic to have a rotated phase angle of 0, whilst other peaks will be rotated to have non-zero rotated phase angles. The phase angle of a peak, as rotated by $e^{-i\Phi_n(f)}$, can then be used to determine whether that peak belongs to the fifth harmonic, depending on whether it is equal to zero within a predetermined tolerance.

Applying this theory to the mass image charge/current signal shown in FIG. 8, for each peak point in the chosen frequency range of interest, the phase value is subtracted by the phase value associated with the fifth harmonic obtained in calibration process. This value corresponds to $\phi_5(f)$. This means that the phase of said complex frequency spectrum is rotated back by an angle according to a predetermined phase-frequency relationship for peaks belonging to the fifth harmonic order. This also equivalents to multiply the complex spectrum of FFT of mixture ions by the negative imaginary exponent of the phase angle function for fifth harmonic, i.e. by $e^{-i\Phi_5(f)}$.

After this process the peaks belonging to the fifth harmonic in the spectrum should have zero phase unless they are interacted by other peaks or noise. The validity test can check if the phase angle, as rotated, is zero with a set tolerance. The validation process could be designed to check whether the imaginary part at the frequency at which the peak occurs crosses the zero line at or in adjacent of the peak point. If yes, the peak can be determined to belong to the fifth harmonic and the peak profile should be recorded in the modified spectrum. Otherwise it should be discarded.

FIG. 11*a* shows the fifth harmonic peaks in absolute value (solid line), imaginary (line with hollow dots) and real (line with solid dots) components before any phase angle-rotation.

FIG. 11 *b* shows the same fifth harmonic peaks after the angle rotation by $e^{-i\Phi_5(f)}$. The real component is symmetrical around the peak and the imaginary component is crossing the zero line at the peak point (i.e. a zero phase angle at the peak point).

FIG. 11*c* shows the third harmonic peaks after the angle rotation by $e^{-i\Phi_5(f)}$. The imaginary component does not crossing the zero line at the peak point (i.e. a non-zero phase angle at the peak point).

It is further preferred that, when record the validated peak profile, only the real part of the complex spectrum data is recorded. Because after the rotating process, the real part of spectrum signal contained only the absorption mode of signal which gives better peak shape and resolution.

Although the procedures described above uses the example of retaining the fifth harmonic peak of different masses, such procedures could easily be repeated to acquire several spectra each with a different harmonic order. The resulting several spectra can then be compared to determine whether any of the spectra contain any errors.

In signal processing when two peaks are closed to each other, especially in case that one peak is much higher than another, the tail of one peak may interrupt the validity to the phase of the other peak. This is one of the reasons that could potentially cause the error judgement in applying a validity test.

If peaks that are close to each other are of the same harmonic order, this may be because the masses causing the peaks are very close to each other. However, it is observed that peaks caused by different masses are more widely separated with increasing harmonic order, see e.g. FIG. 1*b*. Thus, while peaks caused by masses very close to each other may not be well separated with a lower order of harmonic (which may lead to error in identifying the peaks when forming a new spectrum with the lower order harmonic), these peaks should be more widely separated (and therefore easier to identify) with a higher order harmonic component. The comparison between spectra obtained with low and high harmonic order may therefore help to give an indication of possible error peaks or missing peaks in a newly formed spectrum.

If peaks that are close to each other are of a different harmonic order, the phase validation may be interrupted with one harmonic order but unlikely be interrupted with another harmonic order. For example, ions of mass 625 Th and 400 Th both exist in the analysis described above. When using phase relation of fifth harmonic order to validating the peaks, the fourth harmonic frequency peak of mass 400 Th overlaps with the fifth harmonic peak of mas 625 Th. The validity of fifth harmonic of 625 Th could therefore be failed and the mass peak of 625 Th could, as a result, be missing from the newly formed signal. However if the third harmonic was selected for forming a new spectra, such a coincidence would not happen and the mass peak of 625 Th would be retained. This again shows that by comparison between spectra obtained with multiple harmonic orders gives indication to possible error peaks or missing peaks in the spectrum.

"Linear Combination" Method

Above, we have shown a phase validation for the signal from one pick-up electrode. In a previous invention, described in the Annex to this document, the present inventors showed that when a number of pick-up electrodes are used for obtaining image charge signals. It is possible to supress peaks from a number of harmonic orders by using linear combination of the multiple image charge signals.

In this example we use two channels of image charge signals, and we eliminate the sixth harmonic peaks using a pair of predetermined linear combination coefficients, in the manner described in the Annex to this document.

Now if we calculate the phase of the peaks of those remained harmonics, we can find the phase-frequency relations are re-arranged, as seen in FIG. 12 (note that H6 does not appear in this diagram, because it has been eliminated using the linear combination coefficients).

Of course, any other harmonic could instead have been eliminated using the pair of predetermined linear coefficients to produce a different net shape. Such elimination may achieve better conditions for local spectral peaks identification.

In the re-arranged phase net shown in FIG. 12, the phases of the first, seventh and eighth harmonic components are located at much lower phase angle values than the other harmonics. This increase in separation between the harmonic peaks may therefore give the chance for easier validation of the phase angle. That is, a small error caused by a nearby peak, noise or statistical scatter (when number of ions are too small) that might have caused an inaccuracy in a phase calculation using the original phase net, may avoid failing the validity test with the re-arranged phase net. For example, when we wish to retain seventh harmonic peaks, the harmonics of the second, third, fourth, fifth and ninth harmonics will have little chance to pass the validity test, even if the set tolerance band is relative wider than before. However, for the phase net shown in FIG. 12, the phase angles of the eighth harmonic peaks are still close to the phase angles of the seventh harmonic peaks, so peaks from the eighth harmonic may still creep in during the procedure of retaining the seventh harmonic peaks. That said, as we can re-adjust the coefficients of the linear combination, it may nonetheless be possible to shift the phases of eighth harmonic peaks to be away from those of the seventh harmonic. In this way, it may be possible to completely remove the influence of other harmonic components on the peaks of the seventh harmonic. Accordingly, it may be useful on some occasions to combine the methods of linear combination of multiple image charge/current signals with the phase angle validation methods taught herein.

Additional Technical Detail

The following discussion provides additional technical detail, prepared by the present inventors, which relates to the examples described above.

1.1 New Method—Phase Angle Restriction

The inventors have foreseen an opportunity to make use of phase angle information to identify the harmonic order in the mixture of peaks.

FIG. 6 shows the 3D display of FFT result of single mass. The inset diagram shows a zoom in plot around the first harmonic frequency;

FIG. 6 shows a FFT result of 150 Th image charge signal. Instead of normal 2D display of magnitude with frequency, this plot shows magnitude (the height of each bar) vary with frequency as well as phase angle in 3D. Each harmonic peak covers a particular range of phase angles and peaks belonging to different harmonics not only differ in frequency, but also differ in the range of the phase angle distribution. The dependence of phase angle on the harmonic order is decided by the manor of ion injection to the PEIT.

FIG. 7 shows a "phase net" of phase angles at the peak point frequency of different harmonic and masses, obtained from Disktrap_neg8 simulation data and its derivations. Each solid line represents a different mass and each black dash line represent different harmonic from H1 to H9.

The present inventors have found that the phase angle distribution of harmonics is dependent on frequency, and is therefore dependent on ion mass. FIG. 7 shows the angle value at the top of the peak of each harmonic of 10 masses. The data was firstly obtained from simulated image charge data for 400 Th for 40 ms. This data was then rescaled (using interpolation) to create the signal for other 9 masses.

10 FFTs for all 10 masses were run and all peaks were located and plotted on the angle-frequency plane. Every grid node represent a peak for a given mass and a given harmonic order. It is then understandable that if all nodes are projected on the frequency axis, they will cause scrambling of peaks of different harmonics, which is the case of an original FFT. However, the present inventors have observed that by using one dashed line representing a selected harmonic to search through the peaks, then it is possible to collect only those peaks belonging to the selected harmonic order.

An algorithm was programed by the inventors to do this task.

In this algorithm, FFT with a windowing process is carried out on a "testing mixture" in order to obtain magnitude and phase angle data. This mass spectrum data is scanned within a frequency range of interest, which can be chosen to be the frequency range associated with a chosen mass range and a selected harmonic order. Once a peak is found, a validity test can be applied to check its phase angle value against the relationship between phase angle and frequency (dashed line in FIG. 7). If the phase angle value is within a predefined error band, it is registered as a "valid" peak and the frequency and its peak height recorded. Otherwise the peak is ignored.

In the following case study, the present inventors chose 7 masses to be used as a "testing mixture", with those masses being chosen as listed in following Table 1.

TABLE 1

| Mass (Da) | Number of ions | Fundamental frequency (MHz) |
|---|---|---|
| 800 | 20 | 0.1865 |
| 609.7 | 30 | 0.2136 |
| 609.2 | 8 | 0.2137 |
| 357.1 | 40 | 0.2791 |
| 357.0 | 10 | 0.2792 |
| 355.56 | 10 | 0.2797 |
| 200 | 100 | 0.3729 |

The calculated mixture signal was 28.32 ms long, including 360,676 samples (at sampling frequency=12.8 MHz). This data had a Hann window applied to it (similar to the process illustrated by FIG. 16) and was extended to 510,074 samples or 40 ms by adding zeros.

Then a FFT was carried out in Matlab and the inventors selected the $5^{th}$ harmonic as the harmonic of interest in this test. A frequency range of interest was identified on the basis that it would contain the peaks belonging to H5 for masses in the range of 200 Th to 800 Th, and the peaks contained in this frequency range of interest was selected, as seen in FIG. 8.

FIG. 8 shows selecting peaks in the frequency range of interest (0.9 MHz to 1.9 MHz), corresponding to the $5^{th}$ harmonic for masses in the range 200 Th to 800 Th.

The selected peak points were then compared with the calibrated line for H5 as the line shown in FIG. 9.

FIG. 9 shows the pre-calibrated angle-frequency relationship for $5^{th}$ harmonic (solid line) and the measured peak position for the mixture sample.

The greyed out tolerance band shown in this figure gives a certain tolerance for selection. 7 points within the tolerance band are identified as the $5^{th}$ harmonic and their frequencies then divided by 5 and used for calculate the masses. The calculated masses and their peak height were then displayed, as shown in FIG. 10.

FIG. 10 shows the obtained mass spectrum in which 7 peaks are identified.

The mass spectrum obtained in this way will only display a bar graph without peak profile information. This format is, however, widely accepted by mass spectrometry users.

In this test the peak for the ion of mass 357.1 Th has been influenced by the peak for 357.0 Th so the returned angle for this peak became lower and the peak position on angle-frequency plot is just within the margin of blue band. If two peaks are too close to be resolved, the returned phase angle is likely to have quite big error, in which case the peak may not be identified correctly.

1.2 Phase Angle Identification after Linear Combination

This section describes one way of integrating the method of the present invention, with the linear combination method described in the Annex to this document. This integrated method may help to reduce shortcomings of each individual method. A preferred aim here is to avoid using more than 2 pick-up electrodes whilst, at the same time, still getting high resolution by using information from the higher harmonics without suffering from a mixture in the frequency of different harmonics of different masses.

Now using one example we demonstrate the whole integrated procedure.

Generate 10 signals within the selected mass range.

This is equivalent to a calibration method. Here the selected masses are 200, 250, 300, 350, 400, 450, 500, 600, 700 and 800 Th and the signals can either be simulated image charge signal or calculated from a base signal of 400 Th using interpolation. The 10 generated signals within the selected mass range (200-800 Th) were plotted in different colours, and FIG. 12 is a greyscale version of this plot.

The interpolation method may not reflect the detailed features that depend on the mass but the overall trend should be the same.

Create a Phase Angle Net Based on the Generated Signals by Eliminating H6.

Using an FFT for each of 10 signals to get the intensity-frequency as well as phase angle-frequency relations. The transform length of FFT can be chosen to be larger than the data sampling points while remaining space should be padded with zeros. Moreover, the inventors applied a Bartlett-Hanning window function to the image charge signal which is effectively a vector multiplication of the window function with each block of time series data.

There are algorithms to correct the radian phase angles in the frequency spectrum by adding multiples of $\pm 2\pi$ when absolute jumps between consecutive elements are greater than or equal to the default jump tolerance of radians.

Figure 13A:
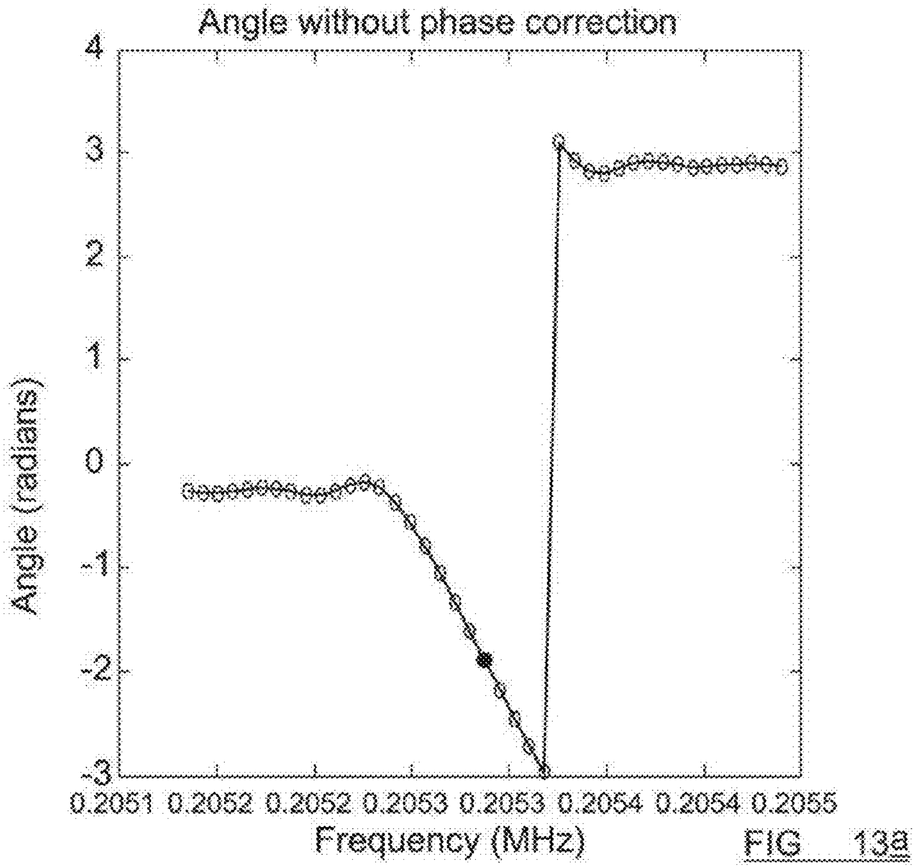
Figure 13B:
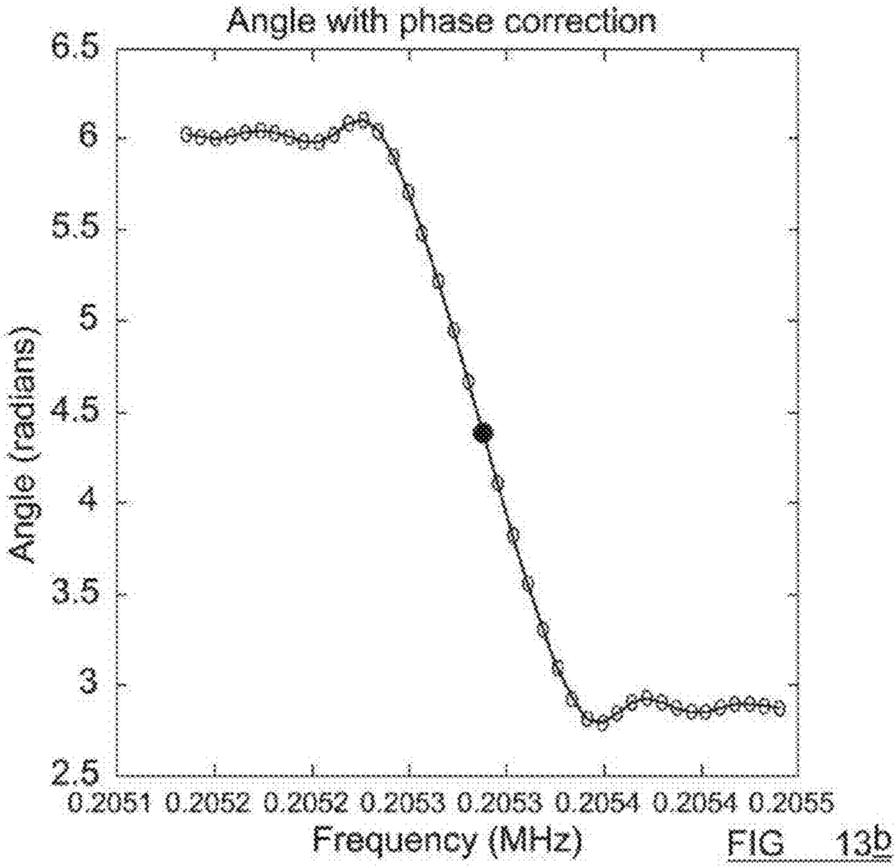

FIG. 13 shows the frequency-angle distribution of 400 Th at the first harmonic where the angles have to be corrected when the jump was more than $\pi$ at the frequency 0.20534 MHz.

Figure 14A:
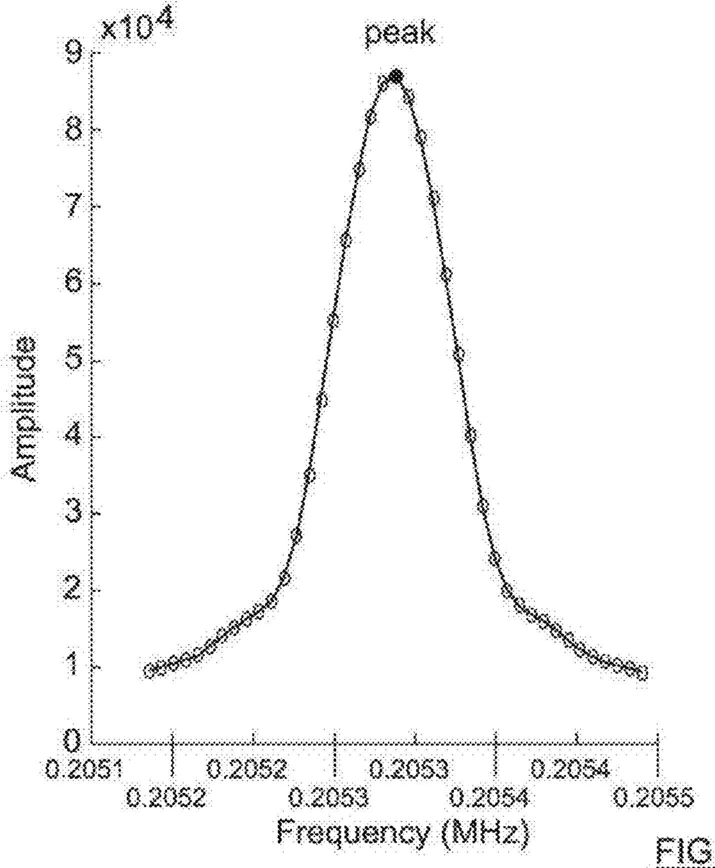
Figure 14B:
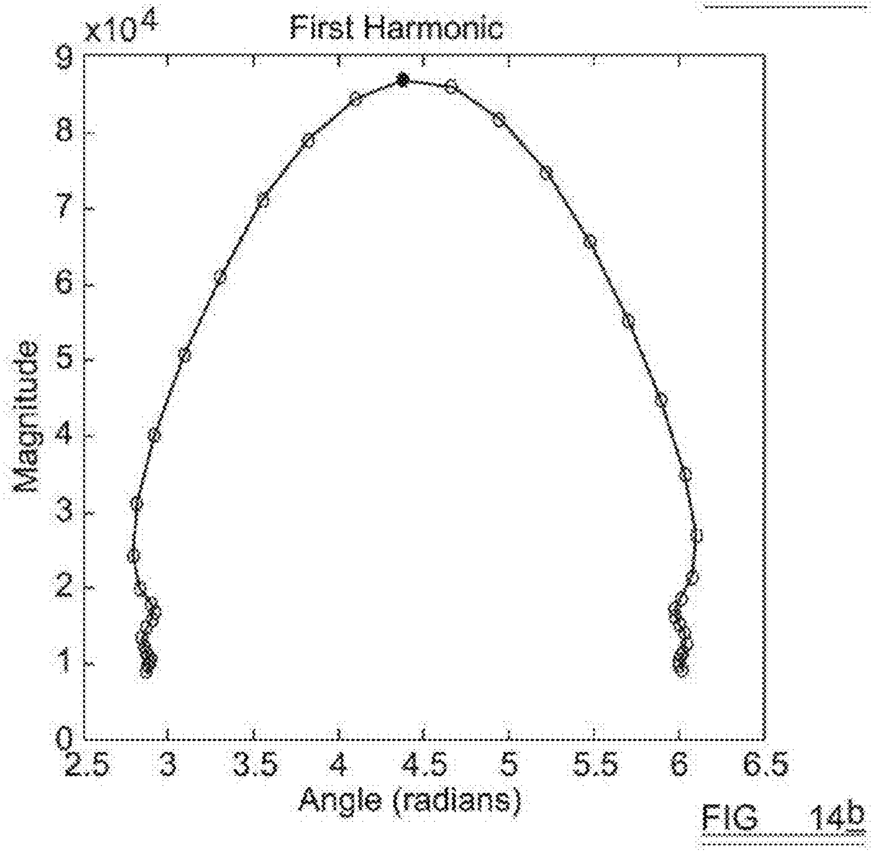
Figure 15:
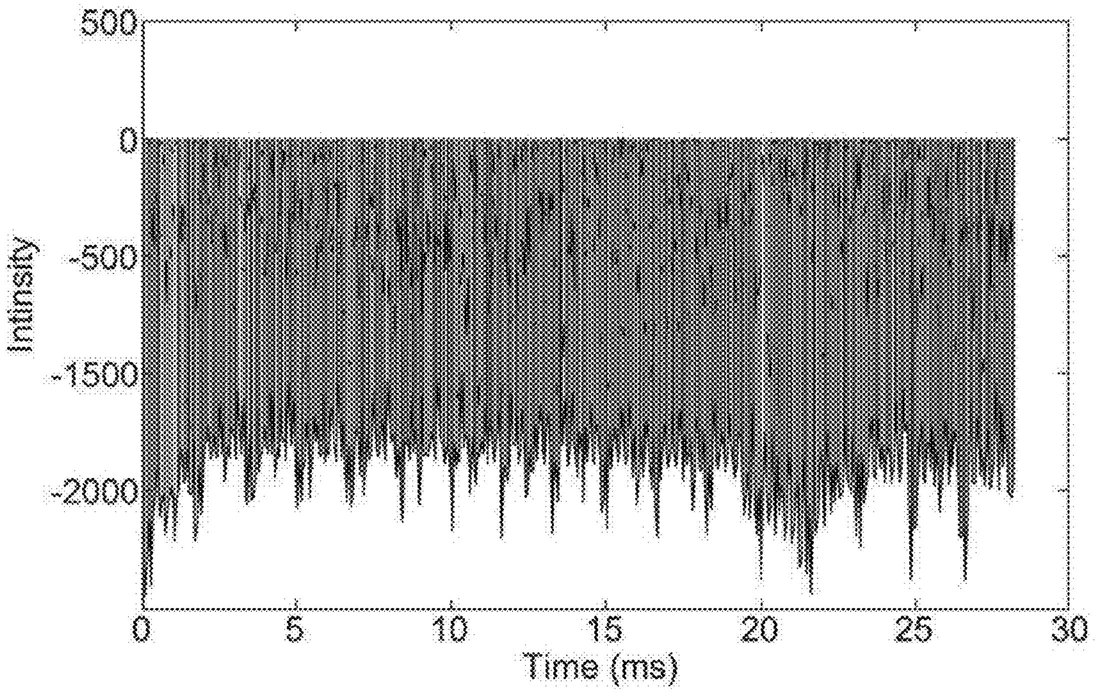

FIG. 14 shows the Frequency-Amplitude and Angle-Amplitude curves of 400 Th at the first harmonic after correction.

It was found that the peak position has some influence to the calculated angles because the peak is not always hitting on the frequency steps. It was necessary to modify these phase angles to obtain a better peak angle approximation. Hence, for each peak, the algorithm identified the highest 3 points, each point contain the angle and amplitude information. Then, a quadratic equation has to be used to fit the intensity-angle relation:

$$I=a\alpha^2+b\alpha+c \quad [1.0]$$

where $\alpha$ represents the phase angle as variable, and I is the intensity.

The coefficients a, b, and c can be obtained by solving a group of 3 linear equations. Then, the optimal modified angle for the peak can be calculated as $\hat{\alpha}=-b/2a$.

The result of intensity-frequency and phase angle-frequency relations can be displayed as so called phase net that gives the position of peaks as a function of angle and frequency. Such a phase net may vary its shape if a different pick-up electrode is used. In previous experimentation, the inventors have found that a phase net from the signal of $1^{st}$ pick-up electrode without elimination of any harmonic, see FIG. 7. However, if the linear combination method is applied, the inventors have found that the phase net shape will change as a result.

Create a Phase Angle Net Based on the Generated Signals by Eliminating H6.

FIG. 12 gives a phase net that has been created by substantially eliminating the sixth harmonic by applying the linear combination method on image charge/current signals obtained using two pick-up electrodes.

In this phase net, only the H8 line is still close to the H7 line which may cause difficulty for separation.

Of course, any other harmonic could equally be substantially eliminated using the linear combination method to produce a different net shape. Such elimination may achieve better local spectral peaks identification.

Generate a Mixture Signal of Masses from Two Electrodes.

Next, a plurality of "mixture" image charge signals, induced by seven masses with different number of ions, were obtained. The "mixture" signals were generated in simulation from two pick-up electrodes by 360,676 samples, 28.3 ms total sampling time, and 7.825 ns sampling intervals. The two mixture signals from one of the two electrodes (in this case the 1st electrode) is displayed in FIG. 15.

Table 2 shows the image charge signal details. All frequencies have been determined in MHz.

TABLE 2

The properties of mixture of ions used for generating image charge signal.

| Mass | Mass Number (Da) | Signal frequency (MHz) | Ion Intensity |
|---|---|---|---|
| 1 | 800.0 | 0.1865 | 40 |
| 2 | 609.47 | 0.2136 | 30 |
| 3 | 609.2 | 0.2137 | 12 |
| 4 | 357.1 | 0.2791 | 20 |
| 5 | 357.0 | 0.2792 | 17 |
| 6 | 355.56 | 0.2797 | 35 |
| 7 | 200.0 | 0.3729 | 20 |

Create a Window Function to the Mixture Signal.

Figure 16:
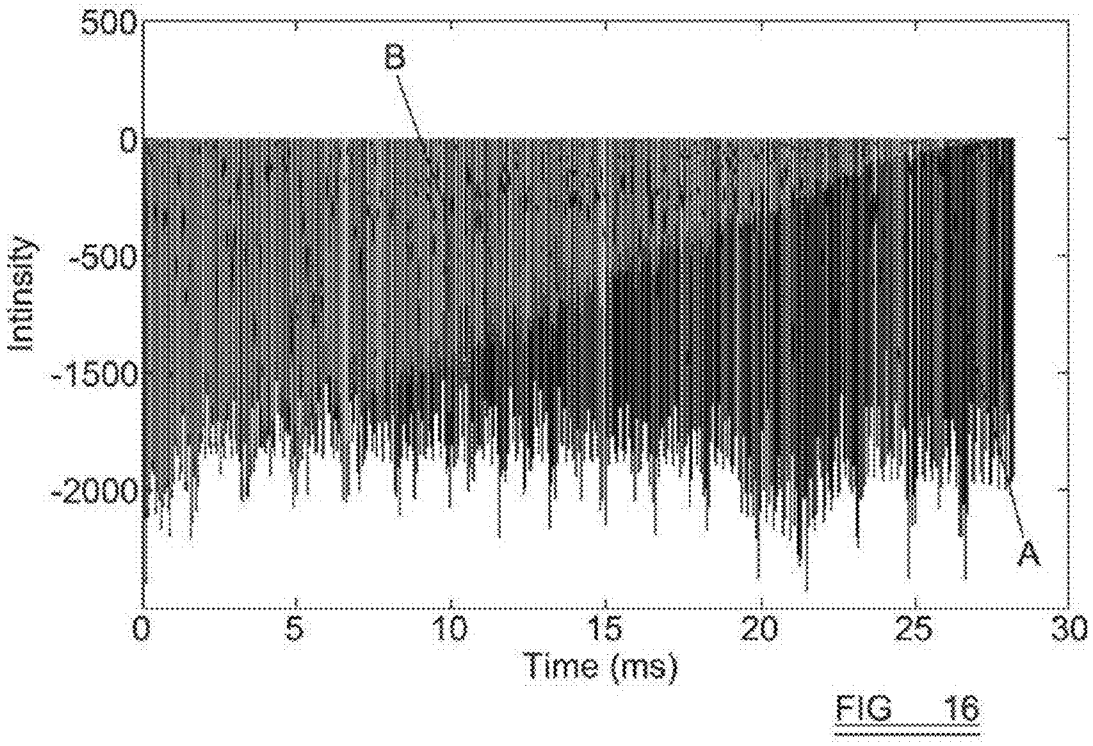

FIG. 16 shows an image charge signal before and after a window function was applied.

In FIG. 16, the trace labelled A is the signal of image charge signal, and the trace labelled B is the signal after application of the Bartlett-Hanning window function.

Apply the Elimination Method to Retain H1.

Figure 17:
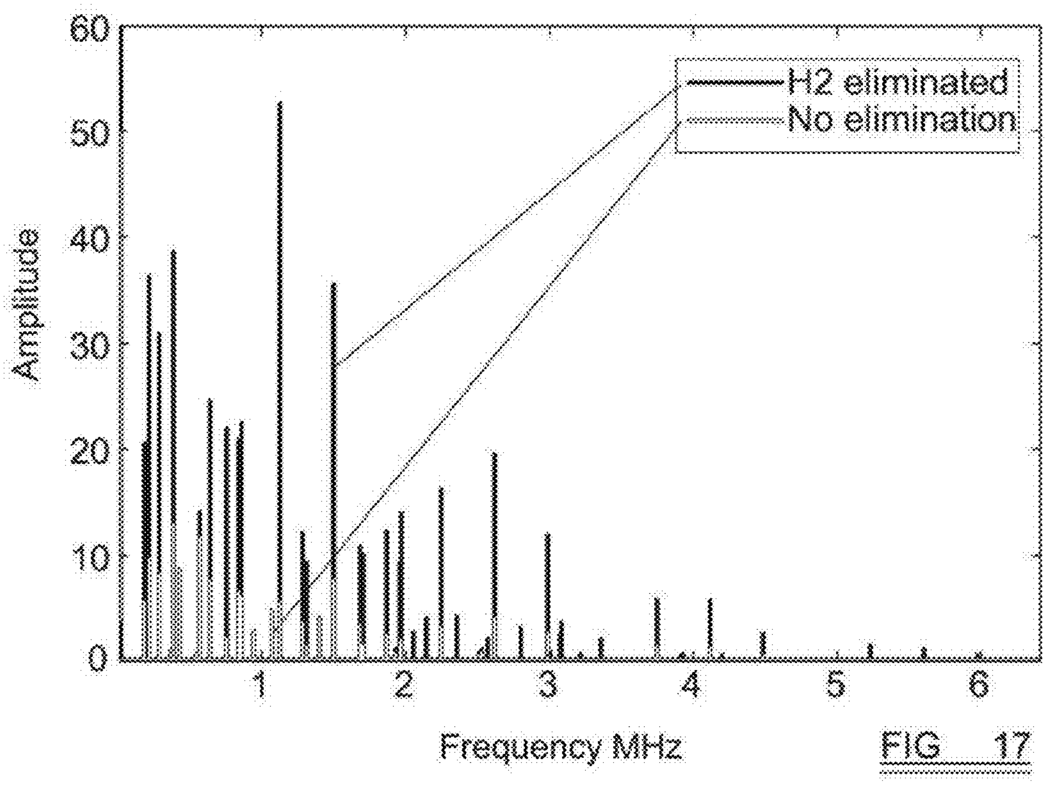

FIG. 17 shows FFT (H2 eliminated);

When H2 was eliminated we have 9× mass range without interruption to H1 by H3. This will give us the wide full scan spectrum, even though the mass resolution may not be so high if people want a zoom-in view.

Figure 18:
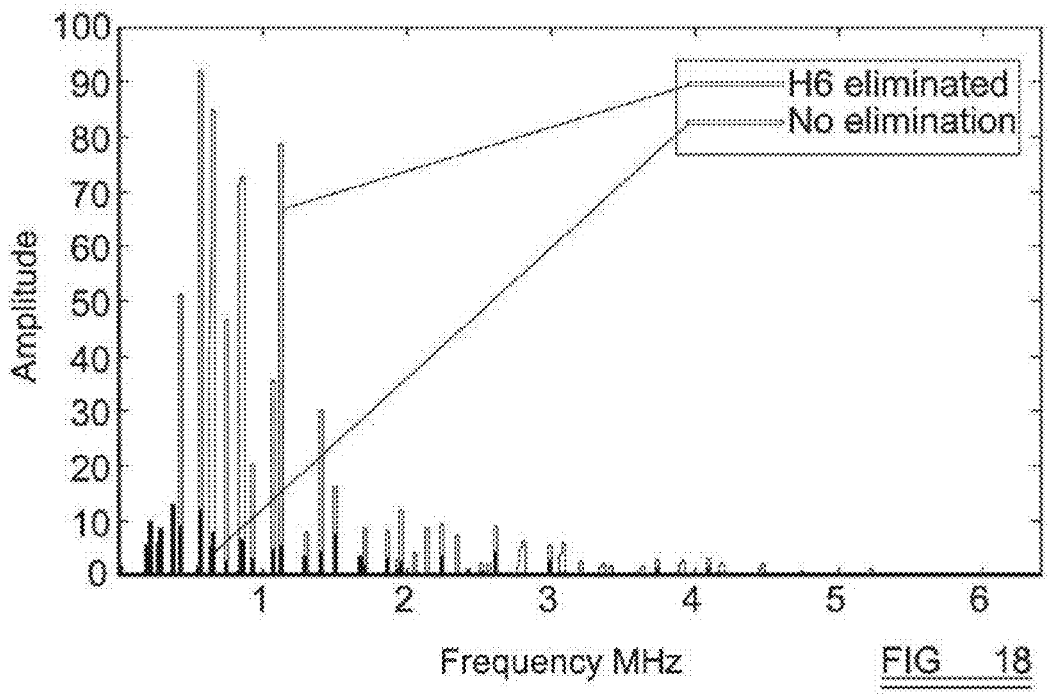

Next, the inventors applied the linear combination method to eliminate the sixth harmonic to the FFT of mixture data and get the result as shown by FIG. 18, which shows a comparison between the FFT before and after the elimination of H6.

Apply Phase Angle Identification

Figure 19A:
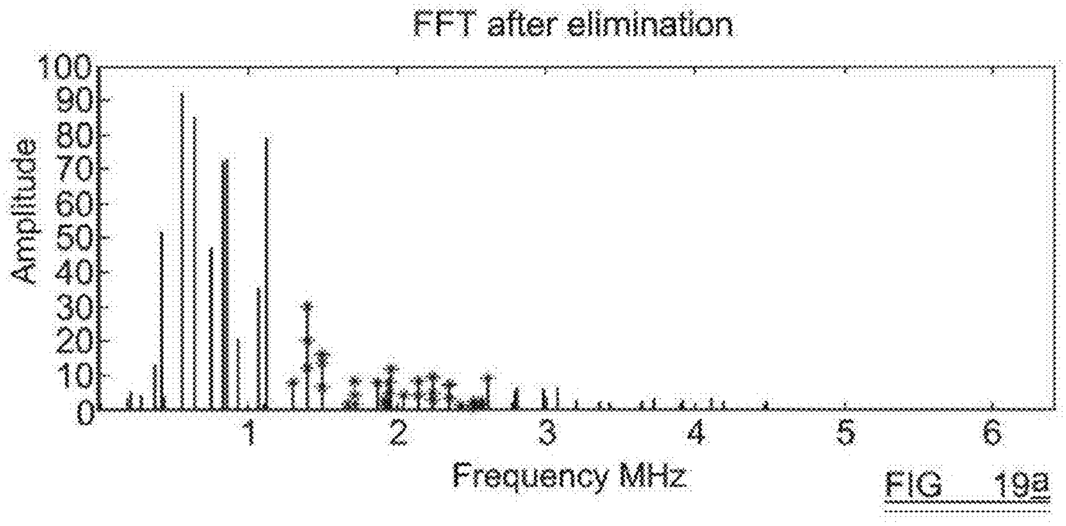
Figure 19B:
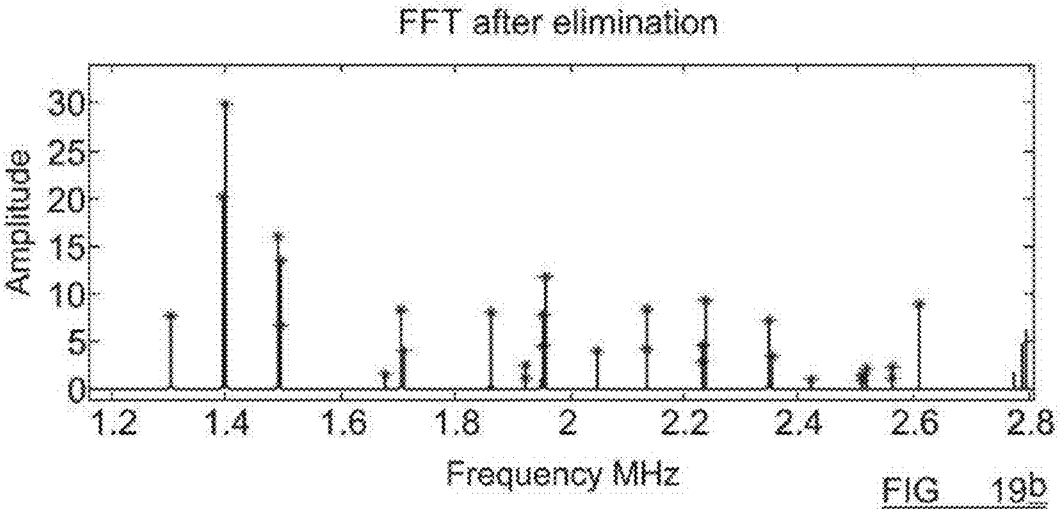

FIG. 19(*a*) shows a full FFT, in which peaks for a frequency range of interest (which in this case corresponds to the H7 peaks for the mass range of 200 Th to 800 Th) have been selected.

FIG. 19(*b*) is a zoomed in view of FIG. 19(*a*) for the frequency range of interest, where 31 peaks exist.

The next was to identify those peaks that belong to H7. As the mass range was known to be from 200 Th to 800 Th, the frequency range of interest was limited to 1.3 to 2.61 MHz. As seen in FIG. 19, even in this limited frequency range 31 peaks can be found, these peaks being marked with crosses.

Next, the 31 peaks lying in the frequency range of interest were plotted into a phase angle-frequency space and compared with the line for H7 which was determined using the modified phase angle net shown in FIG. 12.

Figure 20:
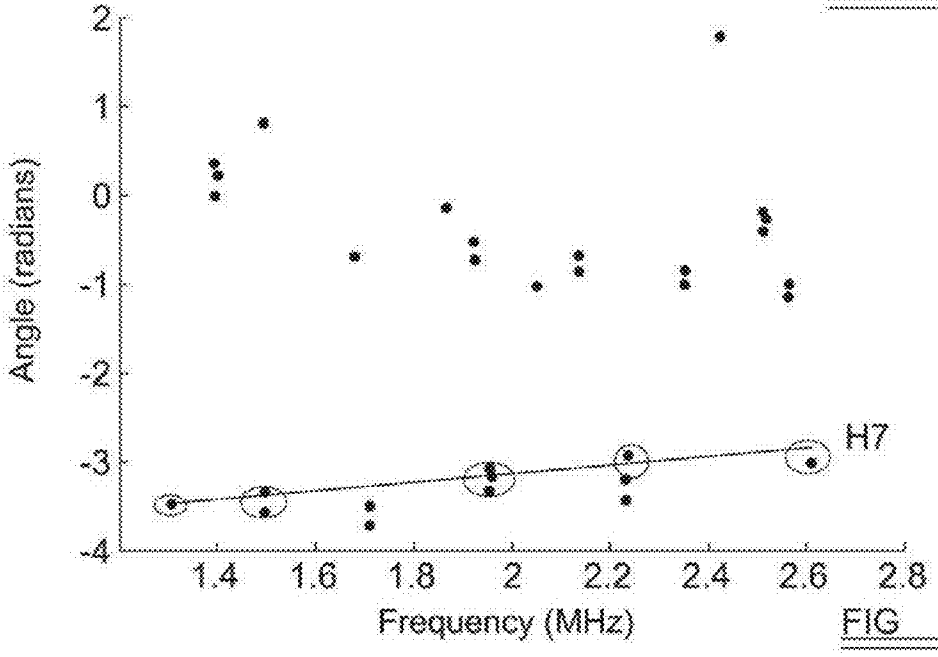
Figure 21A:
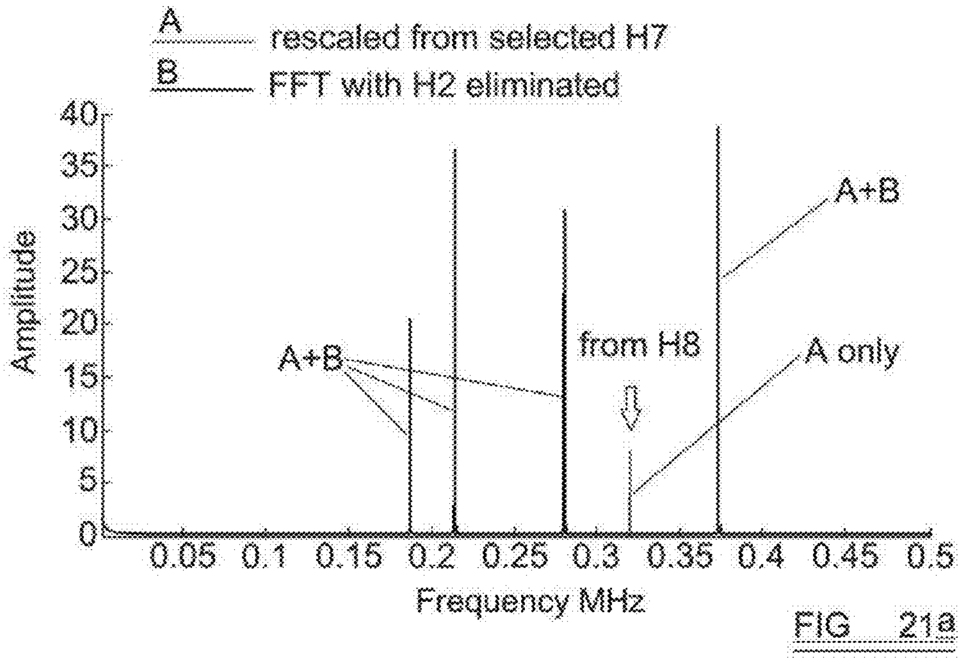
Figure 21B:
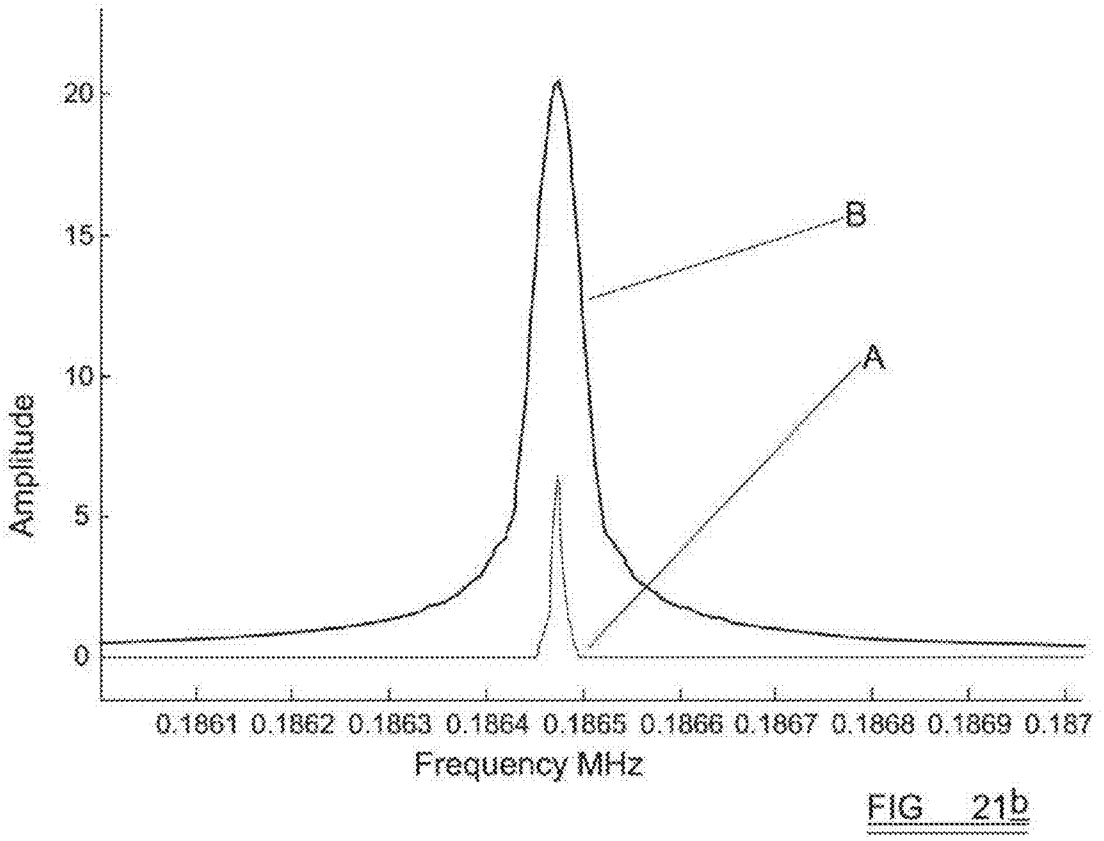
Figure 21C:
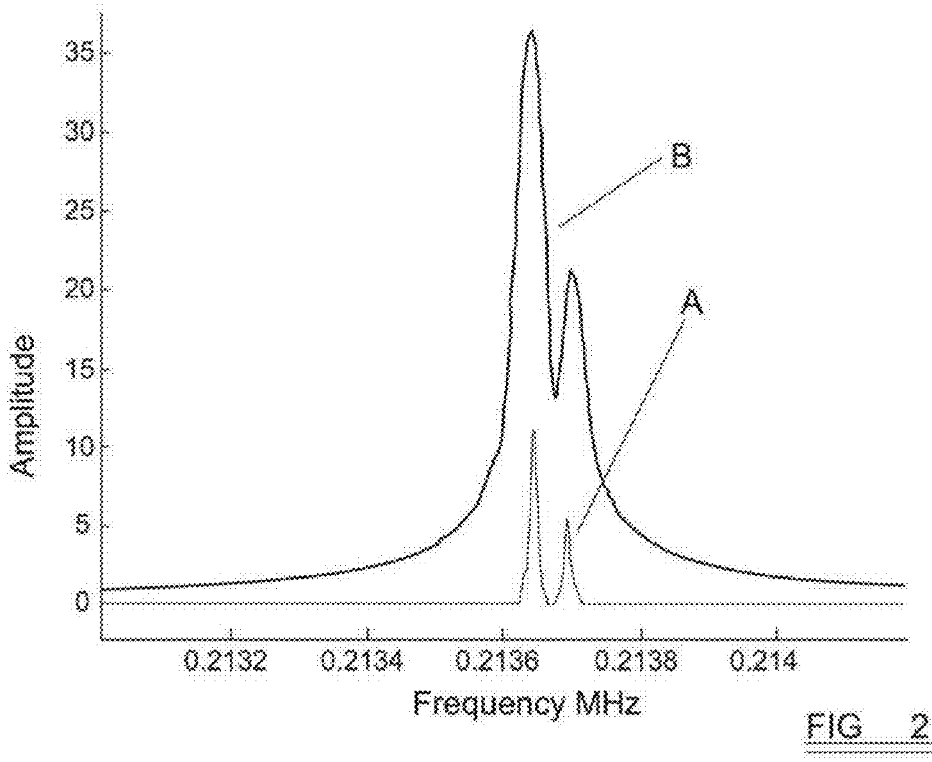
Figure 21D:
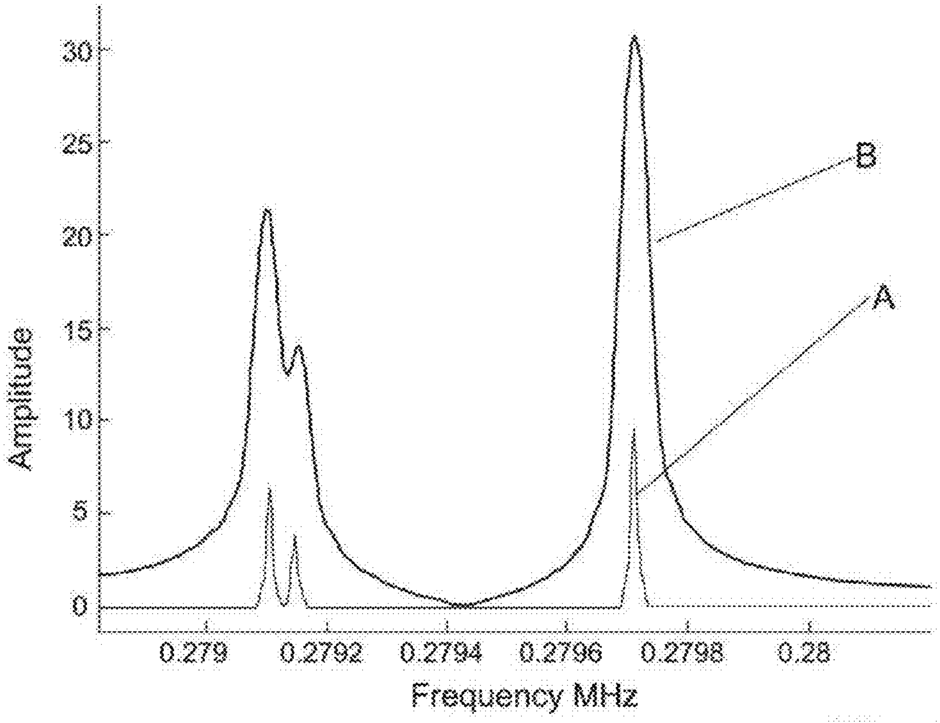
Figure 21E:
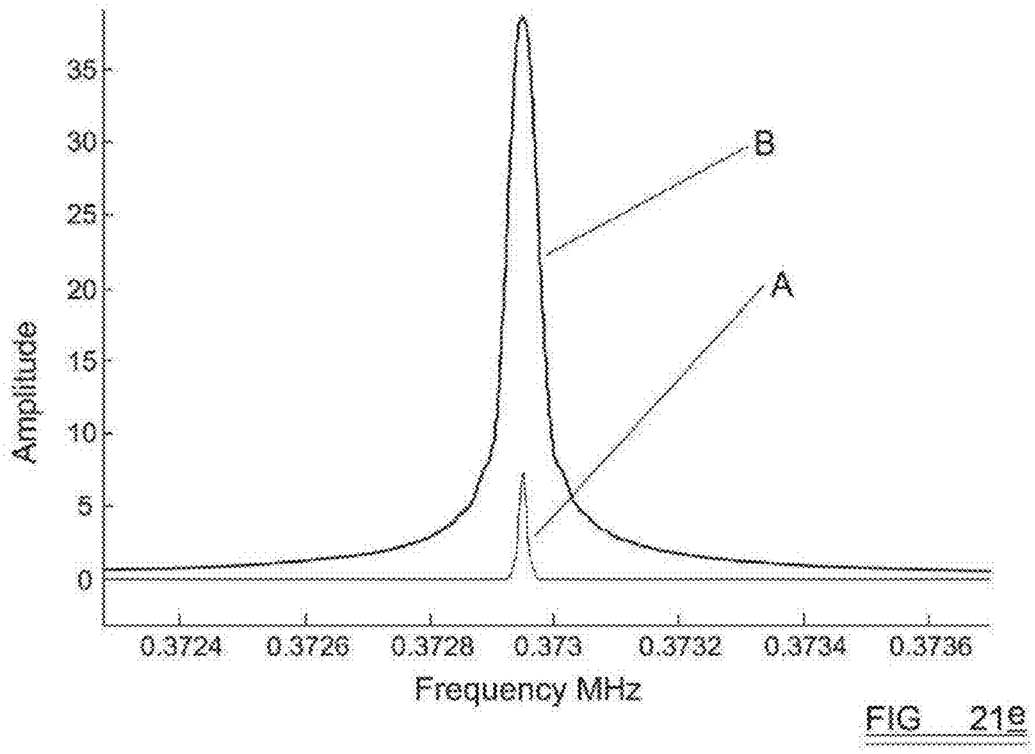
Figure 22A:
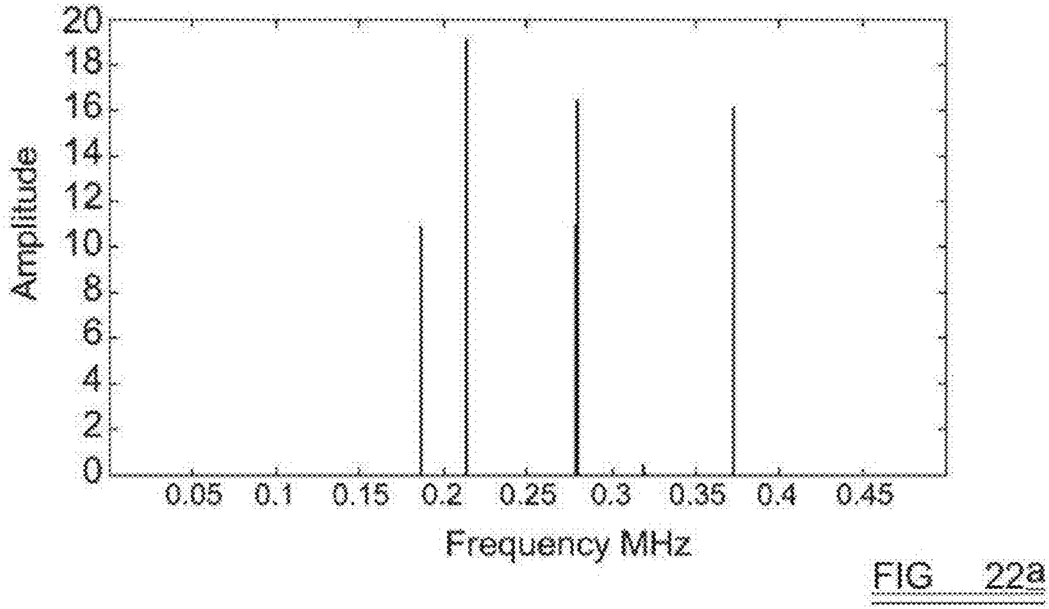
Figure 22B:
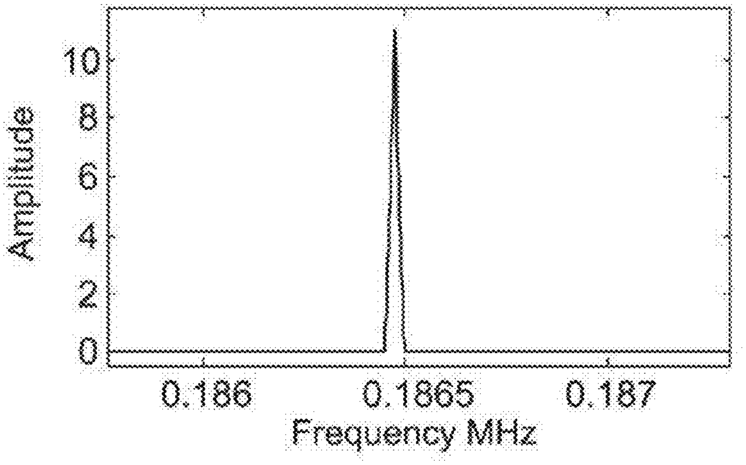
Figure 22C:
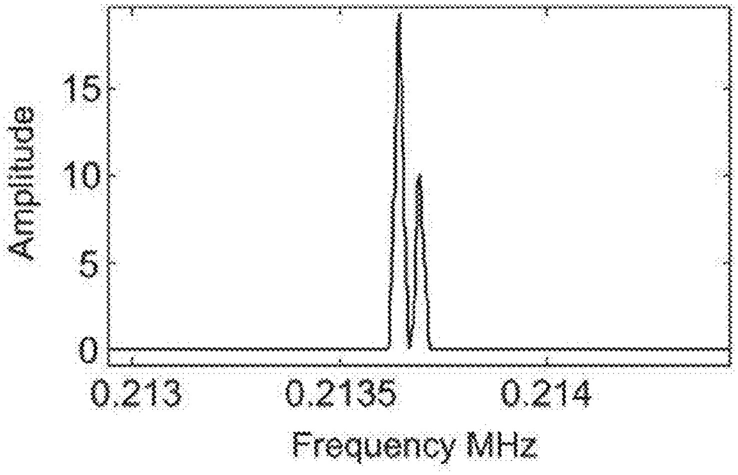
Figure 22D:
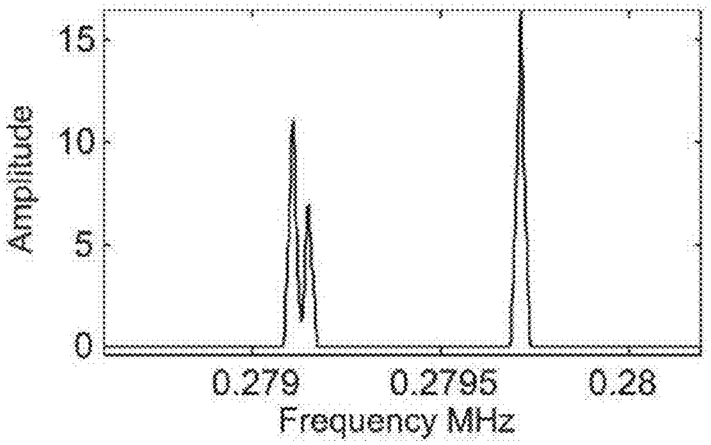
Figure 22E:
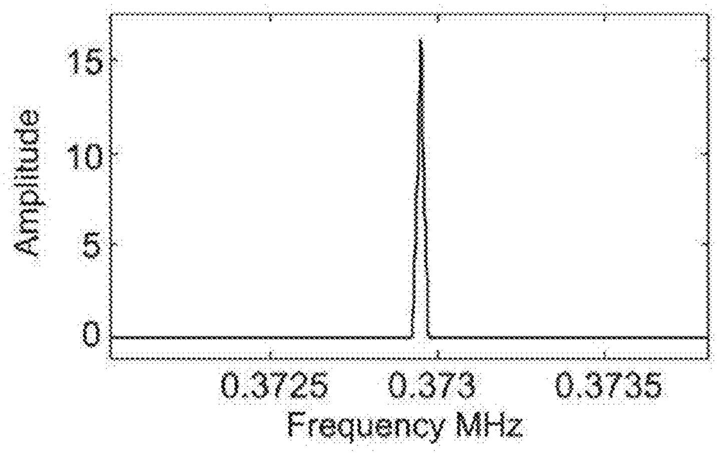

FIG. 20 shows that 9 dots in five groups which were close enough to the regression line of H7 to be identified as belonging to H7, i.e. these peaks "passed" the validity test.

Scale Down the Identified Peaks to H1.

Next the peaks passing the validity test were resampled, while those that failed the validity test were ignored. Then the scale of above resampled spectrum was shrunk by 7 fold on the frequency axis and displayed together with another eliminated spectrum in which the H1 peaks were retained (with the H2 peaks being eliminated).

When these two spectra are placed together the H1(*f*) and H7(7*f*) should in principle match each other. However, as seen in FIG. 21(*a*)-(*e*), the spectrum from H7 (labelled A) gives much better resolution than that from H1 (labelled B). On the other hand we also see there is one extra group of peaks for H7 which appears in full scan (see FIG. 21(*a*)). This is because the algorithm has incorrectly identified two peaks at 0.3196 and 0.3197 MHz as belonging to H7, whereas in fact these peaks belong to H8. The reason for this because the algorithm finds the angles and the corresponding peaks in the seventh harmonic frequency range by looking at the phase angles position within the threshold from the regression line and locating the corresponding frequency associated with the angle. As these two peaks belonging to H8 are also within the selected threshold margin so, they have been included in the analysis. Different thresholds could be set from 0 to 1 to perform the detection procedure to reduce errors, but completely exclusion of the unwanted harmonic would be difficult. However, as explained below, by comparing two spectra in which different harmonics have been selected, the error can be identified and removed.

FIG. 21 shows a comparison between the rescaled H7 peaks (A) and the H1 peaks (B).

1.2.1 Spectrum Combination

Next, with the two spectra obtained in above algorithm, one from elimination of H2 and one from rescaled H7 such combination can be carried out to remove the imperfection in each procedure. Basically the combination is just multiplying the spectrum of identified H7 peaks and the first harmonic spectrum. As shown in FIG. 22, those irrelevant peaks in FIG. 21 are suppressed by approximately 95% at the combination stage and they hardly appear in the final spectrum.

FIG. 22 shows final frequency spectrum and zooming in views.

Determine all Mass Numbers with the Corresponding Frequencies.

Using the calibration relation from the original 400 Th FFT, the masses of the identified peaks were calculated.

Figure 23:
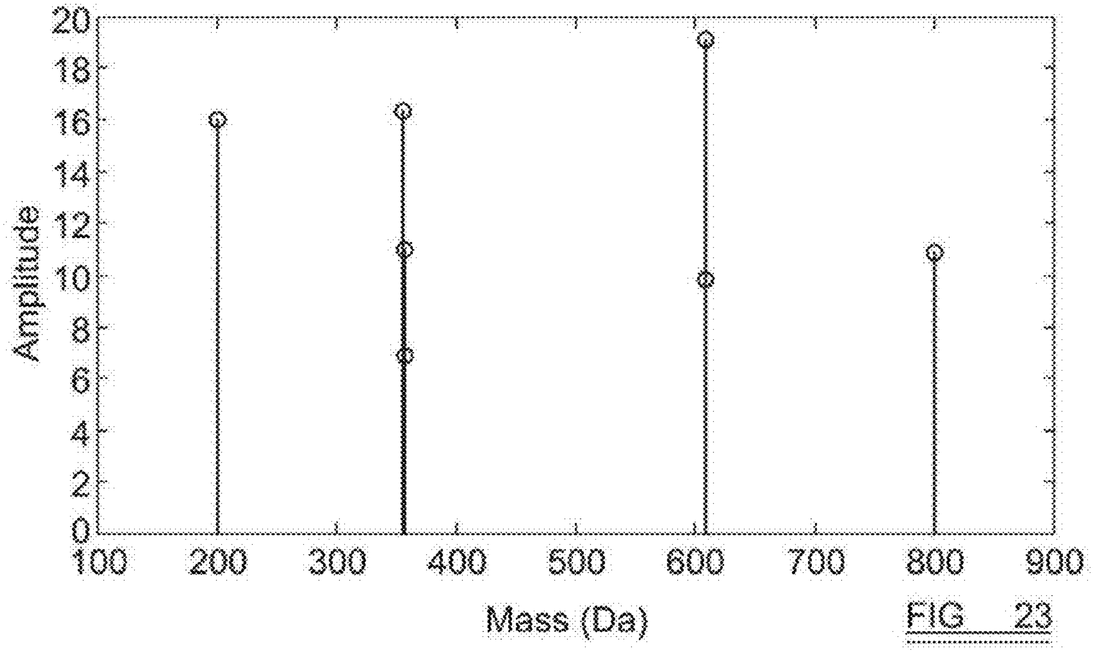

FIG. 23 shows the resulting mass spectrum.

The identified peaks are listed in Table 3.

TABLE 3

| Final Mass Results. |
|---|
| Identified masses with the corresponding frequencies: |
| 1 mass: 800.0040 Da, with frequency = 0.186474609375 MHz |
| 2 mass: 609.4771 Da, with frequency = 0.213642229353 MHz |
| 3 mass: 609.1986 Da, with frequency = 0.213691057478 MHz |
| 4 mass: 357.1008 Da, with frequency = 0.279106794085 MHz |
| 5 mass: 356.9981 Da, with frequency = 0.279146902902 MHz |
| 6 mass: 355.5618 Da, with frequency = 0.279710170201 MHz |
| 7 mass: 200.0010 Da, with frequency = 0.372949218750 MHz |

The reference mass signal preferably lasts enough long to allow the generated signal to be as long as 2 power of n samplings. It has been found that, when a different ionic species with a very close mass is generated and detected, the peak position of both masses has some influence to the identified angles, especially when one mass has a much higher intensity, i.e. where the FFT peak shows higher amplitude than the other peak. It was necessary to modify these angles to achieve a better angles approximation.

The elimination of harmonics may introduce a small change in the peaks height when reconstructing the data in the frequency domain. The height of the identified peaks with mass may change but their mass/charge ratio stays the same, so a quantitative analysis can be performed on the same data set. However, it should be noted that, the peak shape has some influence to the peak height. The proposed method uses the seventh harmonic peaks, while the frequency spectrum consists of many higher order harmonics with different intensity. Therefore, a higher order harmonic can be chosen for better frequency and angle measurements.

Additionally, improving the efficiency of the algorithm can be done by using different techniques to estimate the main peaks associated with the angles in the frequency spectrum. For instance, a third electrode can be used to eliminate the eight harmonic in addition to the sixth harmonic when creating the phase angle net. This allows better angles identification process, because the angles of the seventh harmonic will be completely separated from the rest of the angles. Such approach allows us to analyse the frequency components for each harmonic independently, in addition to the ability to analyse the extended mass range of the ion trap.

When used in this specification and claims, the terms "comprises" and "comprising", "including" and variations thereof mean that the specified features, steps or integers are included. The terms are not to be interpreted to exclude the possibility of other features, steps or integers being present.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to in this document are hereby incorporated by reference.

ANNEX

Description of Linear Combination Method

The following description provides an explanation of a linear combination method, based on excerpts from a corresponding description in UK patent application GB1204817.9 (currently unpublished). The reason for including this description is that, as described above, the present invention may be used in combination with this method.

Figure 24:
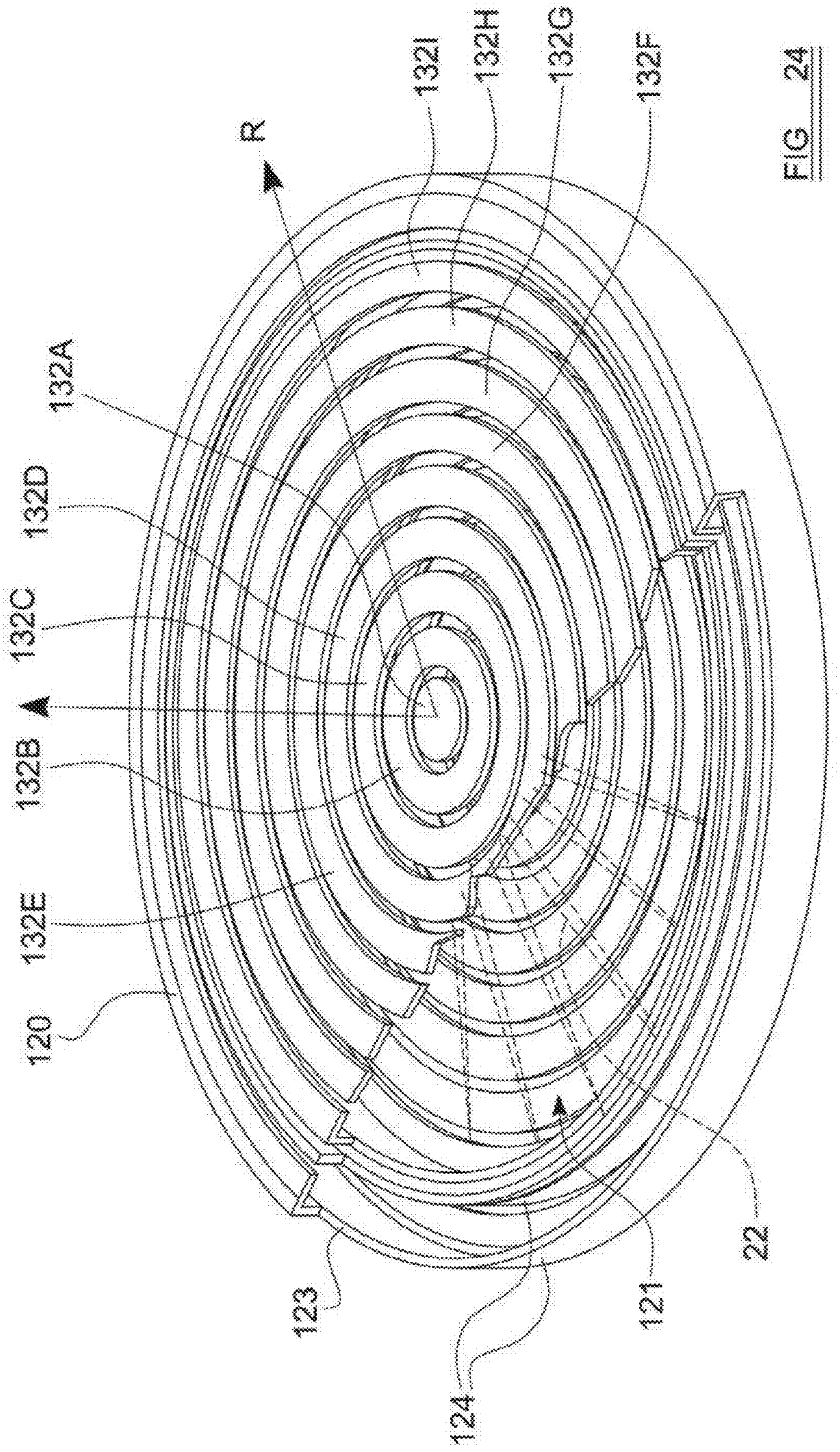

In this Annex, reference is made to the additional drawings in which:

FIG. 24 is an example of an electrostatic ion trap mass analyser for use in the ion trap mass spectrometer of Fig. B.

Figure 25A:
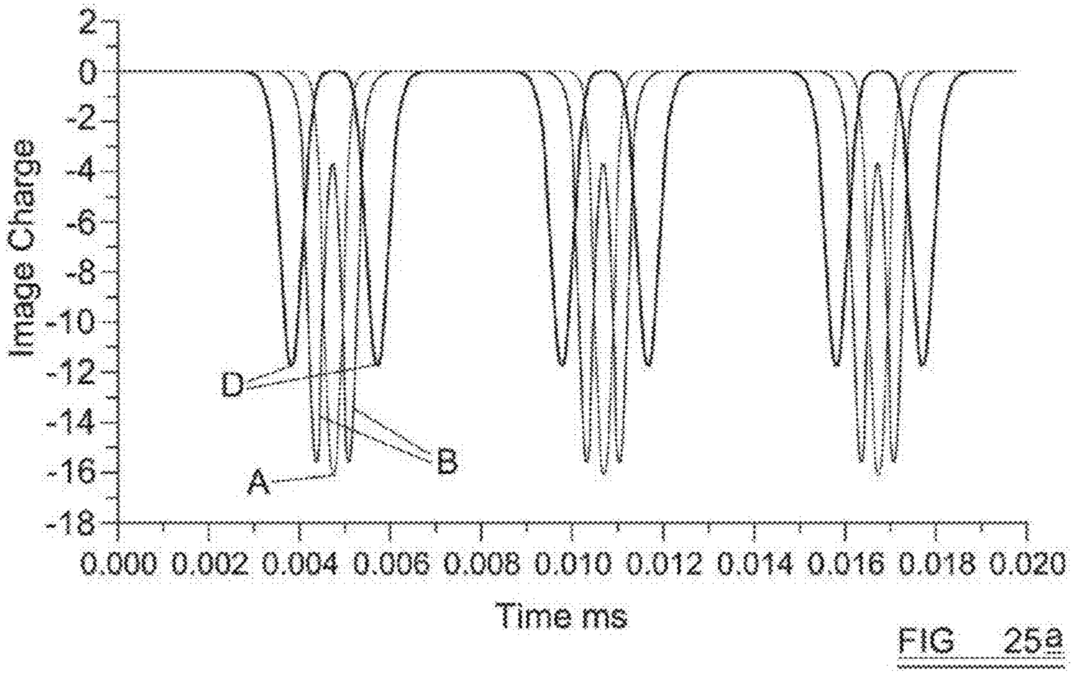

FIG. 25*a* shows image charge signals in the time domain obtained using a first, second and third "pick-up" electrode of the mass analyser of FIG. 24 in a simulation.

Figure 25B:
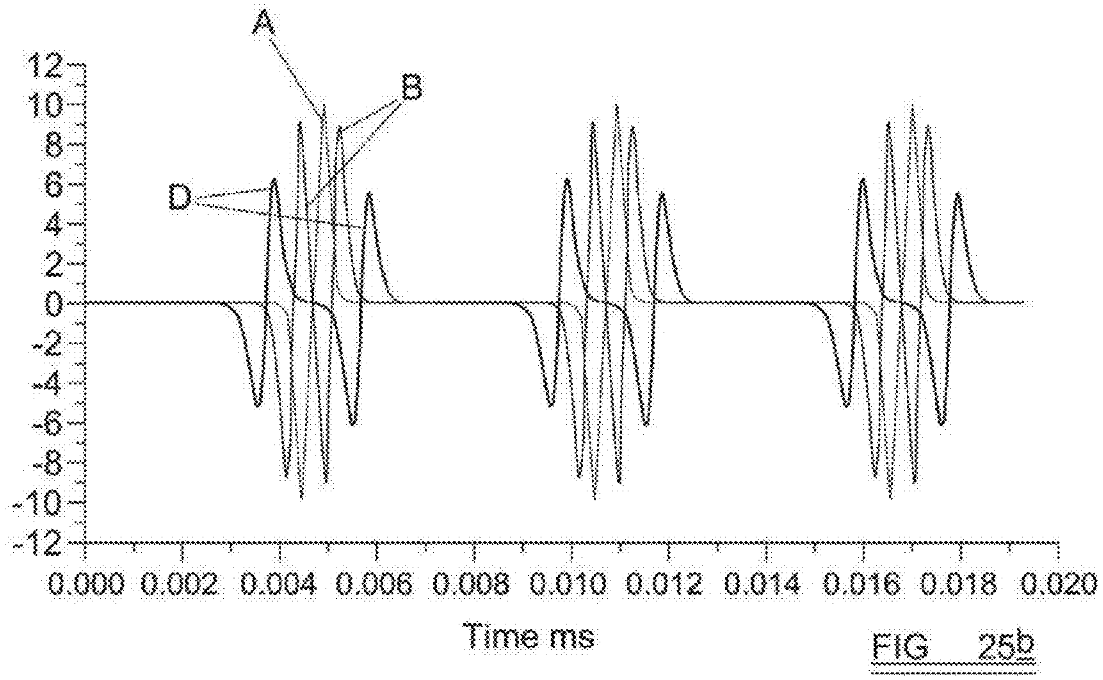

FIG. 25*b* shows the image current signals obtained by differentiating the image charge signals shown in FIG. 25*b*.

Figure 26A:
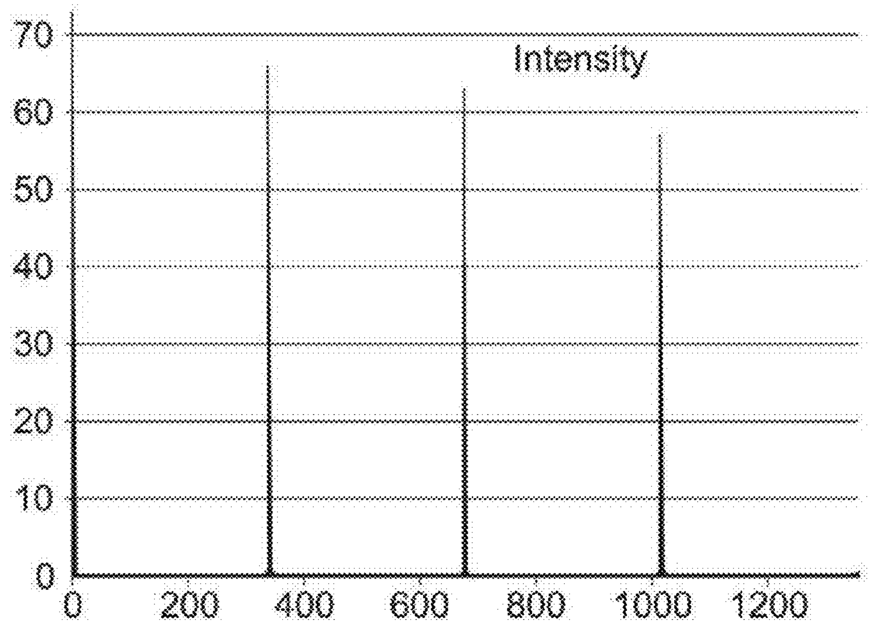
Figure 26B:
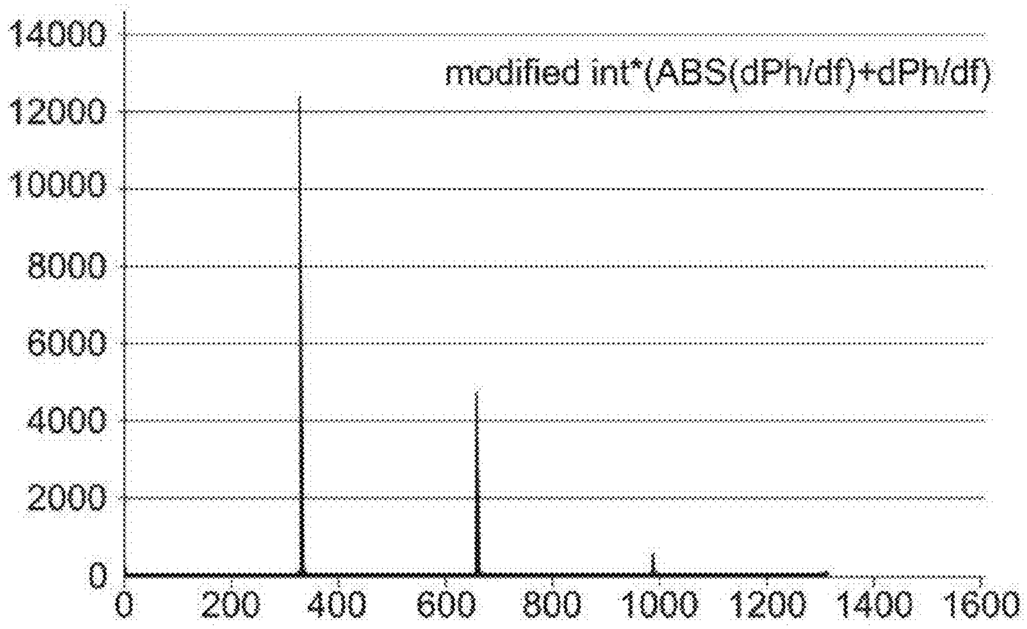
Figure 26C:
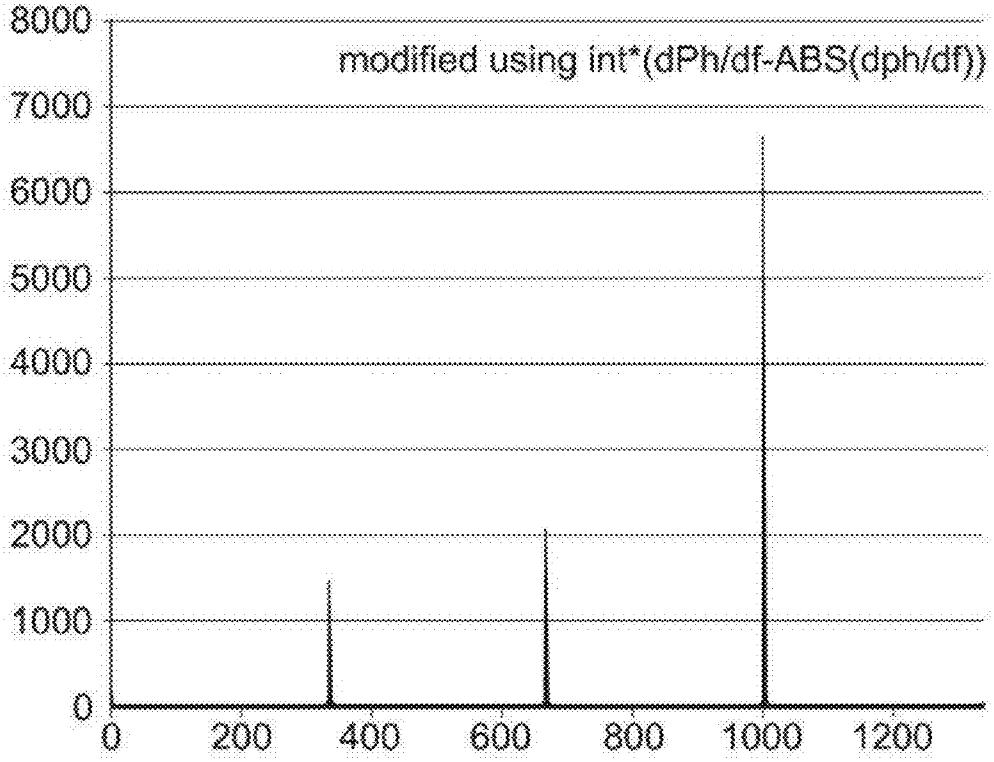
Figure 27A:
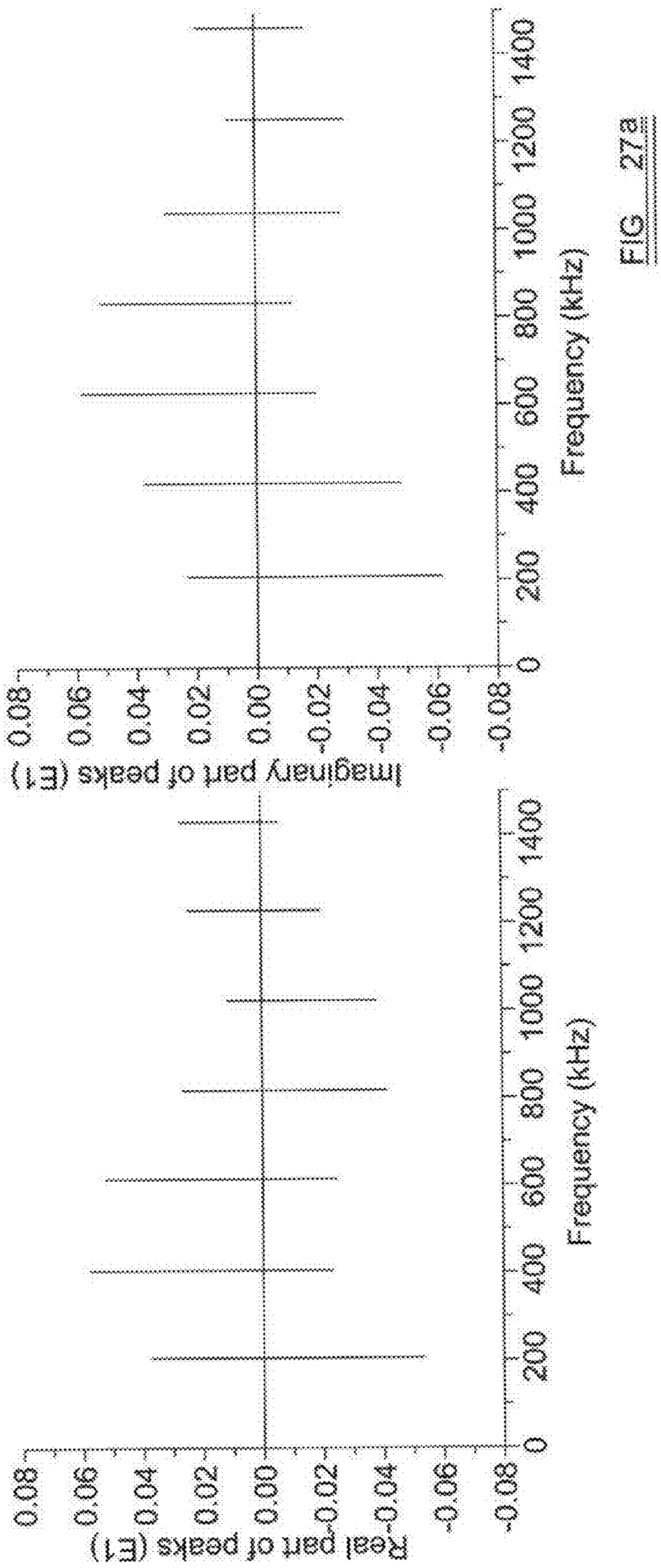
Figure 27B:
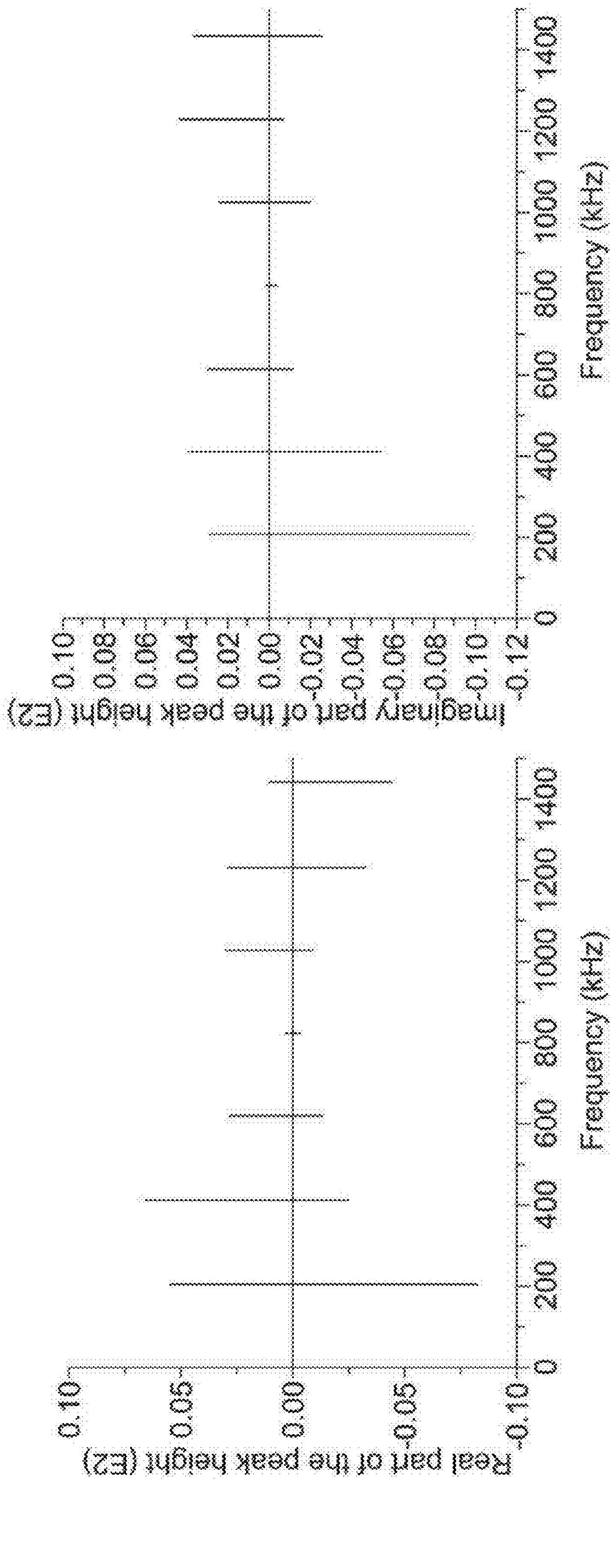
Figure 27C:
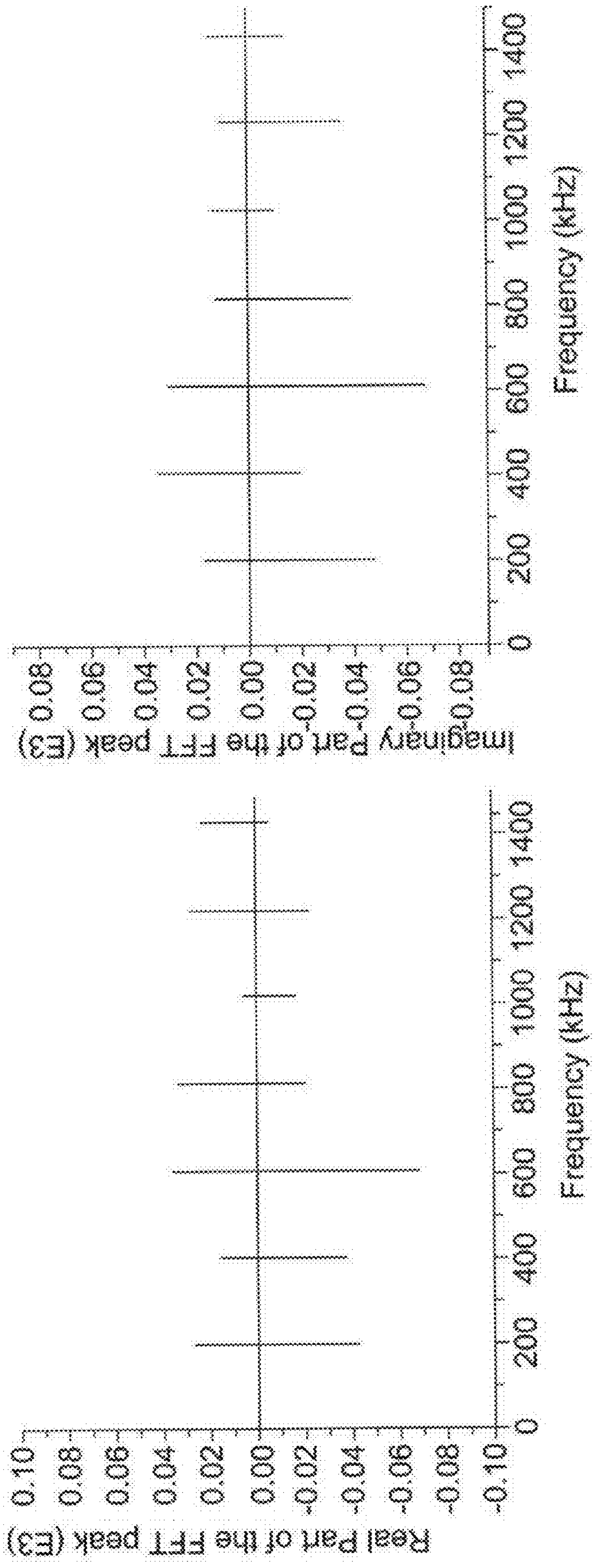
Figure 27D:
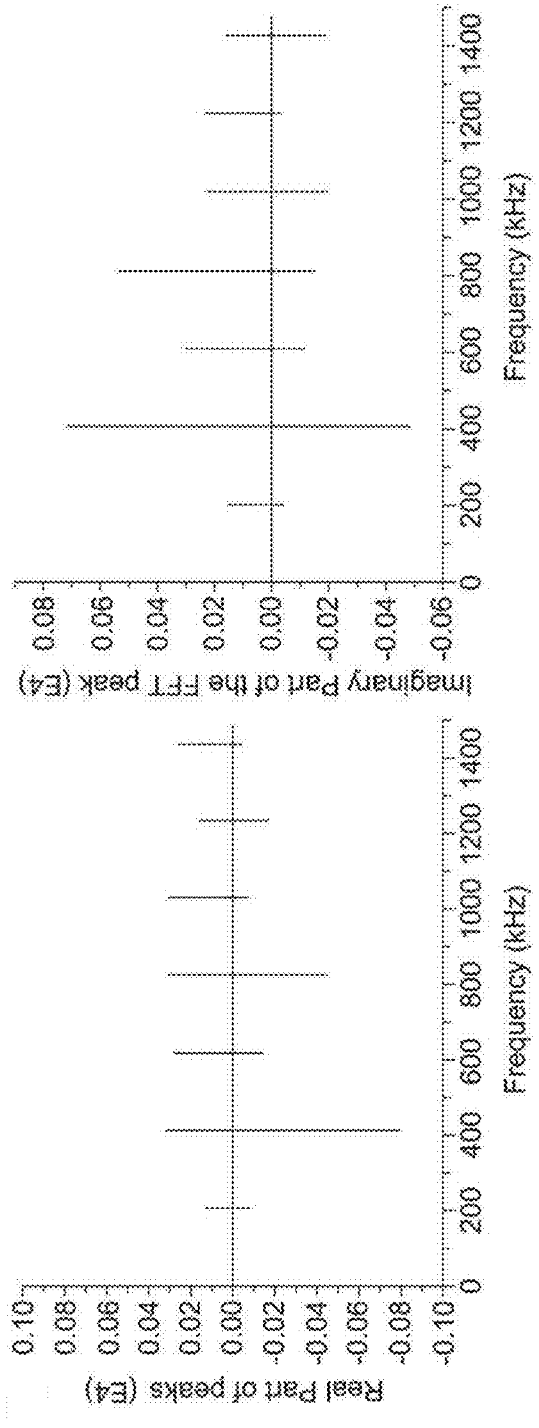
Figure 27E:
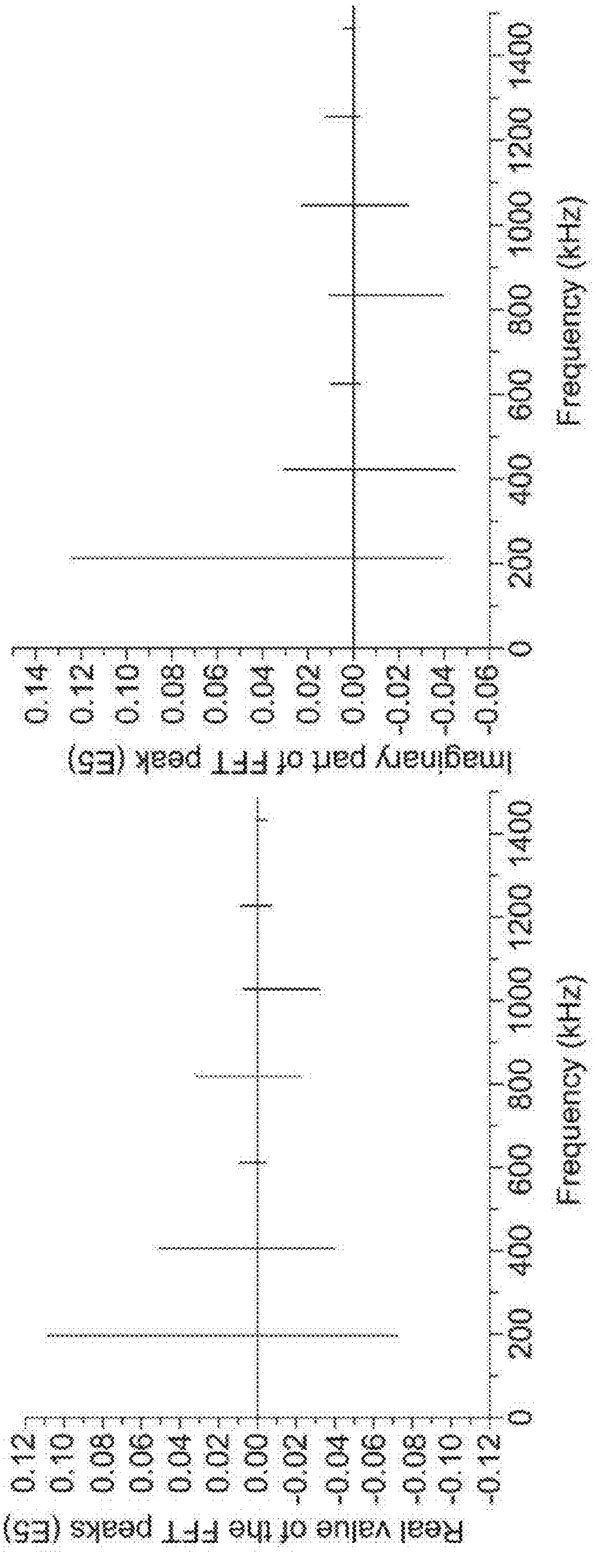

FIG. 26*a-c* show three image charge signals obtained using only one image charge detector, which have been converted from the time domain into the frequency domain using an FFT and modified using different formulae.

FIG. 27*a-e* show results of simulations performed in Example 1.

FIG. 28*a-e* show results of simulations performed in Example 1.

FIG. 29*a-e* show results of simulations performed in Example 2.

Figure 30A:
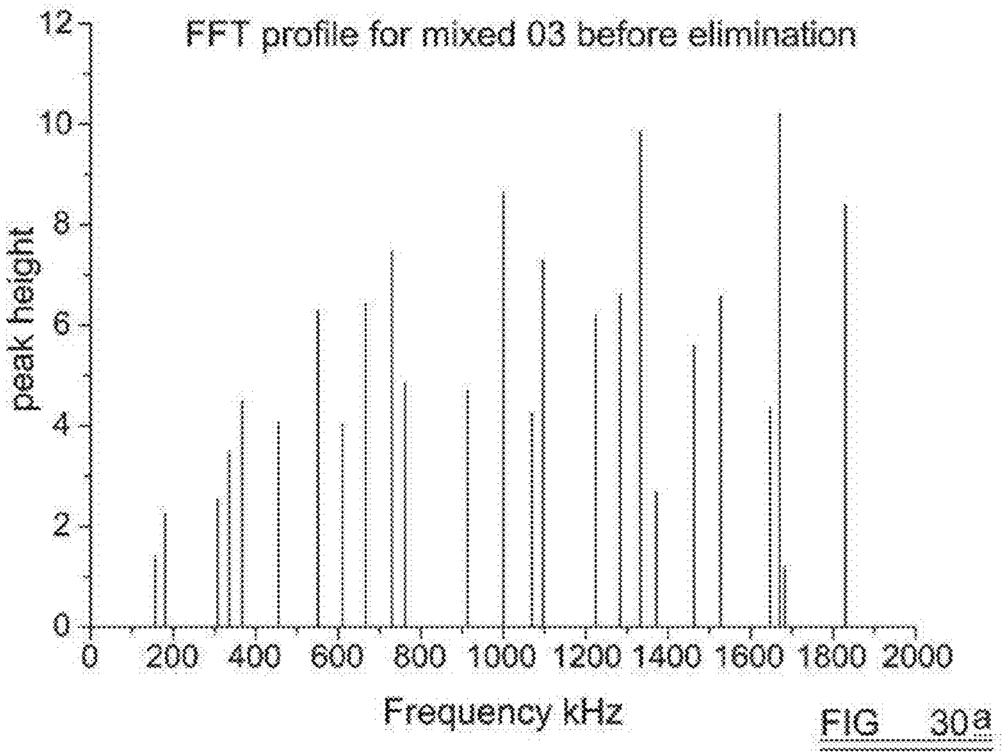
Figure 30B:
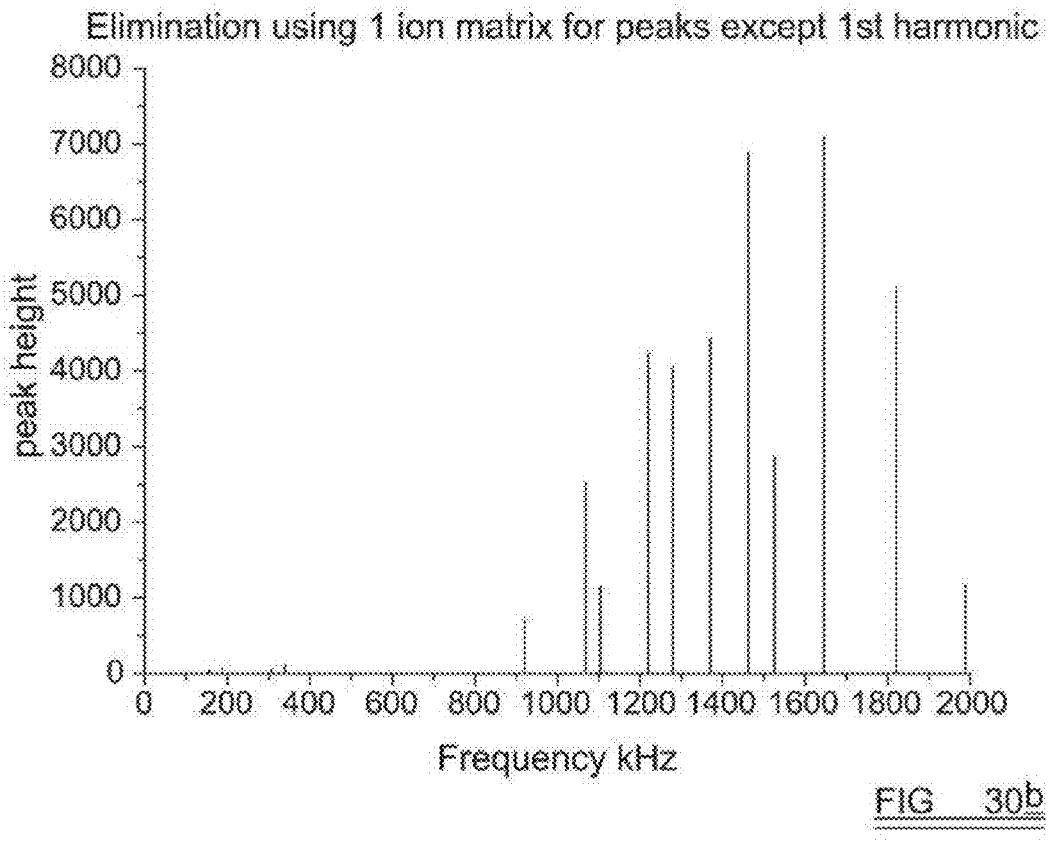
Figure 30C:
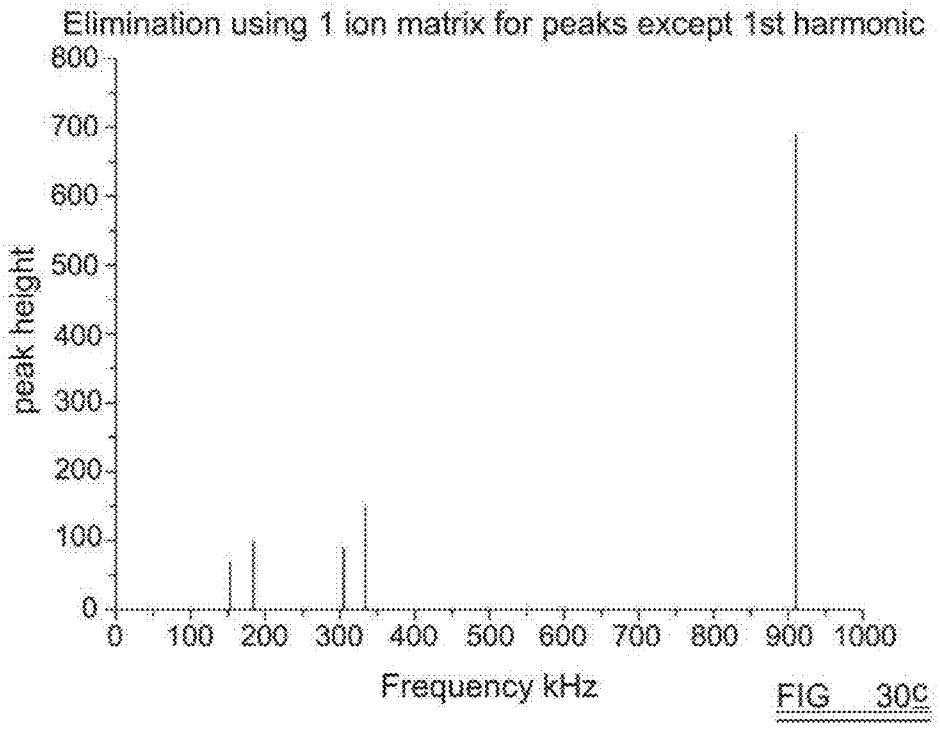
Figure 30D:
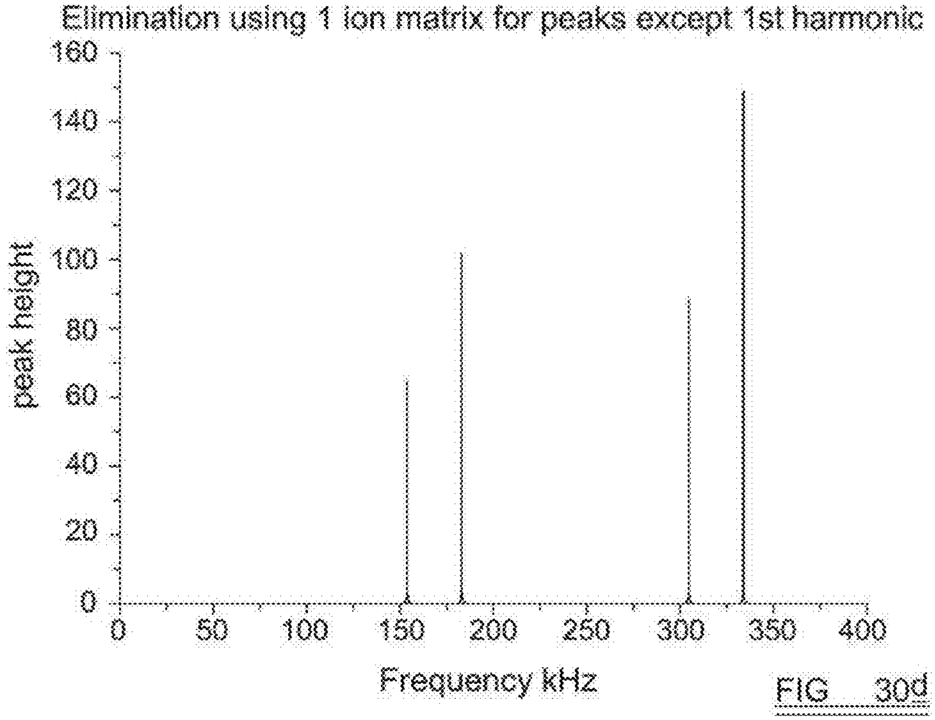
Figure 30E:
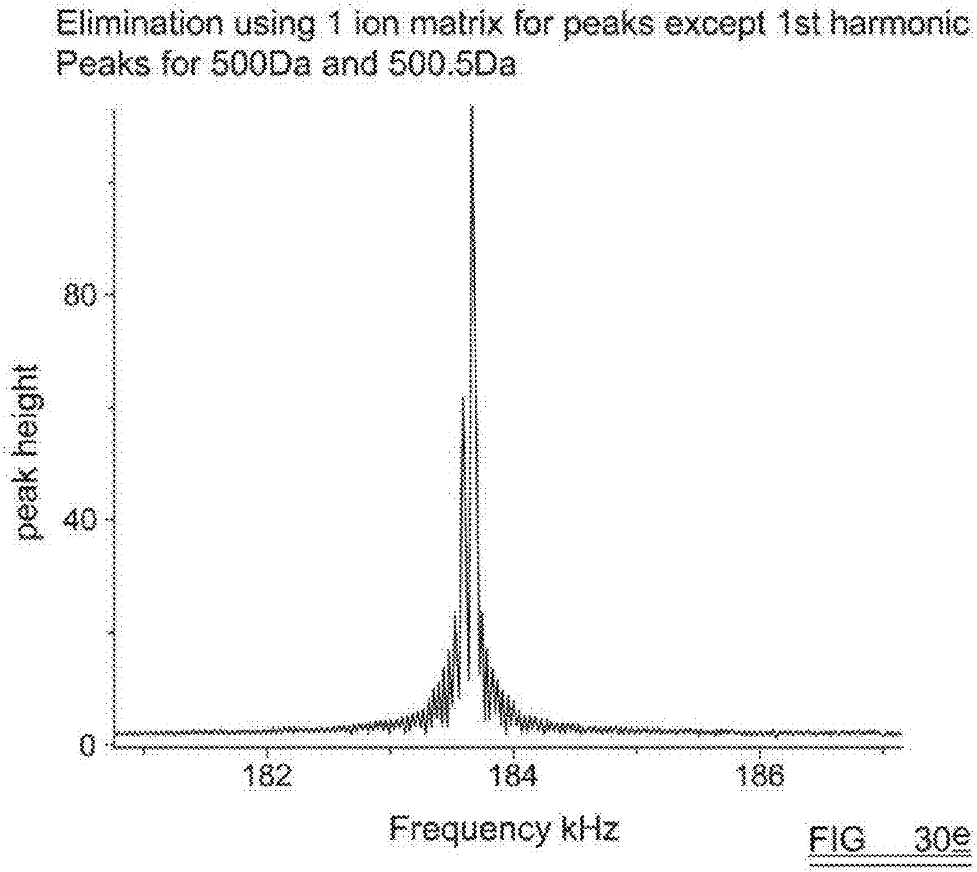
Figure 30F:
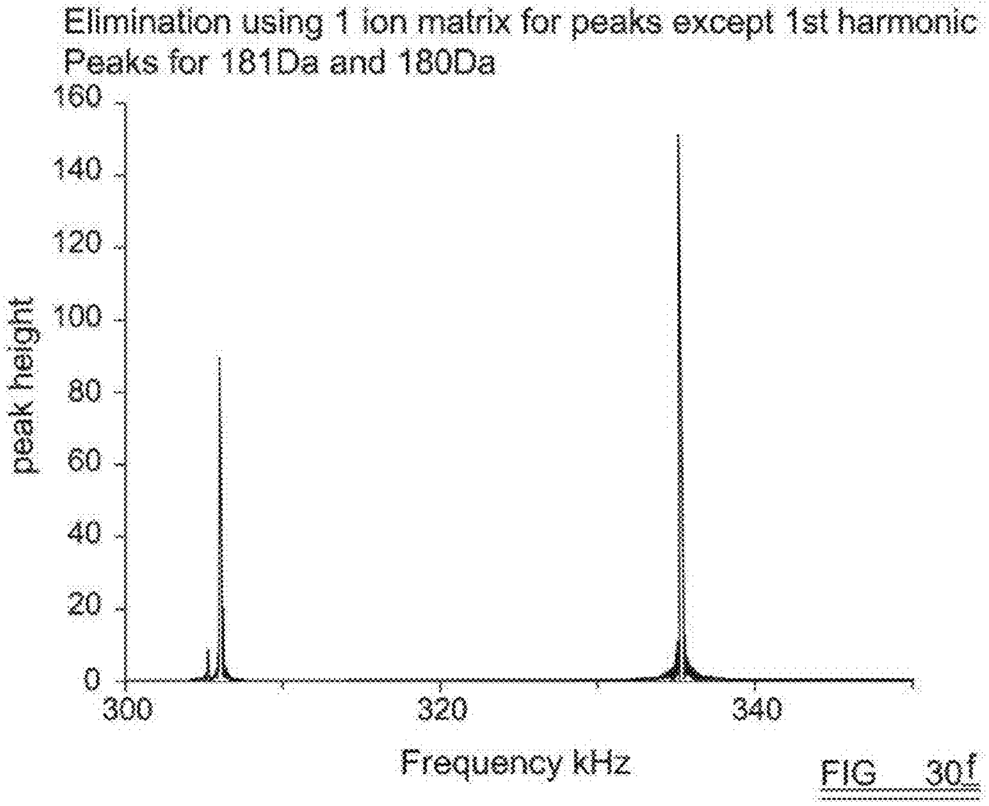
Figure 30G:
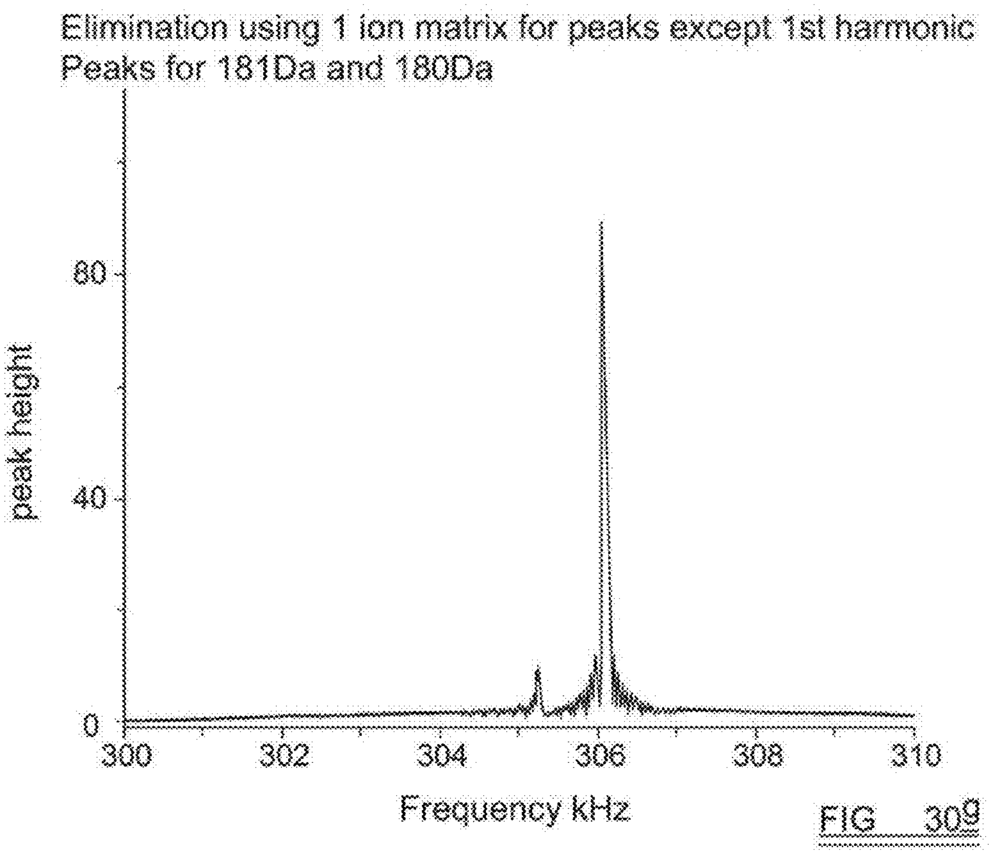
Figure 30H:
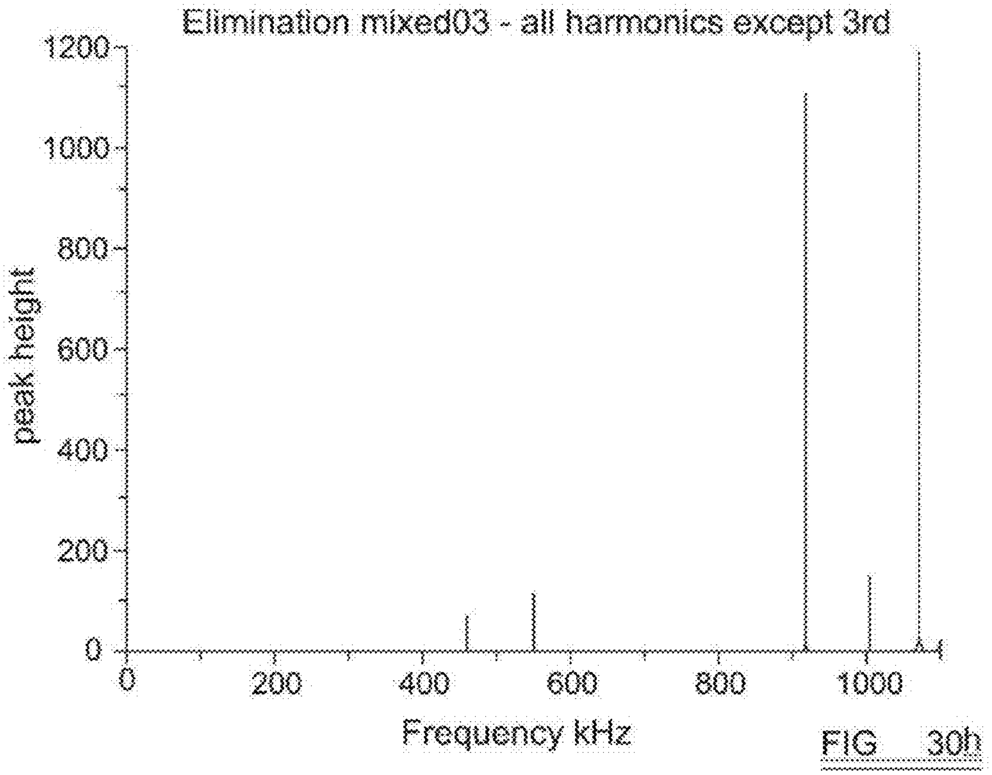
Figure 30I:
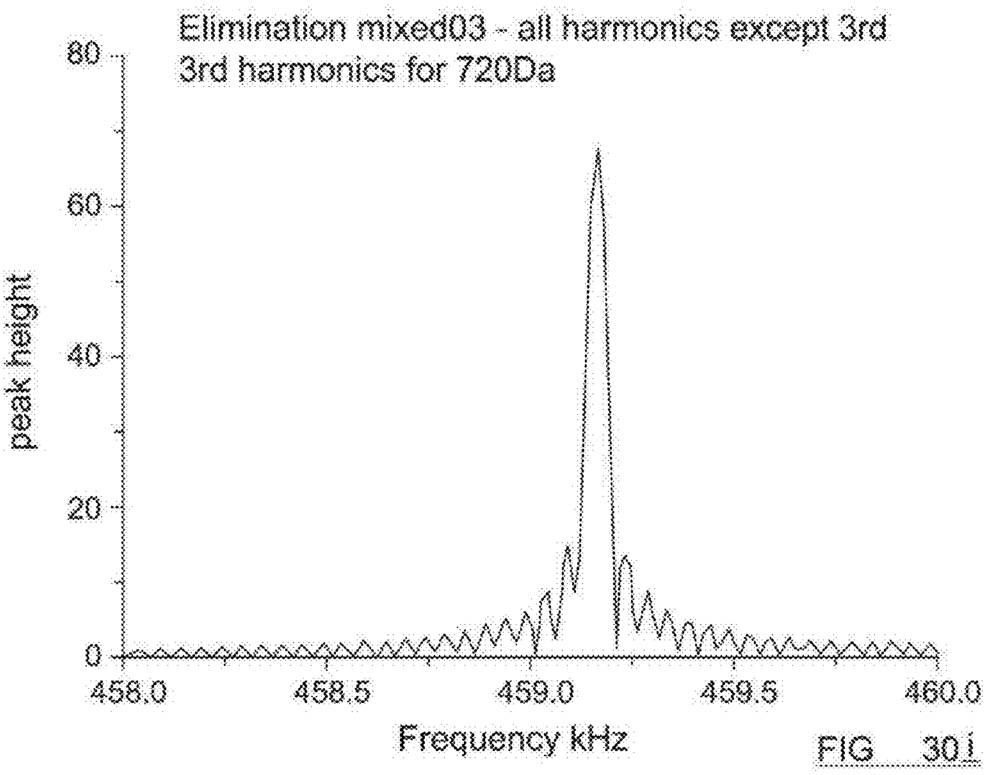
Figure 30J:
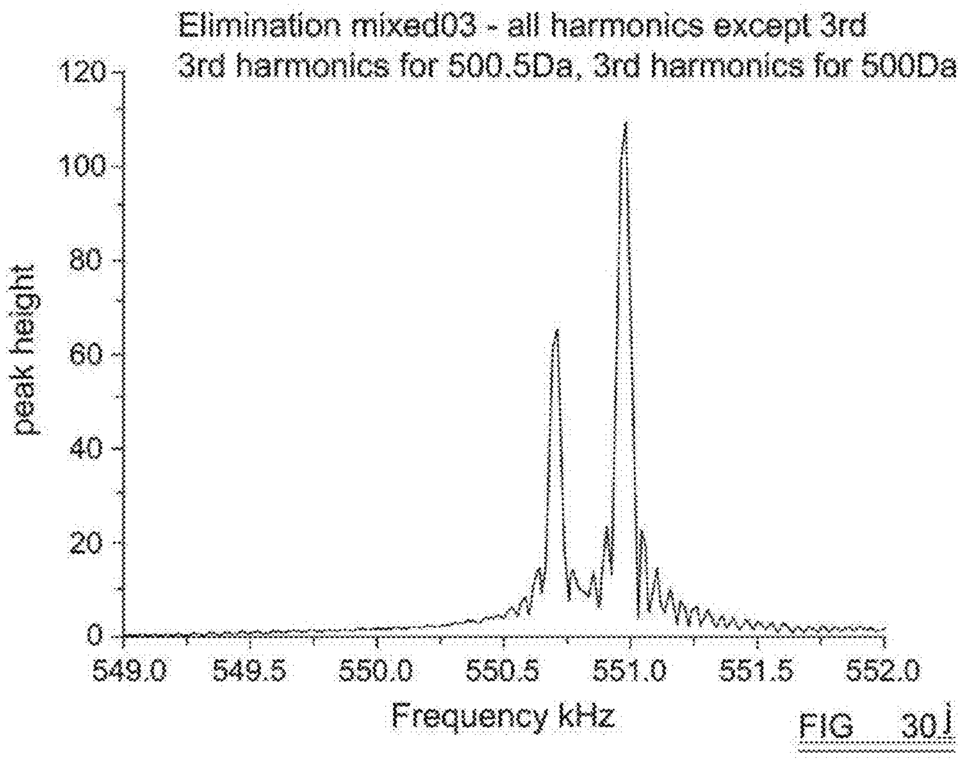
Figure 30K:
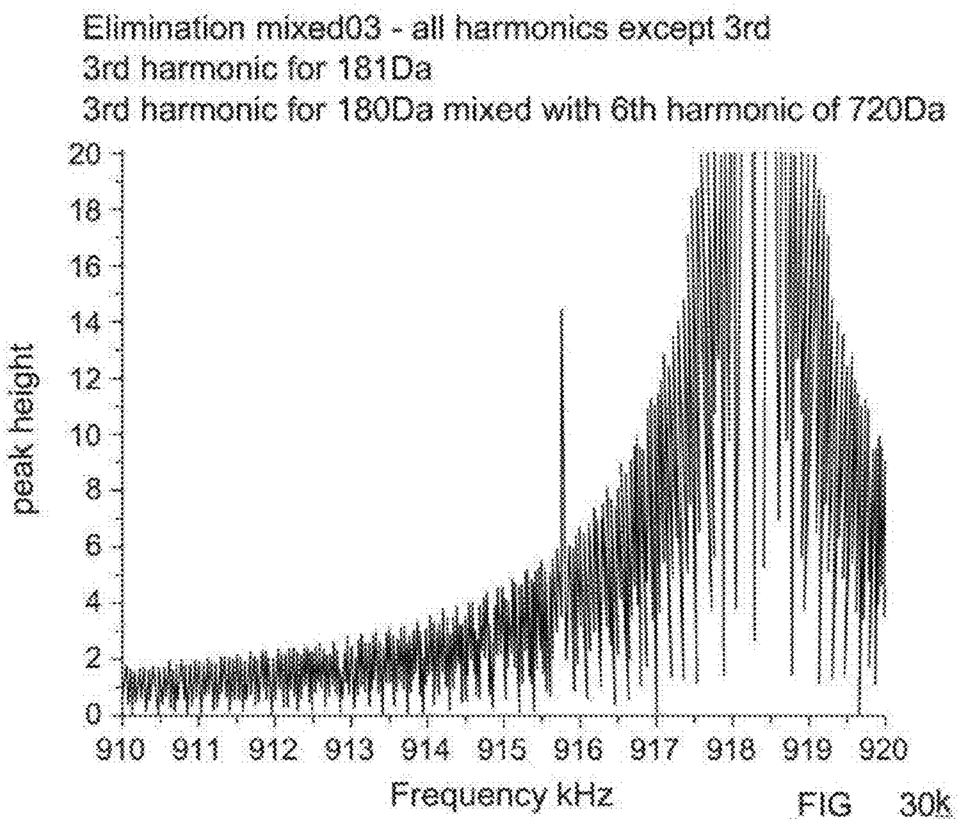
Figure 30L:
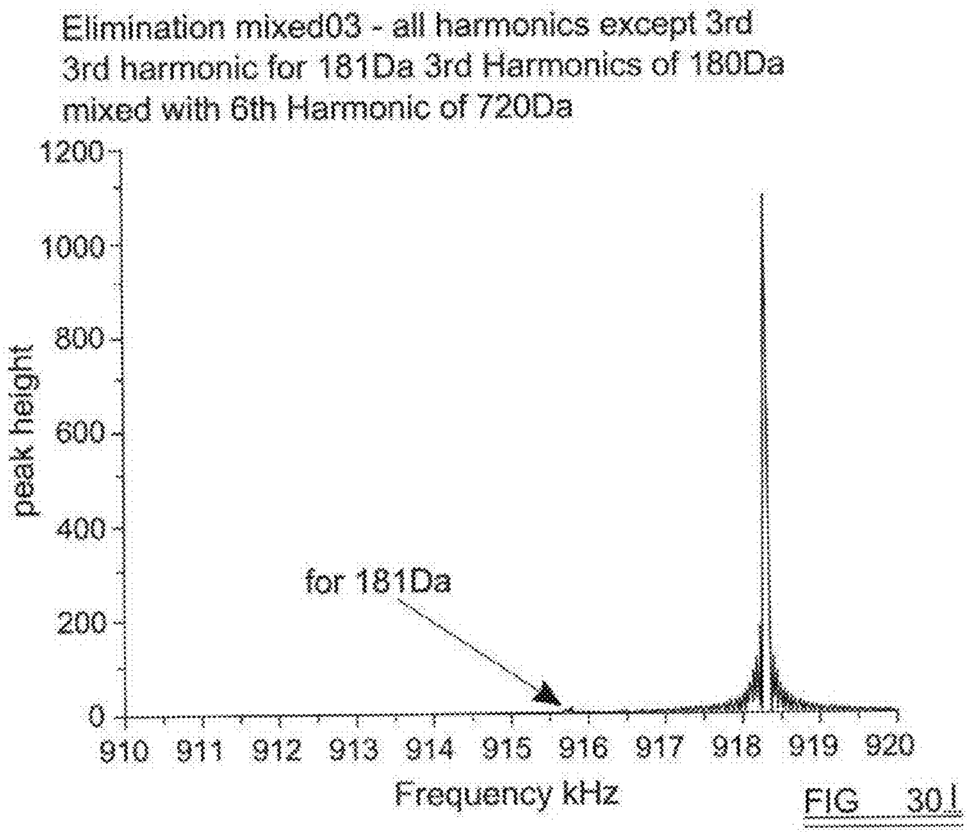
Figure 30M:
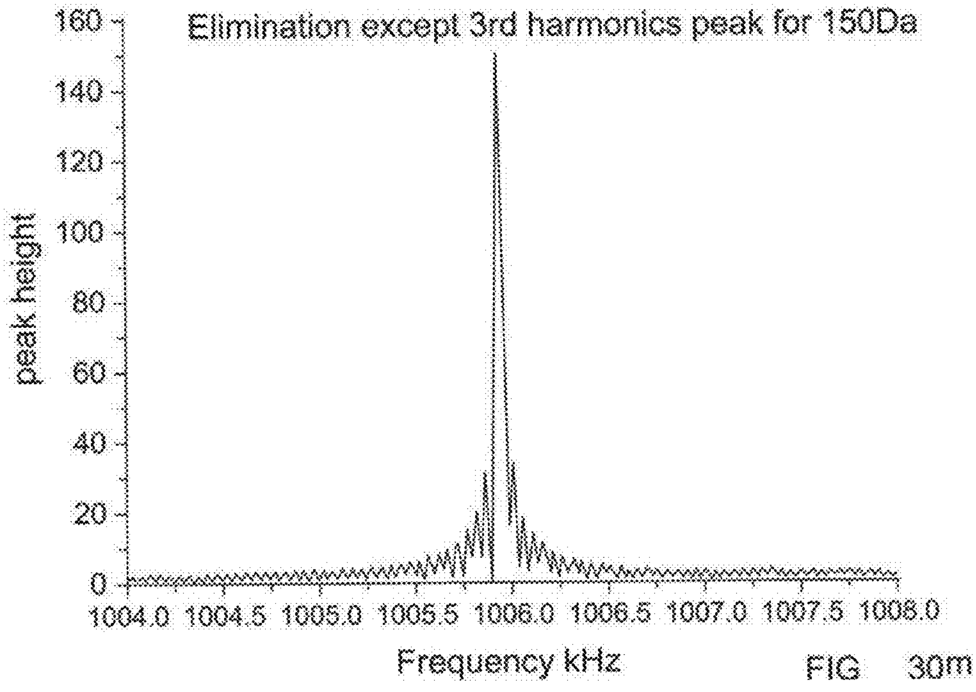
Figure 30N:
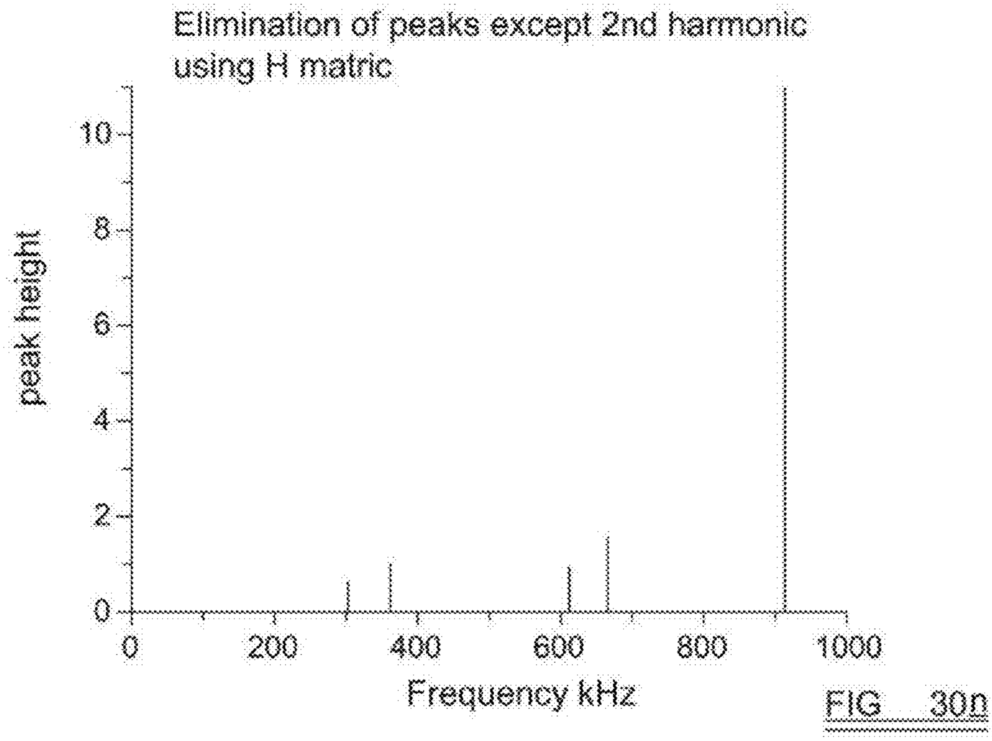
Figure 30O:
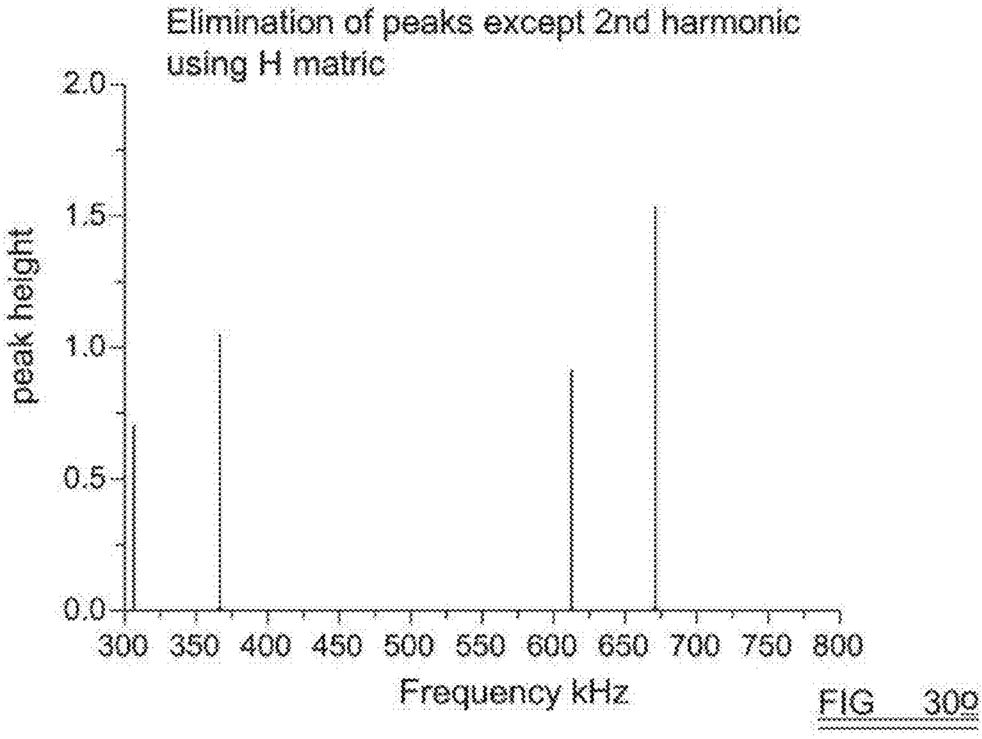
Figure 30P:
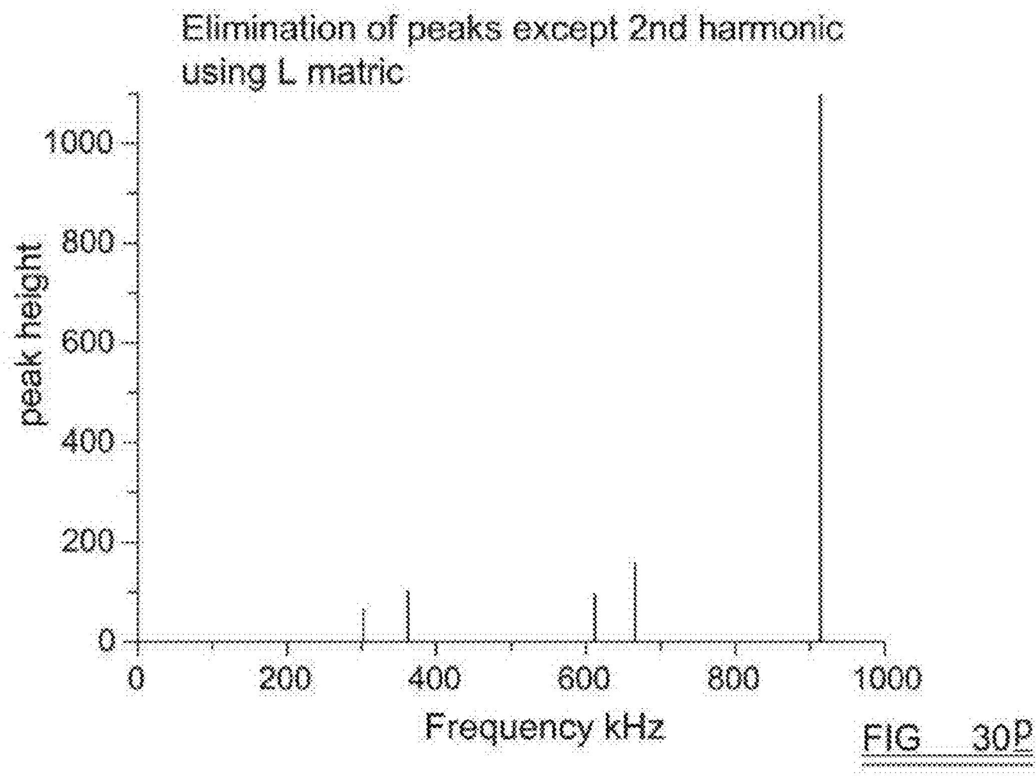
Figure 30Q:
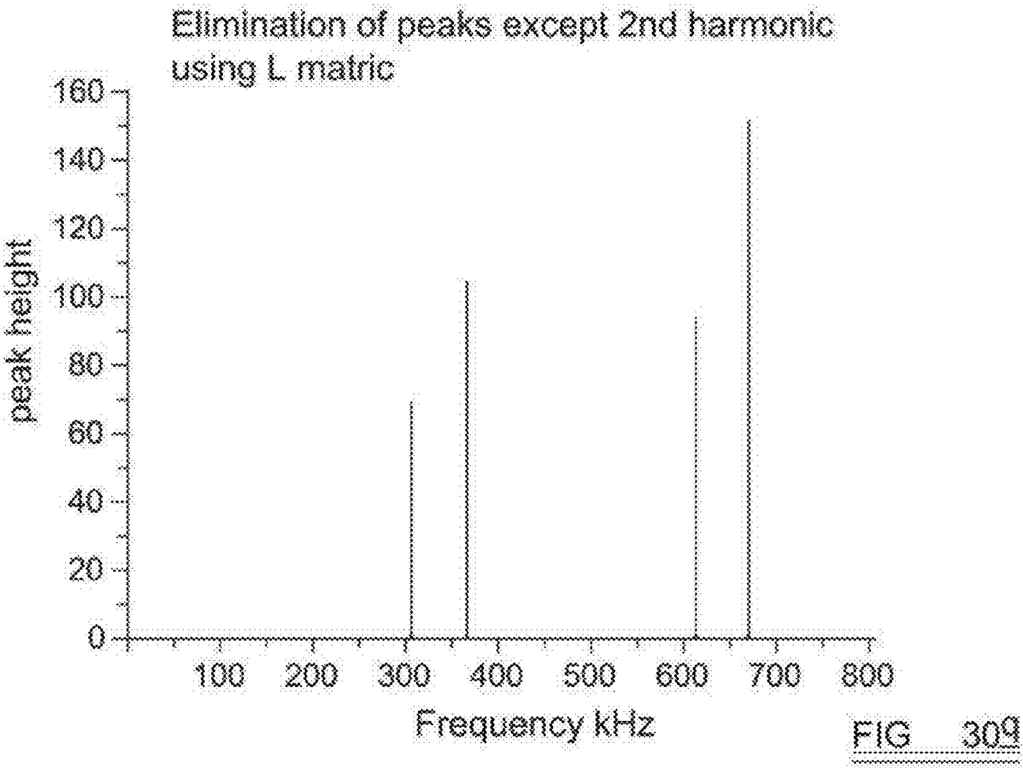
Figure 30R:
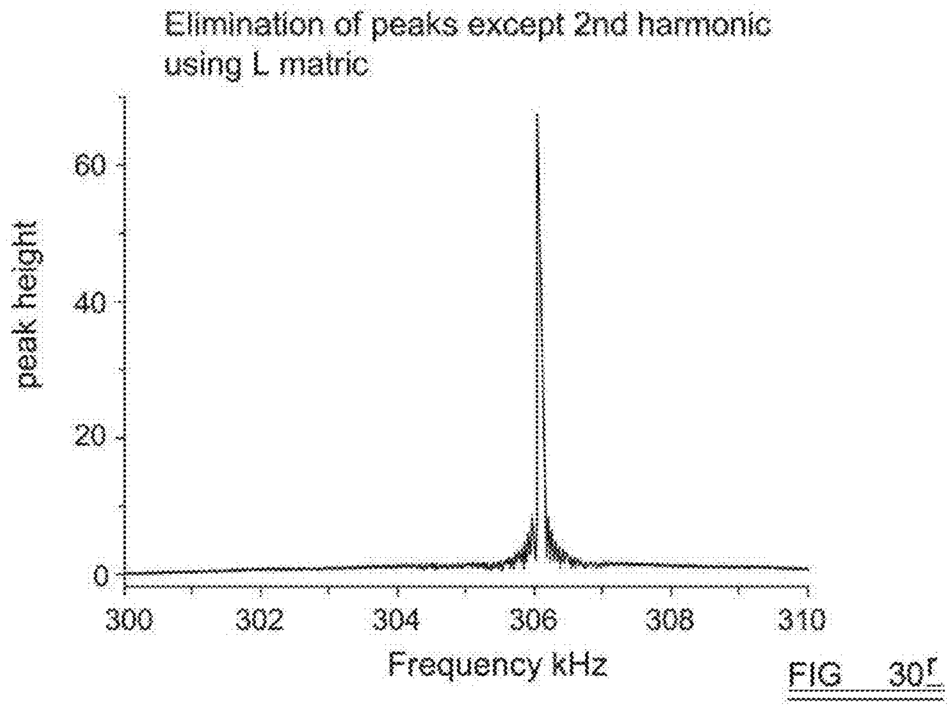
Figure 30S:
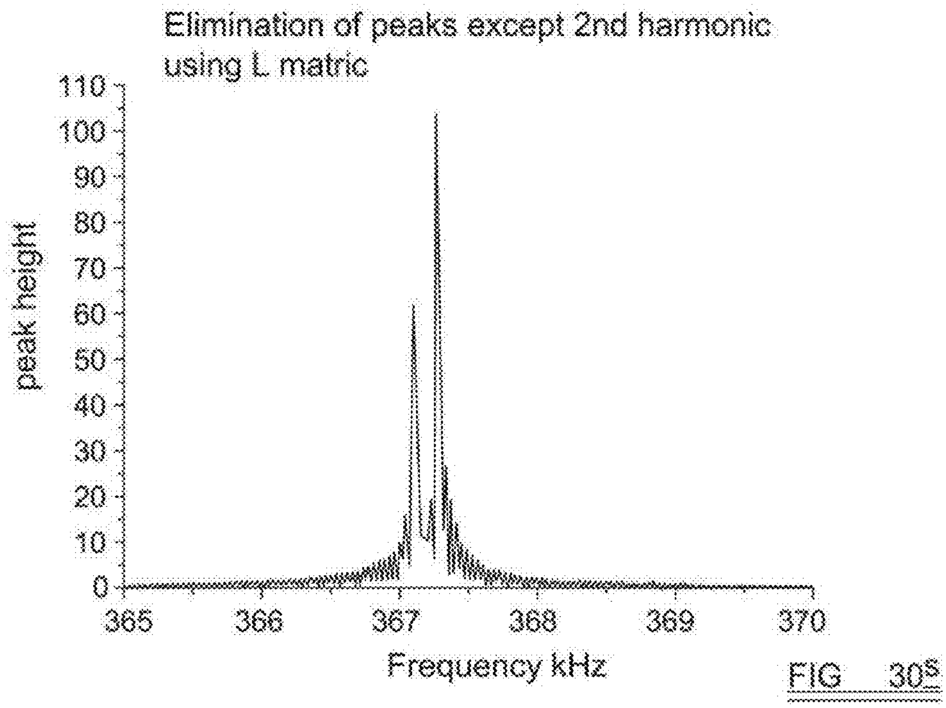
Figure 30T:
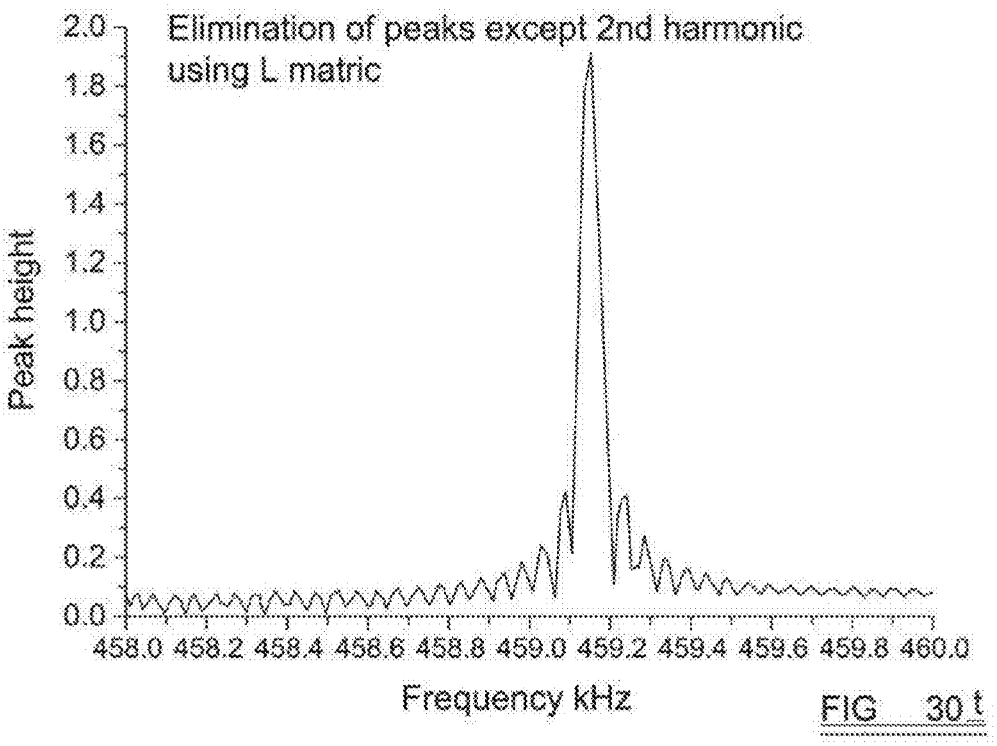
Figure 30U:
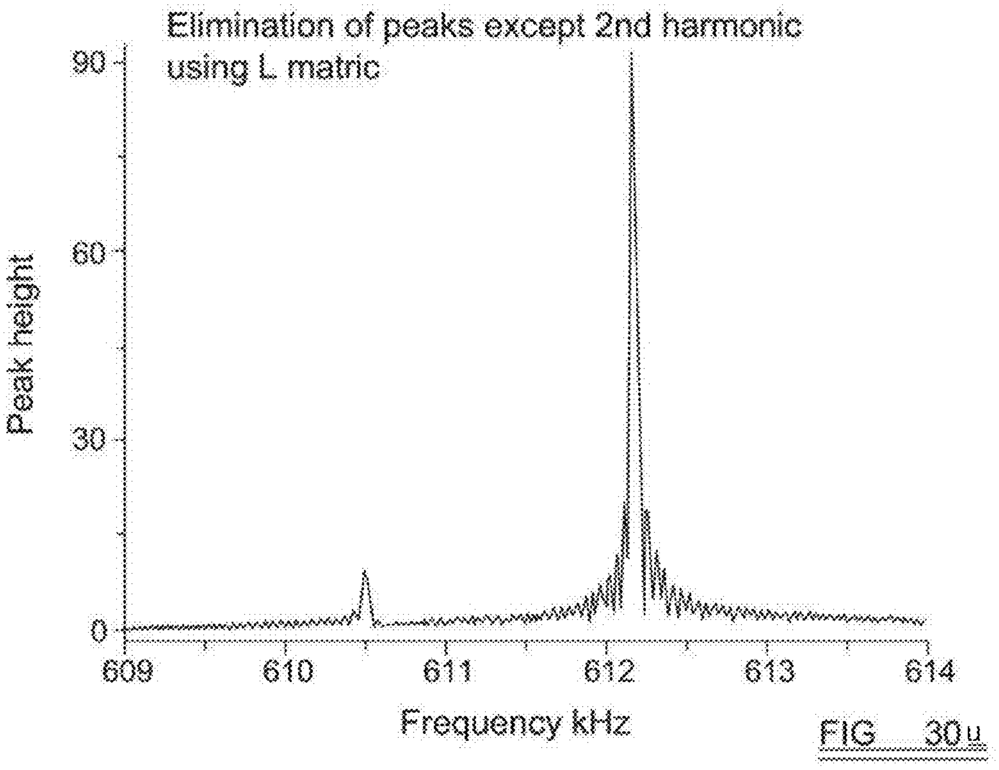
Figure 30V:
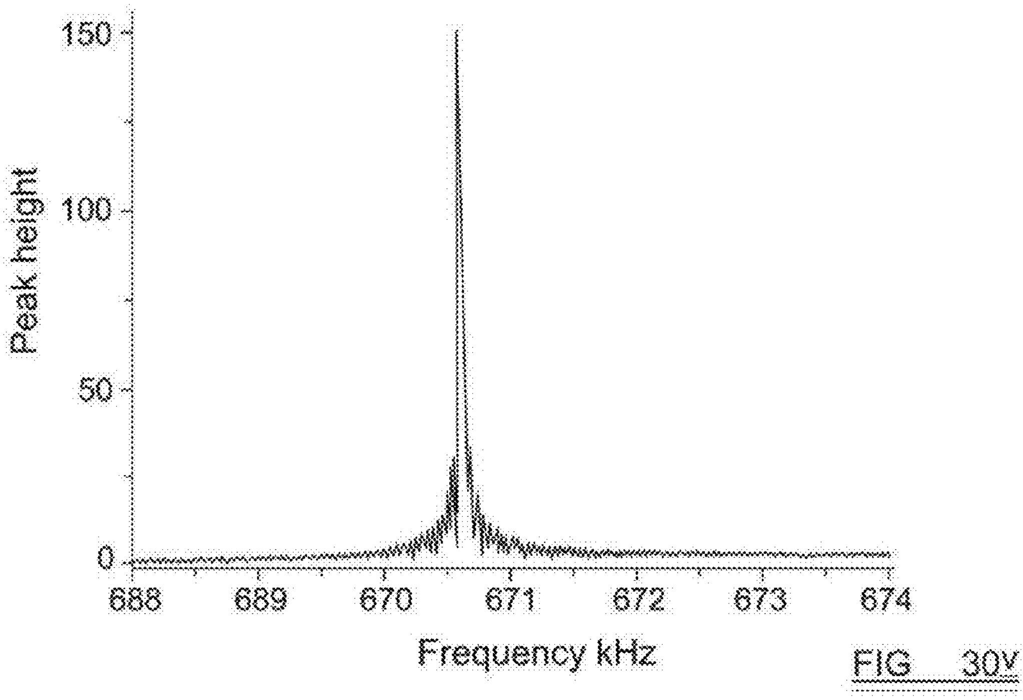
Figure 30W:
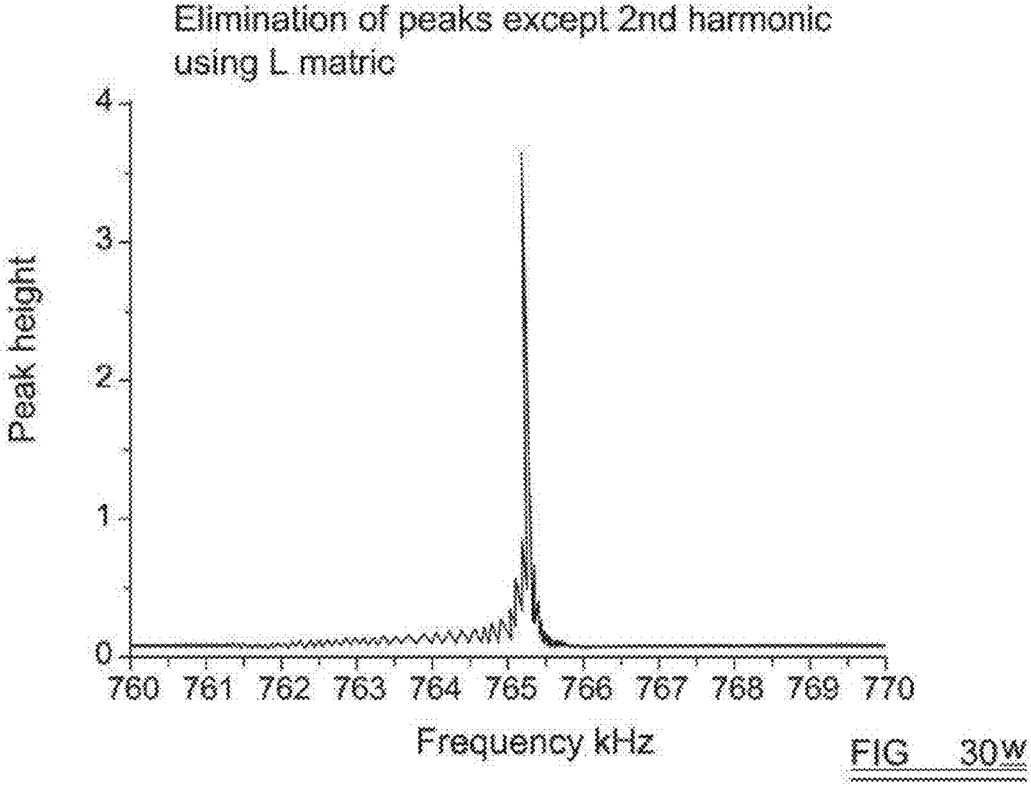
Figure 30X:
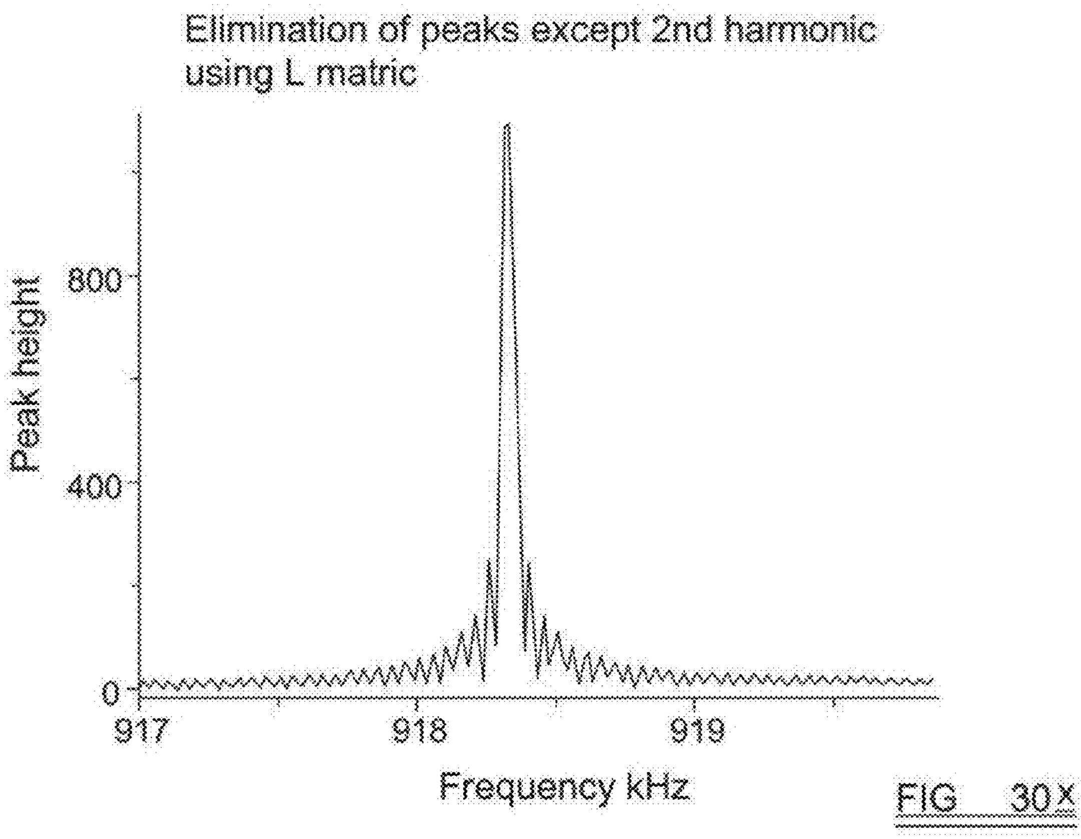

FIG. 30*a-x* show results of simulations performed in Example 2.

One way to address the difficulties described previously with reference to FIG. 1*a-c* is to limit the range of mass/charge ratios of the ions used to obtain the image charge/current signals, e.g. such that the mass/charge ratios of the ions used to obtain the image charge/current signals do not vary by more than 10%. This can help to avoid overlap between the peaks belonging to each harmonic component in the frequency domain (compare FIG. 1*b* with FIG. 1*c*) but is burdensome, as it severely limits the range of mass/charge ratios that can be studied per image charge/current signal obtained.

Another way to address these difficulties, without having to limit the range of mass/charge ratios of the ions, is to use computational methods to acquire useful information regarding the mass/charge ratio of the ions from the image charge/current signals. Computational methods have been developed which are able to utilise the information provided by each harmonic component in an image charge/current signal, see e.g. the "orthogonal projection" method referred to above. However, existing computational methods tend to be computationally intensive, such that they are not necessarily practical for all (e.g. online) applications.

The processing apparatus 40 shown in FIG. 2, which may include a computer, is preferably configured to perform a method of processing a plurality of image charge/current signals representative of trapped ions undergoing oscillatory motion in the mass analyser 20 obtained using the at least one image charge/current detector 30, the method including producing a linear combination of the plurality of image charge/current signals using a plurality of predetermined coefficients, the predetermined coefficients having been selected so as to supress (more preferably substantially eliminate) at least one harmonic component of the image charge/current signals within the linear combination of the plurality of image charge/current signals.

Preferably, the processing apparatus 40 shown in FIG. 2 is further configured to provide the linear combination of the plurality of image charge/current signals in the frequency domain, e.g. by producing a linear combination of the plurality of image charge/current signals in the time domain, then converting the linear combination of the plurality of image charge/current signals from the time domain into the frequency domain (e.g. using an FT, preferably a discrete FT such as an FFT).

Alternatively the linear combination in the time domain could be produced before the analogue to digital converter, e.g. in an analogue circuit. For example, the gain of a respective amplifier connected with each image charge/current detector could be set in proportion to a respective predetermined coefficient, preferably with the image charge/current signals being linearly combined in an analogue circuit, such as an operational amplifier. An advantage of this arrangement is that the linear combination can be produced more quickly. In this arrangement, complex predetermined coefficients could be expressed by complex transmission functions of the analogue circuits, which can be set or adjusted manually or digitally with modern electronics devices.

Note that the linear combination of the plurality of image charge/current signals in the frequency domain can be viewed as mass spectrum data providing information regarding the mass/charge ratio distribution of the ions that have been trapped.

Theory and examples relating to selecting the predetermined coefficients so as to supress (more preferably substantially eliminate) at least one harmonic component of the image charge/current signals within the linear combination of the plurality of image charge/current signals are discussed in detail below.

FIG. 24 is an example of an electrostatic ion trap mass analyser 120 for use in the ion trap mass spectrometer 1 of FIG. 2.

The mass analyser 120 shown in FIG. 24 is preferably configured to trap ions produced by an ion source using an electrostatic field such that the trapped ions undergo oscillatory motion. In more detail, the mass analyser 120 shown in FIG. 24 is preferably configured as a planar electrostatic ion trap. It preferably comprises a top and bottom arrays of circular or ring electrodes 132A-I to form a trap field in region 121 in between the two arrays. At an outer edge, a "trapping region" is preferably attached with an injector 123 preferably configured with 2 injector electrodes 124. Once the ions are injected into the trapping region 121, they will preferably carry out oscillatory motion diametrically, or with a small precession around the central axis in a trajectory as shown by the label 22. Because the ions fly about the central plane, this kind of trap can be referred to as a "planar electrostatic ion trap". A set of trapping voltages are preferably applied to the electrodes 132A to 132I, which may be referred to as "field forming" electrodes, in both the top and bottom arrays, preferably so as to produce an electrostatic field that satisfies preferred isochronous and focusing conditions. At the same time by properly selecting a coupling circuit, some of these circular and ring electrodes can be used as "pick up" electrodes for use as image charge/current detectors. In this example shown, each of five of the electrodes 132A, 132B, 132D, 132F, 132H is configured as a respective image charge/current detector (which preferably also includes a respective charge sensitive amplifier, see below) configured to produce a respective image charge/current signal representative of trapped ions undergoing oscillatory motion in the mass analyser 120. More specifically, the centre electrode 132A and 4 ring electrodes 132B, 132D, 132F, 132H are selected to be the "pick-up" electrodes for image charge/current detection. These "pick-up" electrodes 132A, 132B, 132D, 132F, 132H are preferably connected to respective charge sensitive amplifiers which are preferably mounted in vicinity of the mass analyser 120 and their output signals are sent out for processing.

In the specific example shown in FIG. 24, five "pick-up" electrodes 132A, 132B, 132D, 132F, 132 H of the mass analyser 120 are configured as image charge detectors, each configured to produce an analogue image charge/current signal representative of trapped ions undergoing oscillatory motion in the mass analyser 120. In general, image charge signals obtained using the five "pick-up" electrodes 132A, 132B, 132D, 132F, 132H shown in FIG. 24, whilst being periodic according to an oscillation frequencies of the ions, will not be sinusoidal. Rather, depending on the location, size and shape of the "pick-up" electrodes 132A, 132B, 132D, 132F, 132H, they will tend to form certain distinct waveform patterns.

FIG. 25*a* shows image charge signals A, B, D in the time domain obtained using a first 132A, second 132B and third 132D "pick-up" electrode of the mass analyser 120 of FIG. 24 in a simulation.

For the simulation, ions having only one mass/charge ratio were simulated as being trapped by the mass analyser 120 of FIG. 24. The image charge signals shown in FIG. 25*a* are therefore representative of trapped ions having only one mass/charge ratio undergoing oscillatory motion in the mass analyser 120 of FIG. 24.

FIG. 25*b* shows the image current signals A, B, D obtained by differentiating the image charge signals shown in FIG. 25*b*.

Note that the waveforms of the image charge and image current signals A, B, D obtained using the first, second and third "pick-up" electrodes 132A, 132B, 132D share the same repetition frequency but have different shapes, owing e.g. to factors such as the location, size and shape of these "pick-up" electrodes 132A, 132B, 132D.

FIG. 29*a-e*, described below in more detail, respectively show image charge signals obtained using the first, second, third, fourth and fifth "pick-up" electrodes 132A, 132B, 132C, 132D, 132E of the mass analyser 120 of FIG. 24, which unlike the signals A, B, D shown in FIG. 25, have been converted from the time domain into the frequency domain using an FFT.

FIG. 29*a-e* can therefore be viewed as mass spectrum data providing information regarding the mass/charge ratio distribution of ions that have been trapped in the mass spectrometer 120 of FIG. 24.

A number of harmonic components of the image charge signals can easily be identified in FIG. 29*a-e*, because the ions used in the simulation used to produce FIG. 29*a-e* had only one mass/charge ratio, meaning that each harmonic component is expressed as a single harmonic peak. The first-fifth harmonic peaks are labelled $H_1$-$H_5$ in FIG. 29*a-e*.

Note that the harmonic peaks in the image charge signals shown in FIG. 29*a-e* occur at the same frequency irrespective of which "pick-up" electrode was used to obtain the image charge signal, with the same gaps occurring between these harmonic peaks. However, the heights of the harmonic peaks are different depending on which "pick-up" electrode was used to obtain the image charge signal, these heights being dependent on factors such as the size, shape and location of the "pick-up" electrode.

By producing a linear combination of the signals shown in FIG. 29*a-e* using carefully selected coefficients, it is possible to suppress (more preferably substantially eliminate) at least one harmonic component of the image charge signals by careful selection of predetermined coefficients to be used in the linear combination. This suppression/substantial elimination is preferably general for ions of different mass/charge ratios, so that the suppression/substantial elimination applies equally to harmonic peaks caused by ions of all mass/charge ratios, not just the mass/charge ratio used for the simulation used to obtain FIG. 28 and FIG. 29.

Theory

Details of the theory underlying the invention will now be discussed, with reference to FIG. 24, FIG. 27 and FIG. 29*a-e*. The present inventors do not wish to be bound by this theory, which is provided for the purposes of enhancing a reader's understanding of the invention.

The following discussion provides an example method for substantially eliminating four harmonic components out of the first five harmonic components of image charge signals, using five image charge/current signals obtained by:

- producing ions;
- trapping the ions using a mass analyser, such that the trapped ions undergo oscillatory motion in the mass analyser;
- obtaining five image charge/current signals representative of the trapped ions undergoing oscillatory motion in the mass analyser;
- providing the plurality of image charge/current signals in the frequency domain.

For the purposes of this discussion, it is assumed that each of the five image charge/current signals is an image charge/current signal obtained using a respective image charge detector (including a respective "pick-up" electrode and a respective charge sensitive amplifier) of the mass analyser 120 shown in FIG. 24.

1. Generality in the Profile of Harmonic Peaks in a Fourier Transform of Image Charge/Current Signals Caused by Different Masses If it is assumed that there are different masses, m and $a^2$m, that will induce the same amount of image charge, but that the speed of variation is inverse proportion to a. If the image charge signal for the first ion of mass m is $I_1(t)$, then for the second ion of mass $a^2$m, the image charge signal should be:

$$I_2(t)=I_1(t/a) \quad [1.1]$$

This is due to the velocity of the second ion reduces by factor of a, and in turn the time profile expand by factor of a.

It can be proved that if the signal last forever ($-\infty \le t \le \infty$), and FT $(I_1(t))=F_1(\upsilon)$, then $$FT(I_2(t)=F_1(a\upsilon) \quad [1.2]$$

This means that after a Fourier transform, the frequency domain signals of two masses have same profile but the one with larger mass is compressed in the υ axis by a factor of a. The ratios between the harmonic peaks should not be affected by such compression.

2. Selecting Coefficients for Suppressing/Substantially Eliminating Harmonic Components The following discussion describes selecting coefficients for suppressing/substantially eliminating harmonic components in a linear combination of image charge/current signals obtained using five image charge detectors, in the manner described above.

From each image charge detector, we can obtain an image charge/current signal and perform an FFT to provide the image charge/current signal in the frequency domain as $F_j(\upsilon)$, where j is an index of the detector used to obtain the image charge/current signal.

An index k=1, 2, 3, 4, 5 is used to indicate each of the first five harmonic components of the image charge/current signals in the frequency domain, i.e. such that k=1 indicated the first ("fundamental") harmonic component.

Now, for the jth image charge/current signal in the frequency domain (e.g. obtained using the second image charge detector), the complex value of the kth harmonic peak intensity caused by ions having a reference mass/charge ratio m/z can be recorded as a respective element $C_{jk}$ (m/z) of an "elimination" matrix C:

$$C=\begin{pmatrix} C_{11}(m/z) & C_{21}(m/z) & C_{31}(m/z) & C_{41}(m/z) & C_{51}(m/z) \\ C_{12}(m/z) & C_{22}(m/z) & C_{32}(m/z) & C_{42}(m/z) & C_{52}(m/z) \\ C_{13}(m/z) & C_{23}(m/z) & C_{33}(m/z) & C_{43}(m/z) & C_{53}(m/z) \\ C_{14}(m/z) & C_{24}(m/z) & C_{34}(m/z) & C_{44}(m/z) & C_{54}(m/z) \\ C_{15}(m/z) & C_{25}(m/z) & C_{35}(m/z) & C_{45}(m/z) & C_{55}(m/z) \end{pmatrix}$$

As an example, the element $C_{24}$(m/z) in the elimination matrix C indicates, for the second image charge/current signal (e.g. obtained using the second image charge detector) in the frequency domain, the complex value of the fourth harmonic peak caused by ions having the reference mass/charge ratio m/z. This would correspond to the complex value of the peak labelled $H_4$ in FIG. 29*d*, for example.

The process of recording the element $C_{jk}$ can be simplified by obtaining image charge/current signals using ions having only the reference mass/charge ratio m/z, since this means that, in the frequency domain, each harmonic component will expressed as a single harmonic peak caused by ions having the reference mass/charge ratio m/z. However, it should still be possible to record the elements $C_{jk}$ if image charge/current signals are produced using ions having more than one mass/charge ratio, provided that, in the frequency domain, the harmonic peaks caused by ions having the reference mass/charge ratio can be identified.

A function $F_j(\upsilon)$ may be defined to represent the image charge/current signal obtained using the jth image charge detector in the frequency domain.

Each row in the elimination matrix C can be viewed as the function $F_j(\upsilon)$ sampled at frequencies corresponding to each of the first five harmonic components.

If it is aimed to eliminate the k th harmonic peak by linear combination, the correspondent row in matrix C should satisfy the relation:

$$C_{1k}x_1+C_{2k}x_2+C_{3k}x_3+C_{4k}x_4+C_{5k}+x_5=0$$

A "solution" vector X of five undetermined coefficients may be defined as:

$$X=[x_1,x_2,x_3,x_4,x_5]^T$$

Then, a linear combination L of the five image charge/current signals sampled at corresponding harmonic peak frequencies in the frequency domain using the five undetermined coefficients can be given by L=CX, For the elimination of the second, third, fourth and fifth harmonic components, equation L=CX must be satisfied, where the vector L may be defined as $L=[a,0,0,0,0]^T$, where a is a non-zero element, preferably with a=1. This will leave only the first harmonic component out of the first five harmonic components.

The solution vector X aimed at eliminating all but one of the first five harmonic components can be obtained as:

$$X=C^{-1}L \qquad [2.1]$$

This leaves five linear equations aimed at eliminating the second, third, fourth and fifth harmonic components:

$$C_{11}x_1 + C_{21}x_2 + C_{31}x_3 + C_{41}x_4 + C_{51}x_5 = a$$
$$C_{12}x_1 + C_{22}x_2 + C_{32}x_3 + C_{42}x_4 + C_{52}x_5 = 0$$
$$C_{13}x_1 + C_{23}x_2 + C_{33}x_3 + C_{43}x_4 + C_{53}x_5 = 0$$
$$C_{14}x_1 + C_{24}x_2 + C_{34}x_3 + C_{44}x_4 + C_{54}x_5 = 0$$
$$C_{15}x_1 + C_{25}x_2 + C_{35}x_3 + C_{45}x_4 + C_{55}x_5 = 0$$

With five undetermined coefficients:

$$x_1,x_2,x_3,x_4,x_5.$$

Solving these linear equations is trivial, and allows coefficients $x_1$, $x_2$, $x_3$, $x_4$, $x_5$ to be selected so as to eliminate the second, third, fourth and fifth harmonic components, leaving behind first, sixth and higher order harmonic components.

In above process, the coefficients are found based on the matrix C which is sampled from the peak value of a number of harmonic frequency points. The coefficients $x_j$ can be then applied to the whole frequency spectrum $F_j(\upsilon)$ to achieve the peak elimination after the linear combination.

It has already been shown that the profile of the image charge/current signal in the frequency domain is independent of the mass/charge ratio of ions used, such that all elements in the elimination matrix C (which may be the complex value of harmonic peak intensities) will change by only a common factor depending on what mass/charge ratio is chosen as the reference mass/charge ratio for populating the elimination matrix C. That is:

$$C_{jk}(m/z') = G\left(\frac{m/z'}{m/z}\right)C_{jk}(m/z) \qquad [2.2]$$

where G((m/z')/(m/z)) is a mass to charge ratio dependent factor function and m/z and m/z' are different reference mass/charge ratios.

It follows that the vector L'=C(m/z')X, which represents the frequency spectrum caused by ions having a different reference mass/charge ratio m/z' (in a linear combination of the five image charge signals), should also have second, third, fourth and fifth elements that are substantially eliminated (=0), leaving behind first, sixth and higher order harmonic components caused by ions having the different reference mass/charge ratio m/z'.

Similarly if $F=[F_1, F_2, F_3, F_4, F_5]$ represents five image charge/current signals in the frequency domain (FFT profiles), with the five image charge/current signals being representative of trapped ions having a mixture of many mass/charge ratios, the linear combination of image charge/current signals in the frequency domain ("frequency spectrum") represented by FX should have second, third, fourth and fifth harmonic components that are substantially eliminated, leaving behind first, sixth and higher order harmonic components caused by ions having the mixture of many mass/charge ratios.

Since FX provides information regarding the mass/charge ratio distribution of the ions that have been trapped, where one of the harmonic components is promoted relative to the other four harmonic components that are all supressed, FX can be viewed as mass spectrum data providing clearer information regarding the mass/charge ratio distribution of the ions that have been trapped.

FX is therefore the mass spectrum data we seek after for the mixture of many mass/charge ratios.

Here, it is to be noted that:

$$\begin{aligned} FX &= x_1F_1(\upsilon) + x_2F_2(\upsilon) + x_3F_3(\upsilon) + x_4F_4(\upsilon) + x_5F_5(\upsilon) \\ &= x_1FFT[F_1(t)] + x_2FFT[F_2(t)] + x_3FFT[F_3(t)] + x_4FFT[F_4(t)] + x_5FFT[F_5(t)] \\ &= FFT[x_1F_1(t)] + FFT[x_2F_2(t)] + FFT[x_3F_3(t)] + FFT[x_4F_4(t)] + FFT[x_5F_5(t)] \\ &= FFT[x_1F_1(t) + x_2F_2(t) + x_3F_3(t) + x_4F_4(t) + x_5F_5(t)] \end{aligned} \qquad [2.3]$$

Thus, the linear combination can be produced before or after performing the FFT. Preferably, the linear combination is produced before performing the FFT, i.e. as $x_1F_1(t)+x_2F_2(t)+x_3F_3(t)+x_4F_4(t)+x_5F_5(t)$, since this generally requires fewer FFTs and FFT processes can be time consuming. Note that more than one FFT could be required even if the linear combination is produced before performing the FFT, e.g. if $x_j$ is a complex number and a computer program for performing an FFT on complex numbers is not available.

3. Alternative Approaches

The theoretical discussion above is based on substantially eliminating the second, third, fourth and fifth harmonic components, whilst leaving behind first, sixth and higher order harmonic components.

Of course, if it is wanted to retain another harmonic component instead of the first harmonic component, the non-zero element a in the vector L could be put in any other place.

Equally, the vector L could be defined as $L=[a,b,c,d,e]^T$, where a is greater than b,c,d and e, if it were desirable merely to suppress but not necessarily substantially eliminate the second, third, fourth and fifth harmonic components relative to the first harmonic component. Also, if it is wanted to suppress/eliminate more/fewer than four harmonic components, then more/fewer image charge/current detectors could be used, with the matrix C and vectors X,L being adjusted accordingly.

The theoretical discussion above is also based using a plurality of image charge/current signals obtained using a plurality of image charge detectors, with each image charge/current signal being obtained using a respective image charge detector of a mass analyser 120 shown in FIG. 24 (modified to include five image charge detectors instead of four).

Other arrangements are also possible.

For example, it would be possible to use a plurality of image charge/current signals each being obtained using a respective image current detector. Note here that an image charge signal can be obtained using an image current detector e.g. by integrating an image current signal produced by the image current detector As another example, it would be possible for two or more of the plurality of image charge/current signals to be obtained using the same image charge/current detector.

As a simpler example, all of the plurality of image charge/current signals may be obtained using a single image charge/current detector, but deduced with different parameters. Such an arrangement will now be described with reference to FIG. 26*a-c*.

FIG. 26*a-c* show three image charge signals obtained using only one image charge detector, which have been converted from the time domain into the frequency domain using an FFT and modified using different formulae.

The result of the FFT on an image charge/current signal in the time domain usually gives a complex value such that it is possible to plot two graphs, one for the real component and one for the imaginary component.

However, another way of presenting the result of an FFT is to plot only the absolute intensity ($\sqrt{Re^2+Im^2}$) whilst recording a phase angle derived from (e.g. a ratio of) the real and imaginary intensity. The present inventors have found that the phase angle information can be used to decode the frequency spectrum from a particular image charge/current detector and generate more than one image charge/current signals in the frequency domain. The present inventors have found that for certain ion injection conditions, the phase angle varies for different harmonic peaks but usually stays approximately the same for different mass to charge ratios (even though their harmonic peaks occur at different frequencies). The present inventors have further found that the variation of phase angle therefore provides a distinct feature that can be used to identify which harmonic a peak belongs to.

Thus, a plurality of image charge/current signals may be obtained using only one image charge/current detector.

For example, a first image charge/current signal may be obtained simply by taking the absolute intensity from the FFT data (see FIG. 26*a*).

A second image charge/current signal may be obtained by modulating the absolute intensity by the positive amplitude of the phase derivative, e.g.

$$F_2(v) = F_1(v)\left(\frac{d\phi}{dv} + \left|\frac{d\phi}{dv}\right|\right)$$

This has the result of emphasising the peaks with large phase increase (see FIG. 26*b*).

A third image charge/current signal may be obtained by modulating the absolute intensity by the negative amplitude of the phase derivative, e.g.

$$F_3(v) = F_1(v)\left(-\frac{d\phi}{dv} + \left|\frac{d\phi}{dv}\right|\right)$$

This has the result of emphasising the peaks with large phase decrease (see FIG. 26*c*).

It can be seen that the individual "decoded" frequency spectrums shown in FIG. 26*b* and FIG. 26*b* are not sufficient to preclude certain unwanted harmonics. However, a linear combination can then be produced to substantially eliminate the unwanted harmonics. A method of obtaining the coefficients for the linear combination for the image charge/current signals obtained in this way could be realised in the same manner as described above, although only real value of matrix elements would be involved in this case.

4. Other Factors

The property of mass independency of FT profile is generally correct as has been shown above.

However, if a discrete FT is performed, such as an FFT operation, then the sampled data has a limited number, such that there may be a problem with the aforementioned property.

For example, if the $k^{th}$ harmonic peak $f(m/z_1)$ for a mass/charge ratio $m/z_1$ is at $n_k$, the harmonic peak for another mass/charge ratio $m/z_2$ will be at $an_k$ which may not be the integer number. This is to say $FFT(I_2(t_n))=F(an_k)$ may not be always valid. If the peak is very sharp, the top of the peak will hardly be hit by the discrete points of the FFT and we may have to use the value of nearest integer point to form the elimination matrix C and obtain the coefficients of the solution vector X. Calculating C and X in this way may contain deviation between different mass/charge ratios.

In practice, if a discrete FT, such as an FFT, is used in selecting the predetermined coefficients (e.g. for eliminating certain harmonic components), then it is better to use more frequency points (smaller frequency steps), preferably so that several points can be sampled for each harmonic peak. On the other hand instead of padding zero in time domain data in order to enlarge the data points, a special window function may be implemented so that the frequency leakage can be reduced. Here, it is highly preferable to use the same frequency step and frequency range in the FFT for selecting predetermined coefficients and for producing a linear combination of (real) image charge/current signals in the frequency domain. Otherwise incomplete elimination will usually occur due to errors in the calculation. With properly selected frequency steps and window function, the final mass spectrum can be made clean from the noise wave around the mass peaks as well as minimum spurious peaks contributed from unwanted harmonics.

As we can see in the following example, using higher order of harmonic component to present a mass spectrum often offers a higher mass resolving power. In some case, we may aim at eliminating the first n−1 harmonic components while keeping the higher components from the nth order, by using linear combination with predetermined coefficients. If the range of mass to charge ratios is not very narrow the harmonic components higher than n will still tend to overlap with the nth order harmonic components, although those harmonic components lower than n has already been substantially eliminated. In such case a further peak deconvolution procedure may be used, such as using least square regression, e.g. as disclosed in US2011/0240845 with base functions in frequency domain, or using comb-sampling extraction in frequency domain to obtain a clean mass spectrum.

It is also possible to aim at eliminating the harmonic components from the n th order to n+m th order, while keep the harmonics component below nth order. For example, we can aim at eliminating the $4^{th}$ to $8^{th}$ harmonic components, by using linear combination with predetermined coefficients. The remaining first, second and third harmonic frequency components may cause peak overlapping if the rang of mass to charge ratio is not very narrow. However, as long as the third harmonic frequency of smallest mass does not exceed the $9^{th}$ order harmonic frequency of the highest mass in the range, the mixed up with only 3 components of peaks can still be resolved easily. For example a spectrum deconvolution routine may start from a lowest mass in the range and scan the frequency point from high to low. The $3^{rd}$ harmonic of at low mass end may be hit as a first non-zero peak value. The complex values of its respective $2^{nd}$ and first harmonics are easily predicted using the known ratio between these peak values. As the third harmonic provides good mass resolving power as well as mass accuracy, the predicted frequency points for the $2^{nd}$ and the $1^{st}$ harmonic peaks can be very accurate (compared an alternative scan up routine). The acquired $2^{nd}$ and $1^{st}$ peak values are deducted from the original complex spectrum. Then, a next non-zero peak value is searched by step down the frequency. Once found, the respective $2^{nd}$ and $1^{st}$ harmonic component values in complex are again calculated using the same rule, and deducted from the complex frequency spectrum obtained after the previous deduction, and so on, until the whole spectrum is processed.

Of cause such a deconvolution algorithm can also be replaced by using above mentioned methods where least square regression or the comb-sampling extraction in frequency domain is involved.

EXAMPLES

The following examples describe simulations performed to demonstrate the principles of the invention.

Example 1

A mass/charge ratio of 400 Th was selected as a reference mass/charge ratio.

A simulation was performed to obtain five image charge signals representative of trapped ions having only the reference mass/charge ratio undergoing oscillatory motion in a mass analyser.

In the simulation, each of the five image charge signals were obtained using a respective image charge detector of the mass analyser 120 shown in FIG. 24 over a period of 20 ms.

An FFT with total frequency number $2^{23}$ was performed on all five image charge signals, one by one, to convert the five image charge signals from the time domain to the frequency domain, thereby obtaining five FFT profiles. The five FFT profiles were then displayed.

In FIG. 27*a-e*, the real intensities (left-hand plots) and imaginary intensities (right-hand plots) of the five FFT profiles obtained using each of the five image charge detectors are plotted against frequency.

The complex values at each peak position up to the fifth harmonic peak (the fifth peak counting from left to right) were then recorded for each FFT profile to form an elimination matrix C, in which each column can be viewed as a vector representing the image charge signal obtained using a respective "pick-up" electrode.

$$\begin{matrix} -0.0246-0.0632i & -0.0384-0.0983i & -0.0192-0.0491i & 0.0057+0.0146i & 0.0485+0.1243i \\ 0.0467-0.0430i & 0.0537-0.0494i & -0.0316+0.0291i & -0.0666+0.0613i & 0.0418-0.0385i \\ 0.0511+0.0250i & 0.0286+0.0140i & -0.0714-0.0349i & 0.0285+0.0139i & 0.0103+0.0050i \\ -0.0040+0.0487i & 0.0004-0.0054i & 0.0032-0.0386i & -0.0044+0.0533i & 0.0033-0.0398i \\ -0.0320-0.0253i & 0.0246+0.0195i & -0.0141-0.0112i & 0.0251+0.0199i & -0.0255-0.0202i \end{matrix}$$

For substantial elimination of the second, third, fourth and fifth harmonic components (to leave the first, sixth and higher order harmonic components), a vector L was defined as:

$$L=[1,0,0,0,0]^T$$

The solution vector X was then calculated as:

$$X=[x_1,x_2,x_3,x_4,x_5]^T=\begin{bmatrix} -1.6263+4.1715i \\ -3.1495+8.0828i \\ -3.8622+9.9077i \\ -2.9562+7.5850i \\ -1.7743+4.5537i \end{bmatrix}$$

The coefficients $x_1$, $x_2$, $x_3$, $x_4$, $x_5$ from the solution vector X can then be used to produce a linear combination of a plurality of image charge/current signals representative of trapped ions having any mixture of mass/charge ratios that have been obtained using the five "pick-up" electrodes.

A mixture of mass/charge ratios ("mix 3") was then chosen as shown in Table 4.

TABLE 4

| Mass/charge ratio (Th) | Number of ions | Frequency of first harmonic (kHz) |
|---|---|---|
| 720 | 15 | 153.07 |
| 500.5 | 12 | 183.49 |
| 500 | 20 | 183.66 |
| 181 | 1 | 305.53 |
| 180 | 10 | 306.14 |
| 150 | 15 | 335.31 |

Another simulation was performed to obtain five image charge signals representative of trapped ions having the chosen mixture of mass/charge ratios undergoing oscillatory motion under the same conditions as the simulation used to obtain the solution vector X (i.e. using the same five image charge detectors to obtain the five image charge signals over a period of 20 ms).

An FFT with total frequency number $2^{23}$ was performed on all five image charge signals, one by one, to convert the five image charge signals from the time domain to the frequency domain, thereby obtaining five FFT profiles. One of the FFT profiles for signal obtaining from $1^{st}$ electrode is displayed in FIG. 28*a*.

Next, a linear combination of the five image charge signals was produced using the coefficients $x_j$ taken from solution vector X.

Figure 28A:
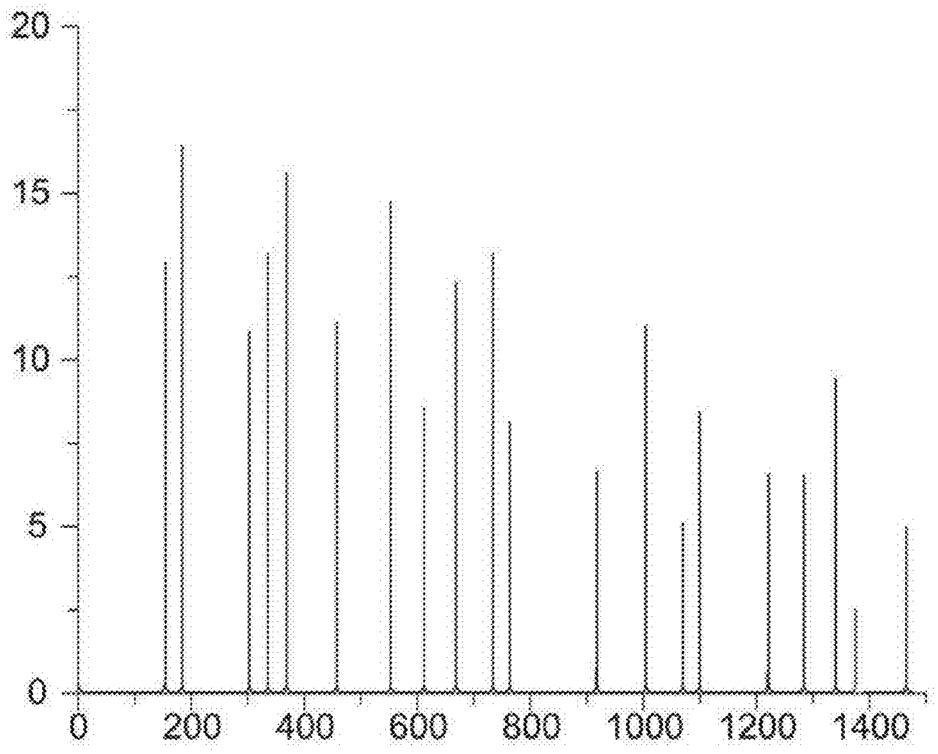
Figure 28B:
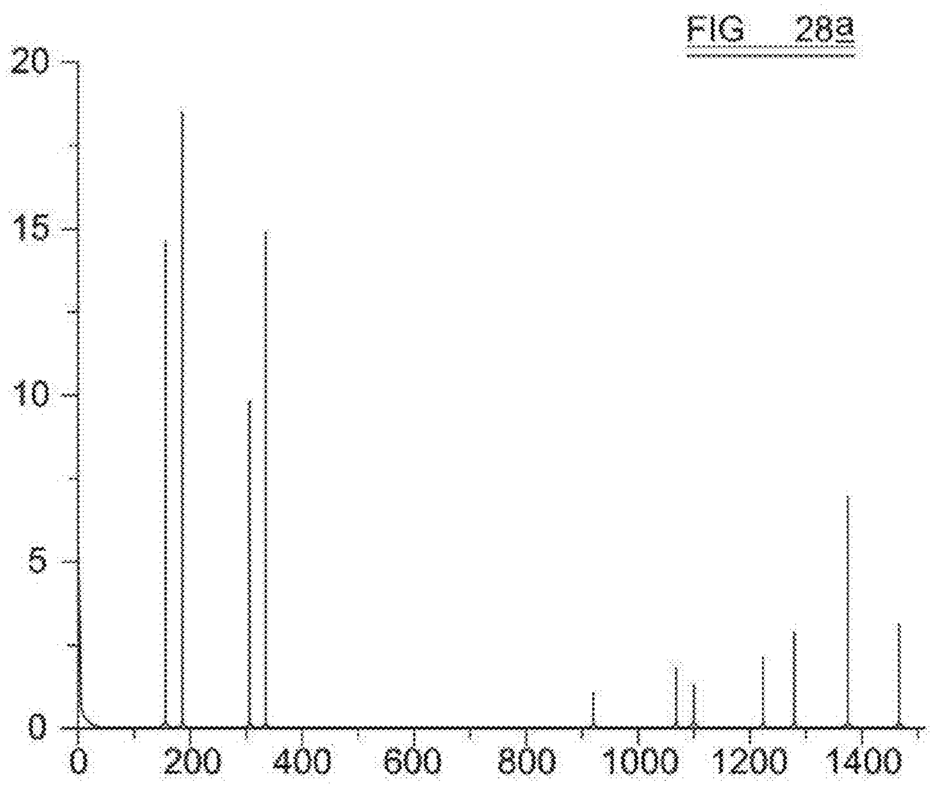

FIG. 28*b* is a linear combination of the five FFT profiles obtained using the five image charge detectors. The linear combination used the coefficients $x_1$, $x_2$, $x_3$, $x_4$, $x_5$ from the solution vector X such that the second, third, fourth and fifth harmonics are substantially eliminated to leave the first, sixth and higher order harmonics components. Here, 4 main peaks can be seen on the left hand side of spectrum, because the mass 500.5 and 500 Th are too close to be distinguished in the graph, and 181 and 180 are also too close to be distinguished so that 6 mass to charge ratios merged into 4 peaks.

Figure 28C:
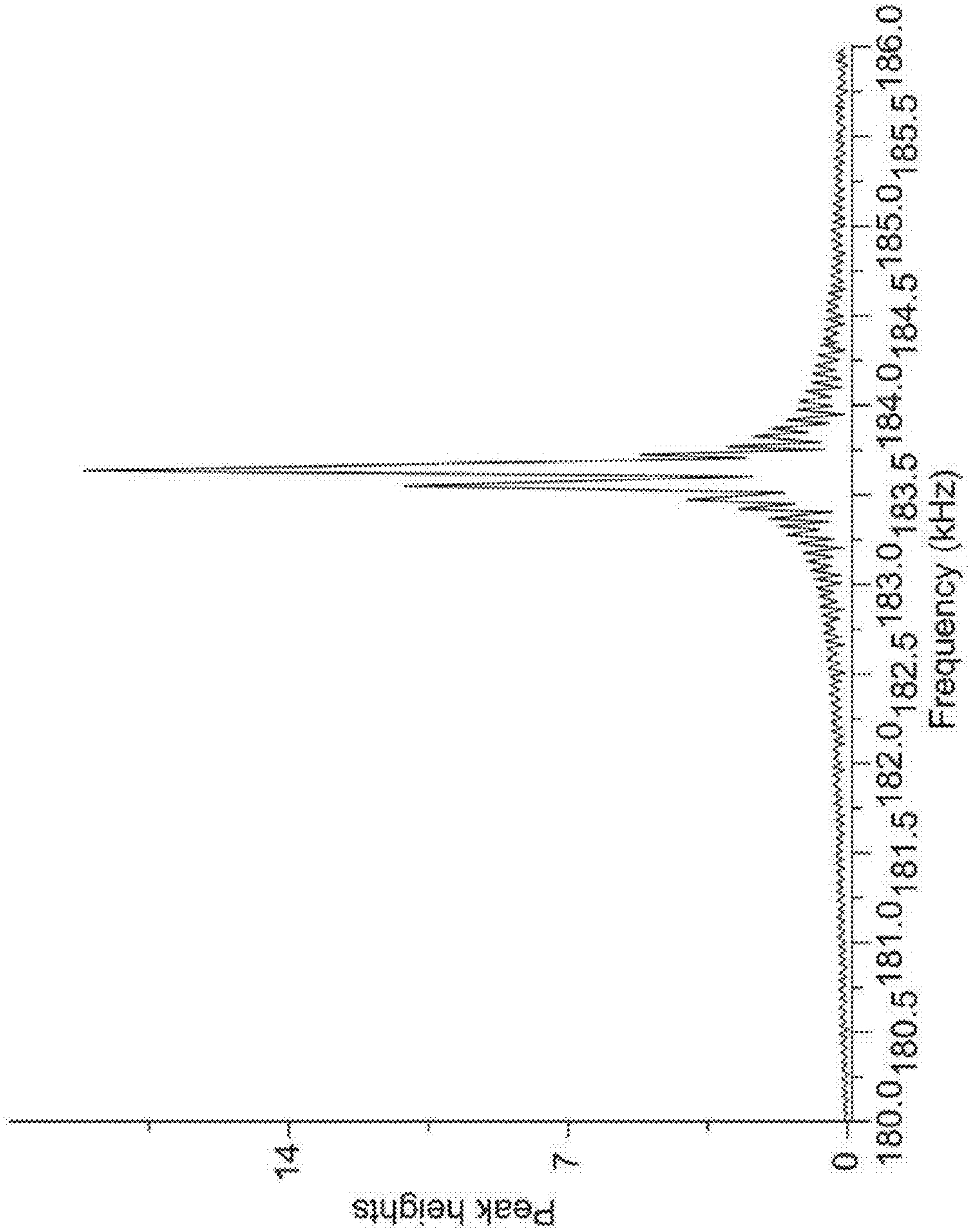

FIG. 28*c* is a zoomed-in view of FIG. 28*b*, showing the first harmonic peaks for the ions having mass/charge ratios of 500 and 500.5 Th.

Figure 28D:
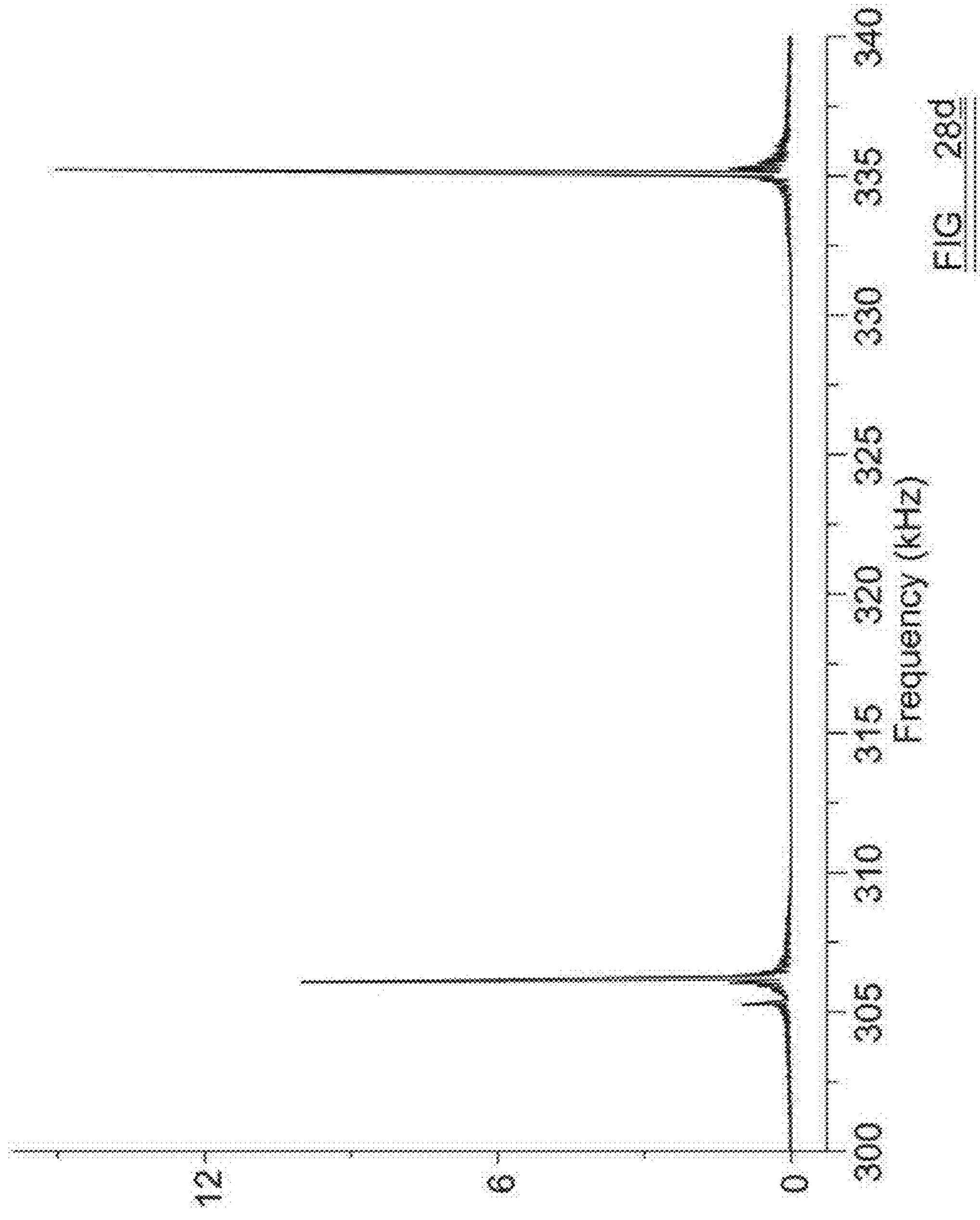

FIG. 28*d* is a zoomed-in view of FIG. 28*b*, showing the first harmonic peaks for the ions having mass/charge ratios of 150, 180 and 181 Th. The height of the peaks are in proportion with the number of ions of each species put into simulation.

Figure 28E:
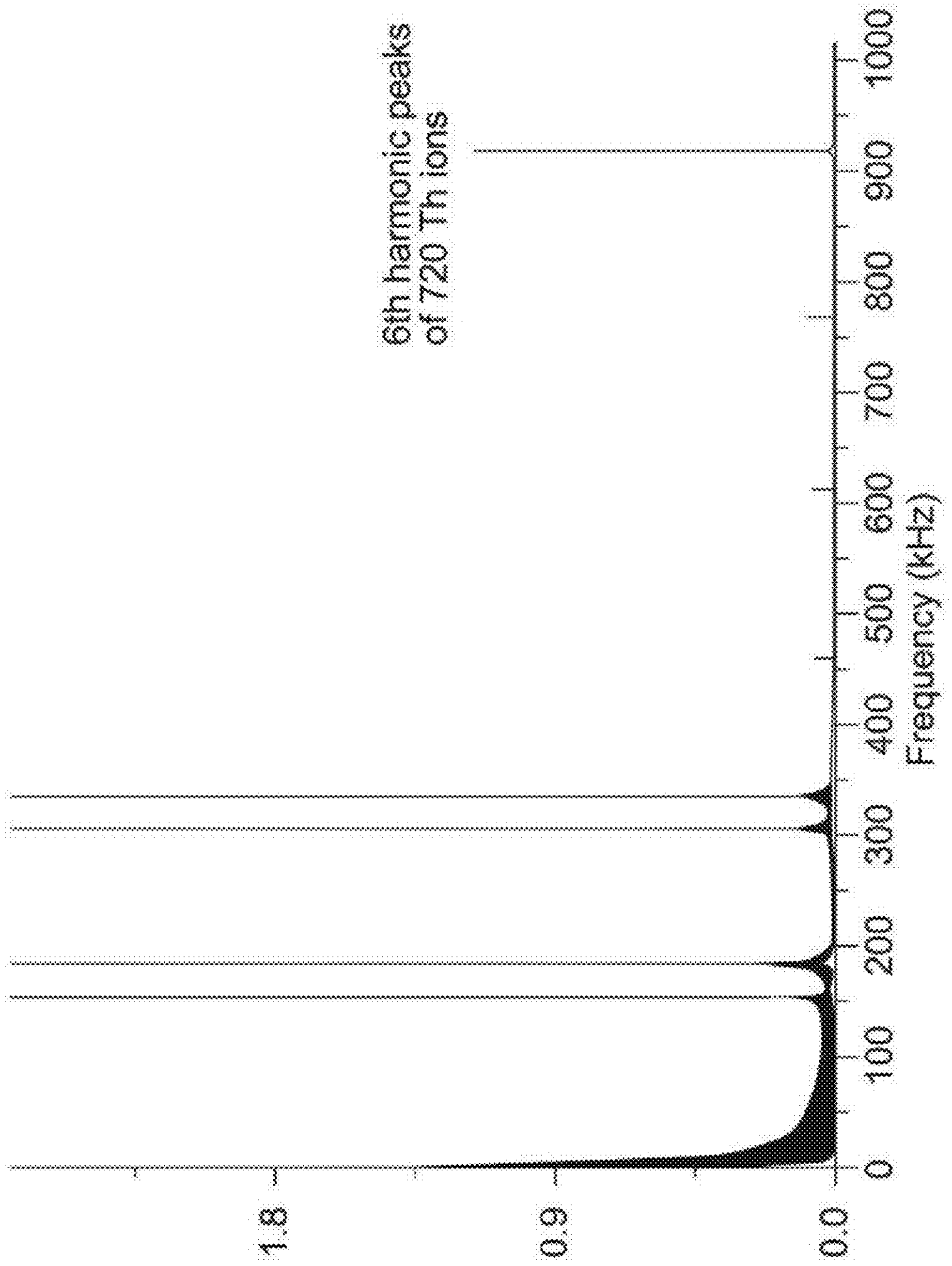
Figure 29A:
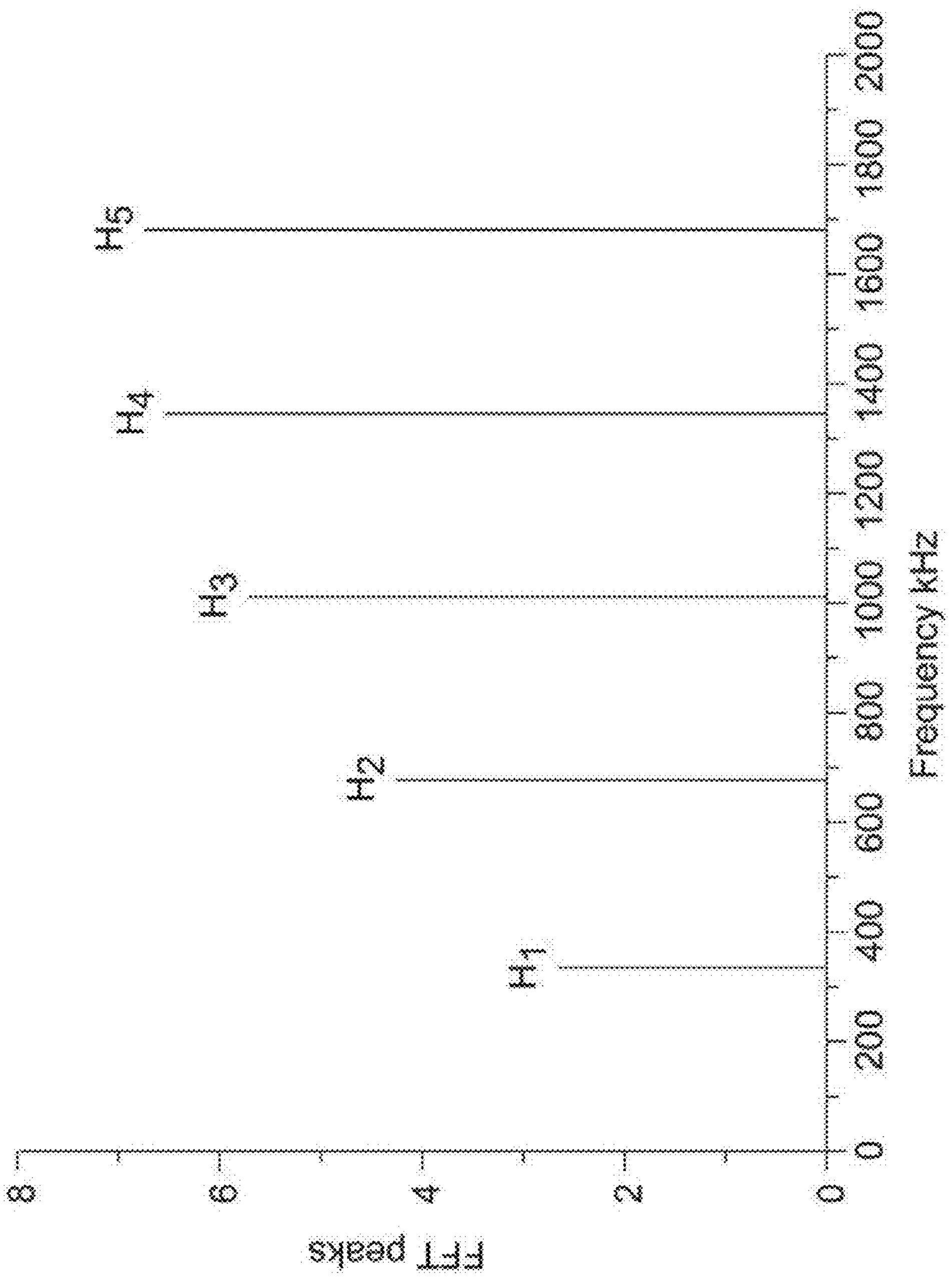
Figure 29B:
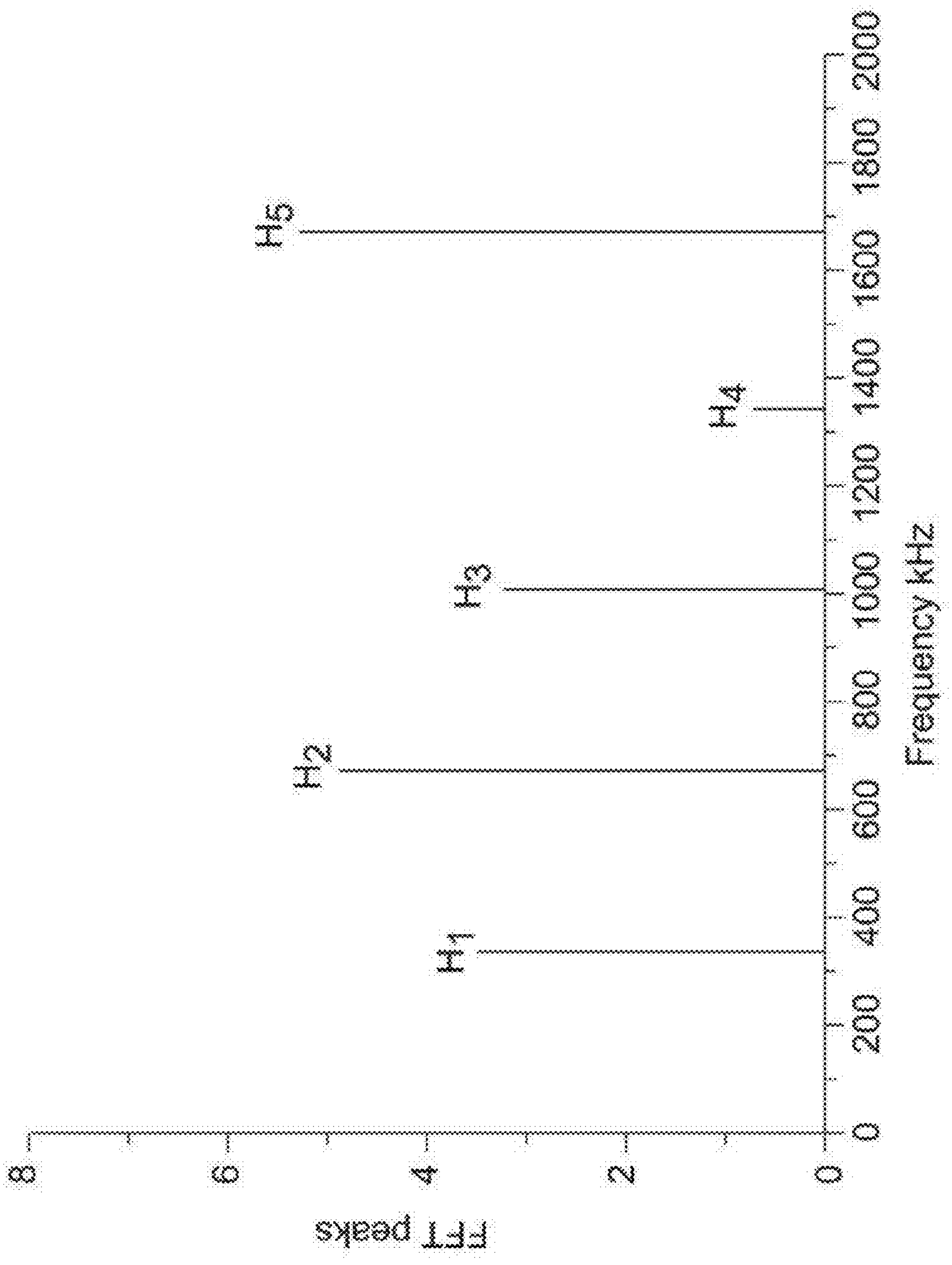
Figure 29C:
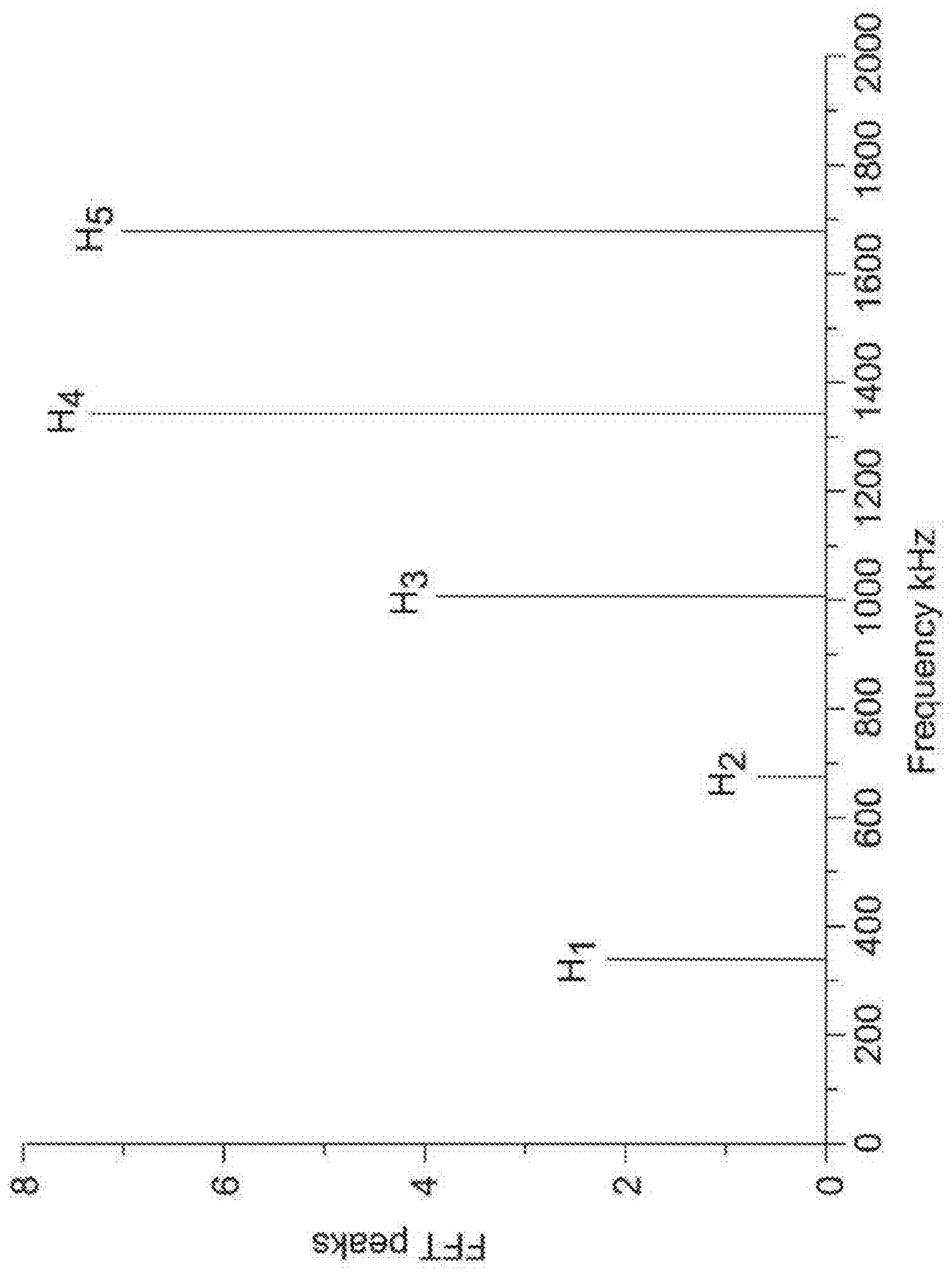
Figure 29D:
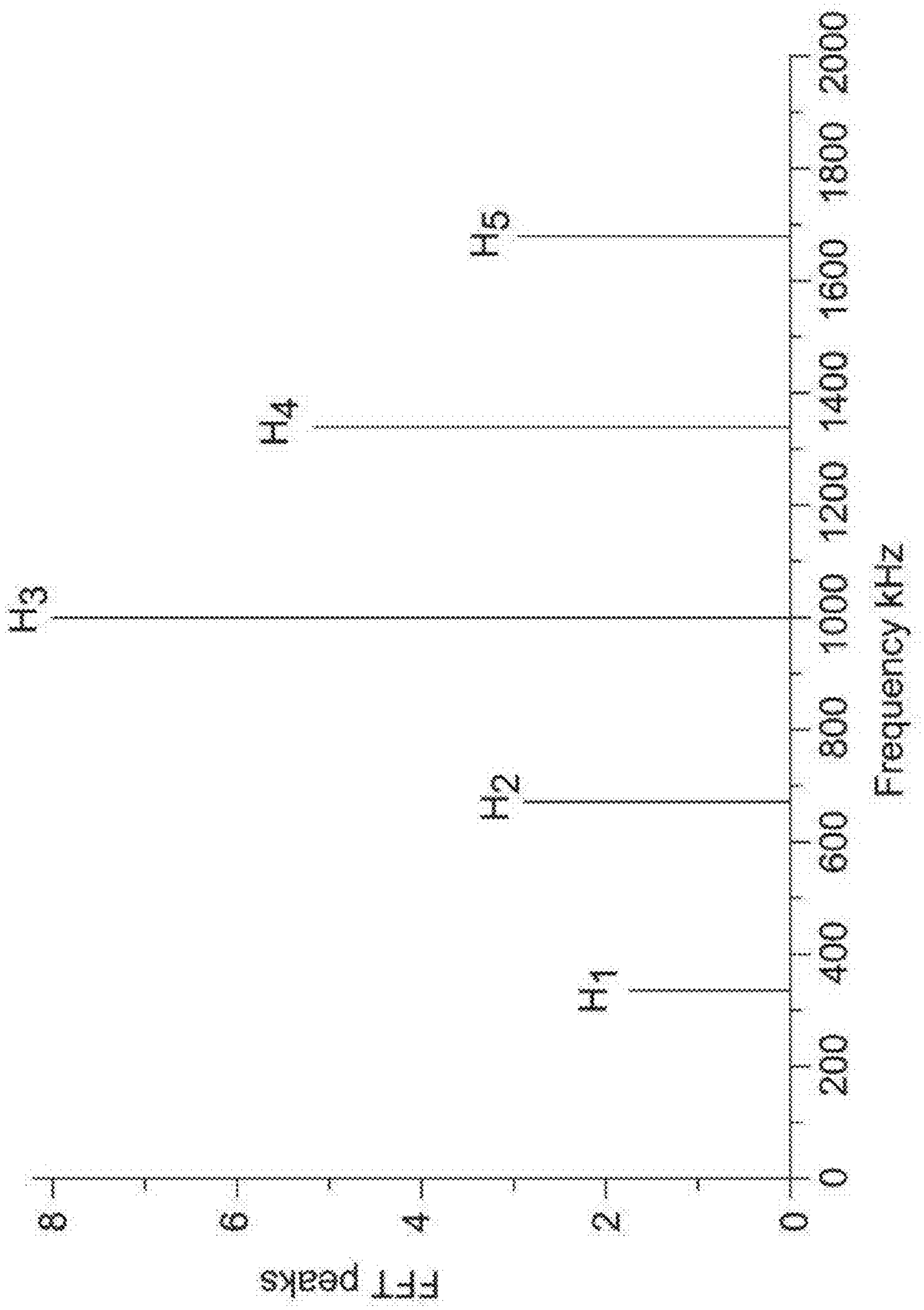
Figure 29E:
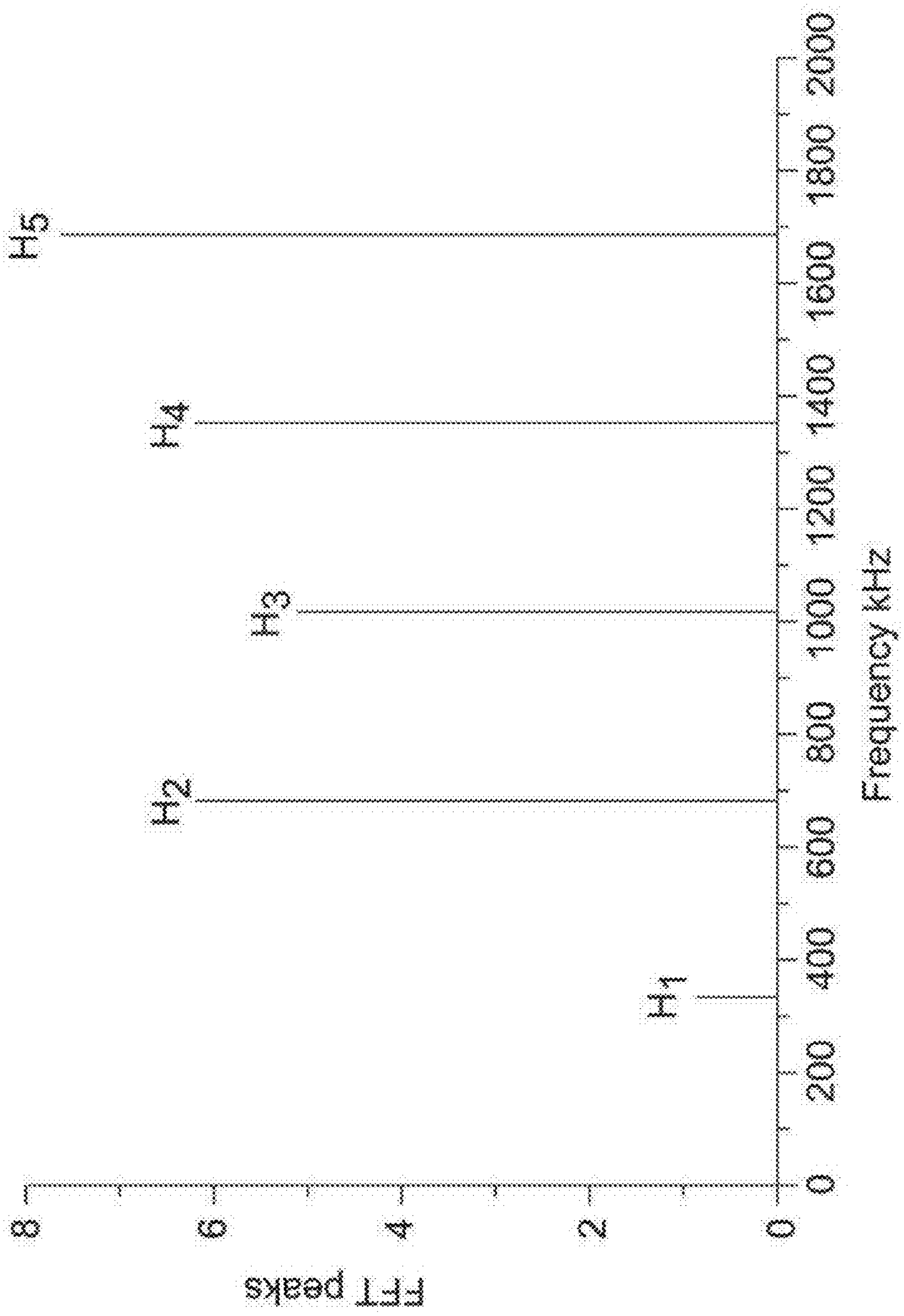

FIG. 28*e* is a zoomed-in view of FIG. 28*b*, with an expanded vertical axis, showing that very little remains of the second, third, fourth and fifth harmonic peaks (although a sixth harmonic peak for ions having mass/charge ratio of 720 Th can be seen at the far right of this plot).

Example 2

In Example 2, simulations were performed in the same way as for Example 1 although image current signals were recorded instead. Again, the mixture of mass/charge ratios was then chosen as shown in Table 5:

TABLE 5

| | Mass (Th) | | | | | |
|---|---|---|---|---|---|---|
| | 720 | 500.5 | 500 | 181 | 180 | 150 |
| Number of ions | 150 | 120 | 200 | 10 | 100 | 150 |
| Frequency For first harmonic | 153.3 | 183.5 | 183.7 | 305.2 | 306.1 | 335 |

For selecting coefficients for the linear combination, the simulation is performed using 100 ions of 150 Th as the reference ions. The elimination matrix C obtained using 100 ions was then calculated as shown in Table 6.

TABLE 6

| Elimination matrix |
|---|
| C(1,1) = 2.25994301 −0.36707985i |
| C(2,1) = 1.35692251 +4.06690407i |
| C(3,1) = −5.10962582 +2.67983103i |
| C(4,1) = −3.97460151 −5.29403687i |
| C(5,1) = −1.31414247 −6.72705126i |
| C(1,2) = 3.51686907 −0.57124120i |
| C(2,2) = 1.55984724 +4.67508602i |
| C(3,2) = −2.86608863 +1.50318837i |
| C(4,2) = 0.43882799 +0.58456469i |

TABLE 6-continued

| Elimination matrix |
|---|
| C(5,2) = 1.00981688 +5.16895008i |
| C(1,3) = 1.93018293 −0.31351796i |
| C(2,3) = 0.15512808 +0.46491912i |
| C(3,3) = 3.40785789 −1.78728938i |
| C(4,3) = 4.40777826 +5.87102985i |
| C(5,3) = 1.34258437 +6.87280369i |
| C(1,4) = 1.75751841 −0.28547308i |
| C(2,4) = −0.91862661 −2.75330544i |
| C(3,4) = 7.14230776 −3.74590302i |
| C(4,4) = 3.15379643 +4.20064449i |
| C(5,4) = −0.57791203 −2.95778489i |
| C(1,5) = 0.78230357 −0.12707111i |
| C(2,5) = −1.98152840 −5.93897867i |
| C(3,5) = 4.57197046 −2.39790392i |
| C(4,5) = −3.70357108 −4.93317795i |
| C(5,5) = −1.47447968 −7.54830360i |

For substantial elimination of the second, third, fourth and fifth harmonic components (to leave the first, sixth and higher order harmonic components), a vector $L_1$ was defined as:

$$L_1=[1,0,0,0,0]^T$$

For substantial elimination of the first, third, fourth and fifth harmonic components (to leave the second, sixth and higher order harmonic components), a vector $L_2$ was defined as:

$$L_2=[0,1,0,0,0]^T$$

For substantial elimination of the first, second, fourth and fifth harmonic components (to leave the third, sixth and higher order harmonic components), a vector $L_3$ was defined as:

$$L_3=[0,0,1,0,0]^T$$

Respective linear combination coefficients $X_1$, $X_2$, $X_3$ are obtained by solving respective equations.

In FIG. 29*a-e*, the absolute intensities of the five FFT profiles obtained using each of the five image charge detectors are plotted against frequency.

FIG. 30*a* is an FFT profile obtained using one of the five image charge detectors in the simulation. The mass/charge ratio, number of ions present, and frequency of the first-sixth harmonic peaks ($H_1$-$H_6$) for each ion is shown in Table 7.

TABLE 7

| mass | ions | $H_1$ | $H_2$ | $H_3$ | $H_4$ | $H_5$ | $H_6$ |
|---|---|---|---|---|---|---|---|
| 720 | 150 | 153.3 | 306.6 | 459.9 | 613.2 | 766.5 | 919.8 |
| 500.5 | 120 | 183.5 | 367 | 550.5 | 734 | 917.5 | 1101 |
| 500 | 200 | 183.7 | 367.2 | 551.1 | 734.8 | 918.5 | 1102 |
| 181 | 10 | 305.2 | 610.4 | 915.6 | 1320.8 | 1526 | 1831 |
| 180 | 100 | 306.1 | 612.2 | 918.3 | 1324.4 | 1530.5 | 1836.5 |
| 150 | 150 | 335 | 670 | 1005 | 1340 | 1675 | 2010 |

FIG. 30*b* is a linear combination of the five FFT profiles obtained using the five image charge detectors in the simulation. The linear combination used the coefficients $x_1$, $x_2$, $x_3$, $x_4$, $x_5$ from the solution vector $X_1$ such that the second, third, fourth and fifth harmonics are substantially eliminated to leave the first, sixth and higher order harmonics components.

FIG. 30*c-g* are zoomed-in views of FIG. 30*b*.

FIG. 30*h* is a linear combination of the five FFT profiles obtained using the five image charge detectors in the simulation. The linear combination used the coefficients $x_1$, $x_2$, $x_3$, $x_4$, $x_5$ from the solution vector $X_3$ such that the first, second, fourth and fifth harmonics are substantially eliminated to leave the third, sixth and higher order harmonics components.

FIG. 30*i-m* are zoomed-in views of FIG. 30*h*.

FIG. 30*n* is a linear combination of the five FFT profiles obtained using the five image charge detectors in the simulation. The linear combination used the coefficients $x_1$, $x_2$, $x_3$, $x_4$, $x_5$ from the solution vector $X_2$ such that the first, third, fourth and fifth harmonics are substantially eliminated to leave the second, sixth and higher order harmonics components.

FIG. 30*o-x* are zoomed-in views of FIG. 30*n*.

FIGS. 30*e*, 9*j* and 9*s* respectively show the first, third and second harmonic peaks for the ions having mass/charge ratios of 500 and 500.5. As can be seen by comparing these peaks, the peaks for ions having these different mass/charge ratios become more spaced, and therefore more clearly visible, for higher harmonic components. This explains why it may be desirable to suppress (more preferably substantially eliminate) n−1 of the first n harmonic components, so as to leave a harmonic component other than the first harmonic component behind.

FIG. 30*k* shows a very large sixth harmonic peak for the ion having a mass/charge ratio of 720, compared with a small third harmonic peak for the ion having a mass/charge ratio of 181 Th. A 10 times larger third harmonic peak for the ion having a mass/charge ratio of 180 is obliterated by the even larger sixth harmonic peak for the ion having a mass/charge ratio of 720, because they share the same frequency. Accordingly, in this case, it may be desirable to eliminate the sixth harmonic component. In a case where only 5 pick-up electrodes are used, eliminating the $6^{th}$ harmonic instead of the $1^{st}$ harmonic, in other words, eliminating the $2^{nd}$, $4^{th}$, $5^{th}$, and $6^{th}$ harmonics, while keeping the $1^{st}$, $3^{rd}$, $7^{th}$ and higher order harmonics may be a preferred alternative.

The invention claimed is:

1. A method of processing an image charge/current signal representative of trapped ions undergoing oscillatory motion, the method including:

applying a validity test to each of a plurality of peaks in the image charge/current signal in the frequency domain, wherein applying the validity test to a peak in the image charge/current signal in the frequency domain includes determining whether a phase angle associated with the peak meets a predetermined condition; and forming a new image charge/current signal that excludes data representative of one or more peaks that have failed the validity test.

2. The method according to claim 1, wherein the validity test is configured to determine whether a peak in the image charge/current signal in the frequency domain belongs to one or more selected harmonic components.

3. The method according to claim 1, wherein the method includes forming a new image charge/current signal that:

includes data representative of one or more peaks that have passed the validity test;

excludes data representative of one or more peaks that have failed the validity test.

4. The method according to claim 1, wherein the validity test is dependent on a predetermined relationship between phase angle and frequency that corresponds to a selected harmonic component of an image charge/current signal.

5. The method according to claim 1, wherein applying the validity test to a peak includes determining whether a phase angle associated with the peak falls within a predetermined range, wherein the predetermined range is dependent on a predetermined relationship between phase angle and frequency that corresponds to a selected harmonic component of an image charge/current signal.

6. The method according to claim 1, wherein:

applying the validity test to a peak includes determining whether a phase angle associated with the peak, as rotated by a predetermined relationship between phase angle and frequency that corresponds to a selected harmonic component of an image charge/current signal, meets a predetermined condition;

7. The method according to claim 6, wherein the rotation of a phase angle associated with a peak by the predetermined relationship includes rotation of the phase angle by the negative value of an amount provided by the predetermined relationship at the frequency at which the peak occurs.

8. The method according to claim 7, wherein the predetermined condition includes determining whether the phase angle, as rotated by the predetermined relationship, is equal to zero within a predetermined tolerance.

9. The method according to claim 8, wherein:

the image charge/current signal in the frequency domain is in a complex format; and determining whether the phase angle, as rotated by the predetermined relationship, is equal to zero within a predetermined tolerance includes determining if an imaginary component of the image charge/current signal in the frequency domain, whose phase angle has been rotated by the predetermined relationship is zero at or within a predetermined distance of the frequency at which the peak occurs.

10. The method according to claim 1, wherein:

the image charge/current signal in the frequency domain is in a complex format;

the new image charge/current signal includes data representative of one or more peaks that have passed the validity test; and the data representative of the one or more peaks that have passed the validity test is obtained from a real component of the image charge/current signal in the frequency domain.

11. The method according to claim 1, wherein the phase angle associated with each peak is determined using a frequency value at which the peak is highest.

12. The method according to claim 1, wherein the phase angle associated with each peak is determined by polynomial fitting and/or interpolation using a plurality of frequency values including a frequency value at which the peak is highest.

13. The method according to claim 1, wherein the method includes:

repeating the steps of applying a validity test to each of a plurality of peaks and forming a new image charge/current signal, wherein a different validity test is used and a different new image charge/current signal is formed on each repetition, so as to form a plurality of new image charge/current signals, wherein the validity test used on each repetition is configured to determine whether a peak in the image charge/current signal in the frequency domain belongs to a different selected harmonic component so that the new image charge/current signal produced on each repetition corresponds to a different selected harmonic component; and comparing the plurality of new image charge/current signals to determine if any errors are contained within one or more of the plurality of new image charge/current signals.

14. The method according to claim 1, wherein:

the method includes producing a linear combination of the plurality of image charge/current signals using a plurality of predetermined coefficients; and the linear combination of the plurality of image charge/current signals is used as the image charge/current signal that is processed.

15. The method according to claim 14, wherein the predetermined coefficients have been selected so as to supress at least one harmonic component of the image charge/current signals within the linear combination of the plurality of image charge/current signals.

16. The method according to claim 1, wherein the method includes:

producing ions;

trapping the ions such that the trapped ions undergo oscillatory motion;

obtaining the at least one image charge/current signal representative of the trapped ions undergoing oscillatory motion.

17. A calibration method of determining a relationship between phase angle and frequency that corresponds to a selected harmonic component of an image charge/current signal, the calibration method including:

producing reference ions having a plurality of known mass/charge ratios;

trapping the reference ions such that the trapped reference ions undergo oscillatory motion;

obtaining one or more image charge/current signals representative of the trapped reference ions undergoing oscillatory motion;

providing the one or more image charge/current signals in the frequency domain;

identifying, in the one or more image charge/current signals in the frequency domain, a plurality of peaks caused by the reference ions that belong to a selected harmonic component of the image charge/current signal;

determining a phase angle for each of the identified peaks;

determining a relationship between phase angle and frequency that corresponds to a selected harmonic component of an image charge/current signal based on the phase angles determined for the identified peaks.

18. The calibration method according to claim 17, wherein the or each image charge/current signal representative of the trapped reference ions undergoing oscillatory motion is a linear combination of image charge/current signals representative of the trapped reference ions undergoing oscillatory motion, wherein the or each linear combination is obtained by:

producing a linear combination of a plurality of image charge/current signals representative of the trapped reference ions undergoing oscillatory motion using a plurality of predetermined coefficients.

19. The calibration method according to claim 17, further including:

producing ions;

trapping the ions such that the trapped ions undergo oscillatory motion;

obtaining the at least one image charge/current signal representative of the trapped ions undergoing oscillatory motion;

applying a validity test to each of a plurality of peaks in the image charge/current signal in the frequency domain, wherein applying the validity test to a peak in the image charge/current signal in the frequency domain includes determining whether a phase angle associated with the peak meets a predetermined condition; and forming a new image charge/current signal that excludes data representative of one or more peaks that have failed the validity test;

wherein the relationship between phase angle and frequency that corresponds to a selected harmonic component of an image charge/current signal determined in the calibration method is used as a predetermined relationship between phase angle and frequency that corresponds to a selected harmonic component of an image charge/current signal in the method of mass analysis.

20. A mass spectrometry apparatus including:

an ion source configured to produce ions;

a mass analyser configured to trap the ions such that the trapped ions undergo oscillatory motion in the mass analyser;

at least one image charge/current detector for use in obtaining at least one image charge/current signals representative of trapped ions undergoing oscillatory motion in the mass analyser; and a computer configured to perform a method of processing an image charge/current signal representative of trapped ions undergoing oscillatory motion, the method including:

applying a validity test to each of a plurality of peaks in the image charge/current signal in the frequency domain, wherein applying the validity test to a peak in the image charge/current signal in the frequency domain includes determining whether a phase angle associated with the peak meets a predetermined condition; and forming a new image charge/current signal that excludes data representative of one or more peaks that have failed the validity test.

21. A mass spectrometry apparatus according to claim 20, wherein the mass analyser is an electrostatic ion trap configured to produce a substantially static electric field to trap ions produced by the ion source such that the trapped ions undergo oscillatory motion in the mass analyser.

22. A mass spectrometry apparatus according to claim 21, wherein the electrostatic ion trap is a planar electrostatic ion trap.

23. A mass spectrometry apparatus according to claim 21, wherein the mass spectrometry apparatus is an Orbitrap configured to use a hyper-logarithmic electric field for ion trapping, wherein the Orbitrap includes one or more pick-up electrodes that have a ring shape.

24. A computer-readable medium having computer-executable instructions configured to cause a computer to perform a method of processing an image charge/current signal representative of trapped ions undergoing oscillatory motion, the method including:

applying a validity test to each of a plurality of peaks in the image charge/current signal in the frequency domain, wherein applying the validity test to a peak in the image charge/current signal in the frequency domain includes determining whether a phase angle associated with the peak meets a predetermined condition; and forming a new image charge/current signal that excludes data representative of one or more peaks that have failed the validity test.

* * * * *